US012331571B2

(12) United States Patent
Hede et al.

(10) Patent No.: US 12,331,571 B2
(45) Date of Patent: Jun. 17, 2025

(54) ROOF WINDOW WITH A HINGE ASSEMBLY COMPRISING A HINGE UNIT AND A COUPLING UNIT CONFIGURED TO ASSUME AT LEAST ONE INTERMEDIATE POSITION AND A FINAL POSITION

(71) Applicant: VKR Holding A/S, Hørsholm (DK)

(72) Inventors: Lasse Vinther Hede, København K (DK); Niels Henrik Toft-Jensen, Søborg (DK)

(73) Assignee: VKR Holding A/S (DK)

( * ) Notice: Subject to any disclaimer, the term of this patent is extended or adjusted under 35 U.S.C. 154(b) by 0 days.

(21) Appl. No.: 18/849,980

(22) PCT Filed: Mar. 31, 2023

(86) PCT No.: PCT/DK2023/050083
§ 371 (c)(1),
(2) Date: Sep. 23, 2024

(87) PCT Pub. No.: WO2023/186246
PCT Pub. Date: Oct. 5, 2023

(65) Prior Publication Data

US 2025/0109621 A1 Apr. 3, 2025

(30) Foreign Application Priority Data

Mar. 31, 2022 (DK) ........................... PA 2022 70165
Dec. 19, 2022 (DK) ........................... PA 2022 70630

(51) Int. Cl.

| | |
|---|---|
| ***E05D 15/48*** | (2006.01) |
| ***E04D 13/035*** | (2006.01) |
| ***E05D 7/12*** | (2006.01) |

(52) U.S. Cl.
CPC ......... *E05D 15/48* (2013.01); *E04D 13/0357* (2013.01); *E05D 7/12* (2013.01); *E05Y 2900/152* (2013.01)

(58) Field of Classification Search
CPC ..... E05D 15/48; E05D 3/02; E05D 2015/487; E05D 7/085; E05D 7/12; E05Y 2900/152; E04D 13/0357; E04D 13/03
See application file for complete search history.

(56) References Cited

U.S. PATENT DOCUMENTS 3,918,205 A * 11/1975 Rasmussen ......... E04D 13/0357 49/252
4,055,024 A * 10/1977 Frank .................. E04D 13/0357 49/153

(Continued)

FOREIGN PATENT DOCUMENTS

| | | |
|---|---|---|
| DE | 9016313 | 2/1991 |
| DE | 19542542 | 5/1997 |

(Continued)

OTHER PUBLICATIONS

U.S. Appl. No. 18/849,703, filed Sep. 23, 2024.

(Continued)

*Primary Examiner* — Justin B Rephann
(74) *Attorney, Agent, or Firm* — Merek, Blackmon & Voorhees, LLC

(57) ABSTRACT

In the roof window, the hinge assembly (9) comprises a coupling unit (95) connected to or connectable to the frame (2) and configured to be connected to the hinge unit (91) in the mounted condition of the roof window (1). In an installation condition of the roof window (1), the hinge unit (91) is connected to the sash (3) and the coupling unit (95) is connected to the frame (2). The coupling unit (95) and the hinge unit (91) are configured to assume the following positions relative to each other, namely at least one inter- (Continued)

mediate position, and a final position, corresponding to the mounted condition of the roof window (1).

20 Claims, 45 Drawing Sheets

(56) References Cited

U.S. PATENT DOCUMENTS

| | | | | | |
|---|---|---|---|---|---|
| 4,217,732 | A * | 8/1980 | Reichstadt | E04D 13/0357 | 49/386 |
| 4,449,327 | A * | 5/1984 | Nielsen | E05D 15/48 | 49/390 |
| 4,480,406 | A * | 11/1984 | Frank | E05D 15/48 | 49/153 |
| 4,796,331 | A * | 1/1989 | White | E05D 11/1007 | 16/334 |
| 5,070,649 | A * | 12/1991 | Kornerup | E04D 13/0357 | 52/72 |
| 5,568,702 | A * | 10/1996 | Frank | E04D 13/0357 | 49/153 |
| 5,568,703 | A * | 10/1996 | Frank | E04D 13/0357 | 49/386 |
| 5,581,941 | A * | 12/1996 | Sill | E05D 15/48 | 49/246 |
| 5,581,942 | A * | 12/1996 | Sill | E04D 13/0357 | 49/153 |
| 10,100,571 | B2 * | 10/2018 | Deman | E05D 3/186 | |
| 10,287,809 | B2 * | 5/2019 | Holm | E05D 7/085 | |
| 12,173,504 | B2 * | 12/2024 | Holm | E04D 13/0357 | |
| 2018/0320425 | A1 * | 11/2018 | Holm | E04D 13/03 | |
| 2021/0079702 | A1 * | 3/2021 | Øhlenschlæger | E05D 7/082 | |
| 2024/0200335 | A1 * | 6/2024 | Holm | E04D 13/0357 | |
| 2024/0209665 | A1 * | 6/2024 | Holm | E05F 1/1246 | |
| 2024/0209669 | A1 * | 6/2024 | Holm | E04D 13/0357 | |

FOREIGN PATENT DOCUMENTS

| | | |
|---|---|---|
| WO | WO03048476 | 6/2003 |
| WO | WO2019101281 | 5/2019 |

OTHER PUBLICATIONS

U.S. Appl. No. 18/849,718, filed Sep. 23, 2024.
U.S. Appl. No. 18/849,739, filed Sep. 23, 2024.
U.S. Appl. No. 18/849,782, filed Sep. 23, 2024.
International Search Report issued in connection with International Application No. PCT/DK2023/050083.
Written Opinion issued in connection with International Application No. PCT/DK2023/050083.
International Preliminary Report on Patentability issued in connection with International Application No. PCT/DK2023/050083.

* cited by examiner

ROOF WINDOW WITH A HINGE ASSEMBLY COMPRISING A HINGE UNIT AND A COUPLING UNIT CONFIGURED TO ASSUME AT LEAST ONE INTERMEDIATE POSITION AND A FINAL POSITION

TECHNICAL FIELD

The present invention relates to a roof window comprising a frame, a sash, and a pane, in which the frame comprises a set of frame members including a top frame member, two side frame members and a bottom frame member and the sash a set of sash members including a top sash member, two side sash members and a bottom sash member, each frame and sash member defining a longitudinal direction, and in which the roof window furthermore comprises a hinge assembly configured to allow the sash to be tophung about a substantially horizontal first hinge axis in a first operational condition in a mounted condition of the roof window and comprising a hinge unit with a frame hinge part connected to or connectable to at least the top frame member and a sash hinge part connected to at least the top sash member.

BACKGROUND ART

Roof windows to be installed in inclined roof surfaces come in a variety of types. When selecting a roof window type for a specific installation location in a building, parameters such as operability, thermal properties, weather-tightness, and suitable finishing to the interior of the building are typically given substantial weight; however, it is also often desired and in some areas in fact necessary to factor in the external appearance as well. This applies in particular when installing roof windows in conservation areas, in which building regulations may demand that the roof windows meet standard or local requirements. Thus, certain requirements apply whether the installation concerns a newly fitted roof window, or to replace an existing window or rooflight as part of a renovation or refurbishment project.

While the windows or rooflights of past times were typically made of cast iron with single glass pane pieces, separated by one or more cast iron glazing bars, the thermal efficiency left room for improvement. To fulfil the energy performance required by modern day building regulations, conservation roof windows are typically provided with an insulating pane, while at the same time setting out to mimic the look of traditional rooflights.

In many installation situations it is a further requirement that the conservation roof window is able to be installed with a "low profile", i.e. that the height of the parts of the roof window protruding above the surrounding roofing is as small as possible. This is particularly pronounced in buildings with substantially flat roofing materials, such as slate or shingle. To meet this requirement, most major roof window manufacturers allow installation in at least two levels, thus accommodating the height of various roofing profiles and installation conditions.

With an ever-increasing awareness of environmental considerations and the wish to reduce or even eliminate the climate footprint of products, there is furthermore a need for providing products which are more environmentally friendly in terms of manufacturing, supply, installation, and use.

Taking all of the above requirements into account, it is an ongoing quest to improve fitting and operating assemblies for a roof window for conservation purposes.

SUMMARY OF INVENTION

With this background, it is an object of the invention to provide a roof window, which is easy to handle and install.

This and further objects are achieved with a roof window of the kind mentioned in the introduction, which is furthermore characterised in that the hinge assembly comprises a coupling unit connected to or connectable to the frame and configured to be connected to the hinge unit in the mounted condition of the roof window, that in an installation condition of the roof window, the hinge unit is connected to the sash and the coupling unit is connected to the frame, and in that the coupling unit and the hinge unit are configured to assume the following positions relative to each other:

i) an intermediate position; and ii) a final position, corresponding to the mounted condition of the roof window.

In this way, the frame may be handled independently from the sash and without considerations to disassembling a hinge connection to allow this operation. At the same time, during installation, the installer is able to first engage the hinge unit with the coupling unit in an intermediate position. In the intermediate position, the sash including the hinge unit is able to rest on the coupling unit, which provides improved freedom to the installer. To finalize the installation, the installer brings the hinge unit and the coupling unit into the final position. The intermediate position may be a position which is easily reached, thus posing less demands on the engagement between the coupling unit and the hinge unit, while the final position suitably provides for increased security against unintentional release of the connection.

In a presently preferred embodiment, the coupling unit comprises a top frame coupling plate connected to the top frame member, and the top frame coupling plate is provided with coupling plate engagement means configured to cooperate with counterpart frame hinge part engagement means of the frame hinge part. The presence of a top frame coupling plate which may be connected to the frame during manufacture of the roof window provides for a well-defined engagement location for the hinge unit and hence simplified mounting of the sash at the installation site.

The installation is improved and facilitated even further in a presently preferred embodiment in which the coupling plate engagement means include at least two distinct engagement portions configured to cooperate with a counterpart frame hinge part engagement means. By this design, a step-wise and failsafe installation is attainable.

In an advantageous development of this presently preferred embodiment, the coupling plate engagement means are moveable or stationary relative to the coupling plate, and the frame hinge engagement means are stationary or moveable, thus providing for maximum flexibility.

To improve the flexibility in the form of the engagement means even further, the coupling plate engagement means may be female or male engagement means, and the frame hinge engagement means may be male or female engagement means.

In a mechanically simple embodiment, the coupling plate engagement means comprise a hook element comprising an arm with a hook and connected to the base section in a rotational joint, and the frame hinge base plate comprises a protrusion constituting the frame hinge part engagement means and configured to cooperate successively with the at least one intermediate engagement portion and a final engagement portion of said hook element. Furthermore, in addition to ensuring a safe and reliable engagement operation, this embodiment has the additional advantages of reduced frictional forces and furthermore to reduce the impact of unavoidable manufacturing tolerances in the roof window.

Improved reliability of the structure is obtained in an embodiment in which the hook element is biased towards a locking position in which the protrusion of the frame hinge base plate is in engagement with the final engagement portion, and the bias is provided by a spring accommodated with one end in a spring-receiving opening in the arm and with another end in a spring-receiving opening in the base section, the spring passing through an opening allowing movement of the spring during movement of the hook element.

In an alternative embodiment, the coupling plate engagement means comprise a set of engagement pins located with a mutual spacing in a height direction of the coupling plate, and the frame hinge part engagement means comprise a locking tab with a track extending in a height direction of the frame hinge part and configured to cooperate successively with an intermediate engagement pin and a final engagement pin. As the relative movement between the engagement means of hinge unit and the top frame coupling plate takes place substantially vertically, the engagement is assisted by gravity.

Improved reliability during engagement is advantageously obtained in that the locking tab may comprise a fastening section at a first end of the locking tab in which the locking tab is fastened to a base section of the top frame coupling plate, and a flange at a second end opposite the first end.

Other presently preferred embodiments and further advantages will be apparent from the subsequent detailed description and drawings.

A feature described in relation to one of the aspects may also be incorporated in the other aspect, and the advantage of the feature is applicable to all aspects in which it is incorporated.

BRIEF DESCRIPTION OF DRAWINGS

In the following description embodiments of the invention will be described with reference to the drawings, in which.

DESCRIPTION OF EMBODIMENTS

Figure 1:
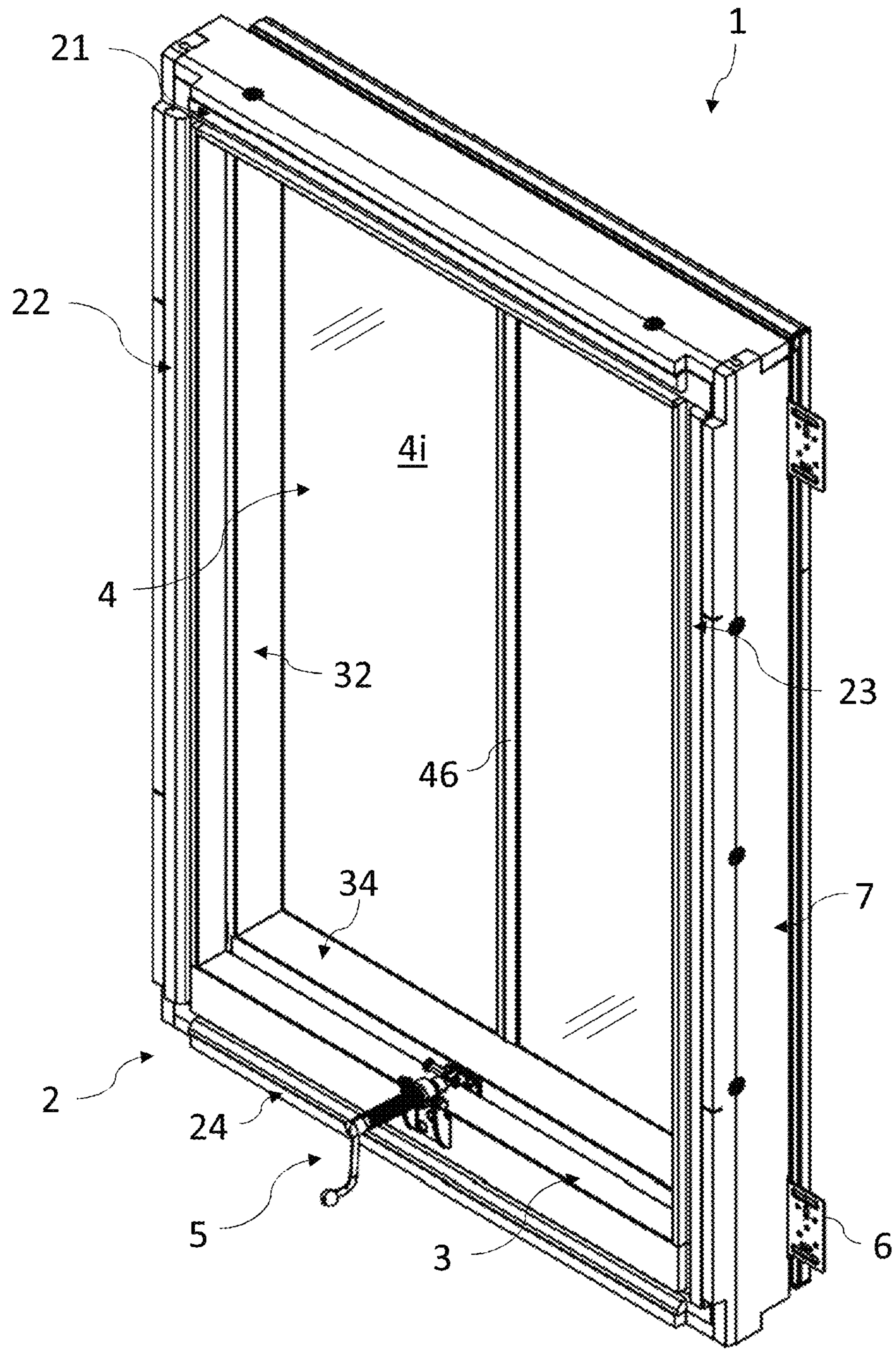
FIG. 1 is a perspective view of a roof window in an embodiment of the invention, seen from an interior side.

In the following detailed description, a preferred embodiment of the present invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations.

It is noted that terms such as “up”, “down”, “left-hand”, “right-hand”, “exterior”, “interior”, “outer”, “inner” are relative and refers to the viewpoint in question. In general, when referred to an exterior side, this relates to a side of a roof window in the mounted condition facing the outdoors or external side of the building. Conversely, an interior side refers to a side facing the internal side of the building, i.e. typically a subjacent room including any light shaft. Terms such as “outwards” and “inwards” are directions generally perpendicular to an interior-exterior direction, taking as its base point a centre of the roof window.

Figure 2:
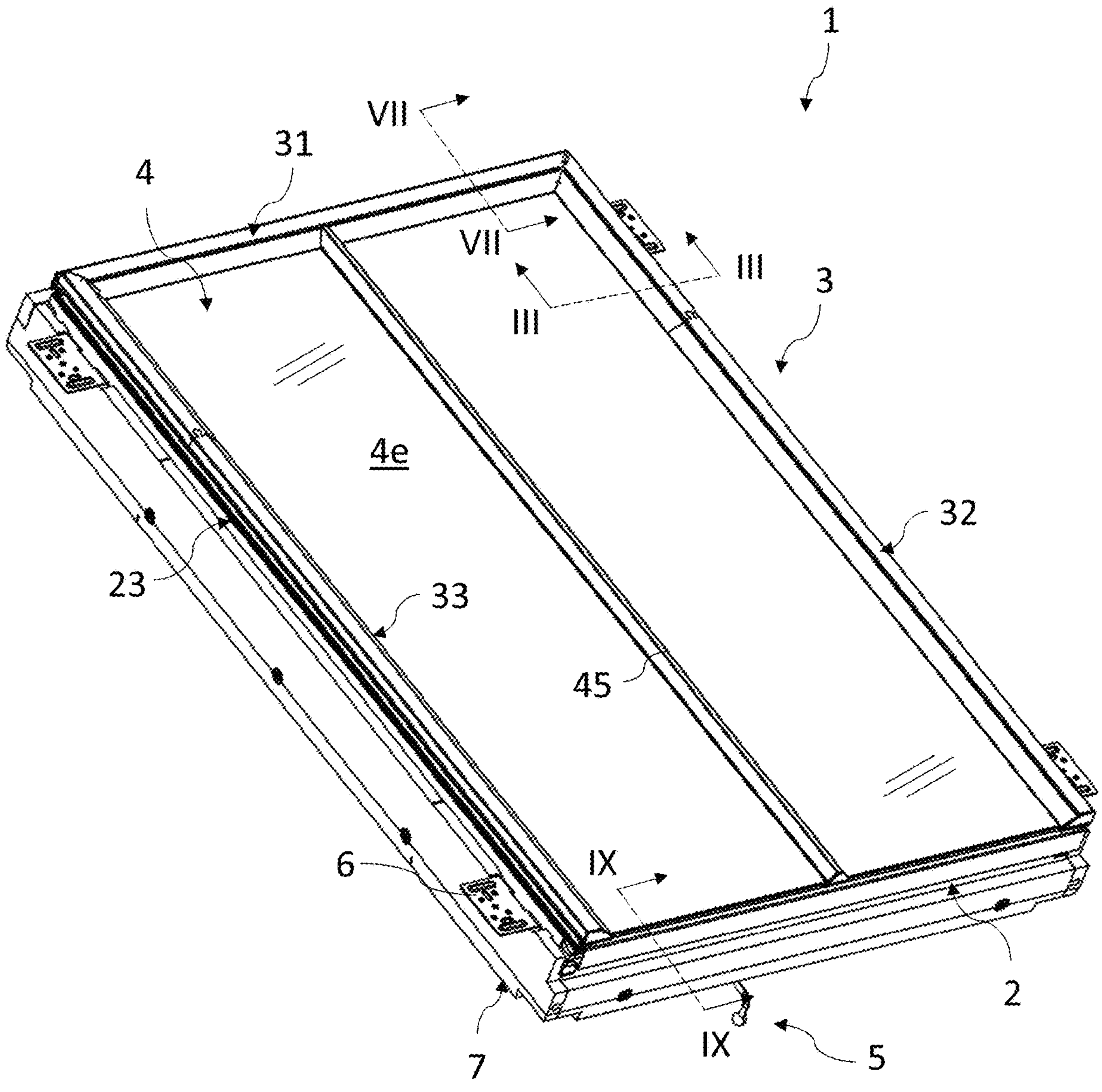
FIG. 2 is perspective of the roof window of FIG. 1, seen from an exterior side.

General Description of a Roof Window—FIGS. 1 and 2

Referring initially to FIGS. 1 and 2, a roof window 1 is shown. The roof window 1 is intended to be installed in an inclined roof surface (not shown).

The roof window 1 comprises a frame 2, a sash 3, and a pane 4. The frame 2 comprises a set of frame members including a top frame member 21, two side frame members 22, 23 and a bottom frame member 24. Correspondingly, the sash 3 comprises a set of sash members including a top sash member 31, two side sash members 32, 33 and a bottom sash member 34. While the frame 2 and sash 3 are described as rectangular structures, some principles of the presented concepts may be applicable to other geometrical shapes as well.

The pane 4 comprises a number of edge portions generally associated to members of the sash 3 as will be described in further detail below. An exterior pane surface **4*e* defines a plane of the roof window 1 in an assembled condition of the roof window 1. The assembled condition of the roof window 1 is achieved when main components of the frame 2 and sash 3 have been assembled and the frame 2 and sash 3 are connected to each other, for instance in an installed position when the roof window 1 is ready for use. Correspondingly, an assembled condition of the sash 3 is achieved once main components of the sash 3 have been assembled, and an assembled condition of the frame 2 when main components of the frame 2** are assembled. The term “main components” is to be understood as encompassing primary parts of the roof window necessary to perform all operational functions, and not including accessories or auxiliary equipment.

An interior pane surface **4*i* faces the interior, typically a room of a building subjacent the roof surface in which the roof window 1 is installed. A glazing bar 45 is fitted to the exterior pane surface 4*e*, and a glazing bar cover 46 is fitted on the interior pane surface 4*i***. Although less practical, it would also be possible to have a two-part pane with two pane halves divided by a throughgoing glazing bar. In wide roof windows, it is also possible to have more than one glazing bar, for instance two glazing bar dividing the surface of the pane visible from the exterior into three sections.

In the embodiments shown, the sash 3 is openable relative to the frame 2, to obtain one or more open positions. In such open positions, the sash 3 and pane 4 are moved out of the plane of the roof window 1. As will be described in the following, the sash 3 is shown as being tophung, i.e. during normal use, the sash 3 is rotated about a substantially horizontal hinge axis at or near the top frame member 21 and top sash member 31. It is however conceivable to apply some principles of the presented concepts for roof windows on different types of windows having other opening patterns, or being provided as fixed skylights.

Further details shown in FIGS. 1 and 2 include an operating assembly 5, here shown as a manual handwinder or screwjack. Other operating assemblies may be present as well.

Also shown is a representative mounting bracket 6 forming part of a plurality of mounting brackets forming a load-transferring connection between the roof window 1 and a surrounding roof structure (not shown). Such a roof structure may include rafters and battens, plywood or other construction materials.

Finally, an insulating frame 7 is shown. Insulation by an insulating frame is optional and may be provided along only some of the frame members or as shown surrounding all four frame members 21, 22, 23, 24.

In the following description of various embodiments, elements having the same or analogous function carry the same reference numerals throughout. Suitable variations and modifications will be apparent to the person skilled in the art.

Mounting Bracket and Roof Window with Set of Mounting Brackets—FIGS. 3 to 6

Typically, a roof window such as the roof window 1 shown in FIGS. 1 and 2 is supplied with a set of mounting brackets 6. As indicated, two mounting brackets 6 are fastened to each side frame member 22, 23. In the following, a single mounting bracket 6 will be described, in association with one side frame member 22. The mounting brackets of the set will most often be identical, although variations are possible.

The mounting bracket 6 comprises a first bracket leg 61 for fastening to the roof structure and a second bracket leg 62 for fastening to the frame 2 of the roof window 1. To that end, the second bracket leg 62 comprises engagement means to interact with a corresponding receiving structure in an outer side of the side frame member 22 of the frame 2 of the roof window 1. This ensures that the mounting bracket 6 is positioned correctly on the side frame member 22 and facilitates the installation process. The positioning of the mounting bracket 6 may be indicated in both the longitudinal direction and the height direction of the side frame member 22, for instance by suitable markings and/or holes. The first bracket leg 61 of the mounting bracket 6 is connected to the second bracket leg 62 via a bend 614.

In the embodiment shown, the second bracket leg 62 is provided with a first engagement means 624 in a first section 621 of the second bracket leg 62 and a second engagement means 629 in a second section 626 of the second bracket leg 62.

Of these two engagement means 624, 629, the second engagement means 629 is configured to assume an inactive position and an active position, of which the active position is shown.

The first engagement means 624 is configured to be received in one receiving structure of the outer side of the frame member in the mounted condition of the mounting bracket 6 on the frame 2 of the roof window 1, and the second engagement means 629 is configured to be received in another receiving structure of the outer side of the frame member in the mounted condition of the mounting bracket 6 on the frame 2 of the roof window 1 in its active position only. This is shown most clearly in FIG. 4, in which the first engagement means 624 is received in a first outer groove 27, and the second engagement means 629 is received in a second outer groove **27*b*. At least the side frame members 22, 23 each comprises a plurality of receiving structures at an outer side of the respective side frame member, such that at least one of the receiving structures interacts with the mounting bracket 6 in the mounted condition of the roof window 1. The first outer groove 27 and the second outer groove 27*b* both extend in the longitudinal direction of the side frame member 22 at a distance from each other in the height direction, the first outer groove 27 being located to the exterior of the second outer groove 27*b***, as seen in the height direction.

Reference is briefly made to FIG. 41, showing the mounting bracket 6 in a supply condition, in which the second engagement means 629 is in its inactive position. In this position, i.e. the inactive position of the second engagement means 629, the second section 626 with the second engagement means 629 is accommodated in an aperture 620 in the first section 621.

To bring the second section 626 with the second engagement means 629 from the position in the aperture 620 to a position in which the second section 626 is located substantially in extension of the first section 621, the second section 626 with the second engagement means 629 is connected to the first section 621 via a hinge connection 625, such that the second section 626 is configured to be brought from the inactive position to the active position by rotating the second section 626.

In the embodiment shown, each of the first and second engagement means comprises a flange 624, 629 protruding at substantially right angles from the respective first and second sections 621, 626. Alternative configurations such as discrete spikes are also conceivable.

In order to fasten the mounting bracket 6 securely to the outer side of the side frame member 22, each of the first and second sections 621 of the second bracket leg 62 comprises one or more openings 622, 623, 627, 628 to receive fastening means in the mounted condition of the mounting bracket 6 on the frame 2 of the roof window 1. Such fastening means typically include screws (not shown).

Figure 5:
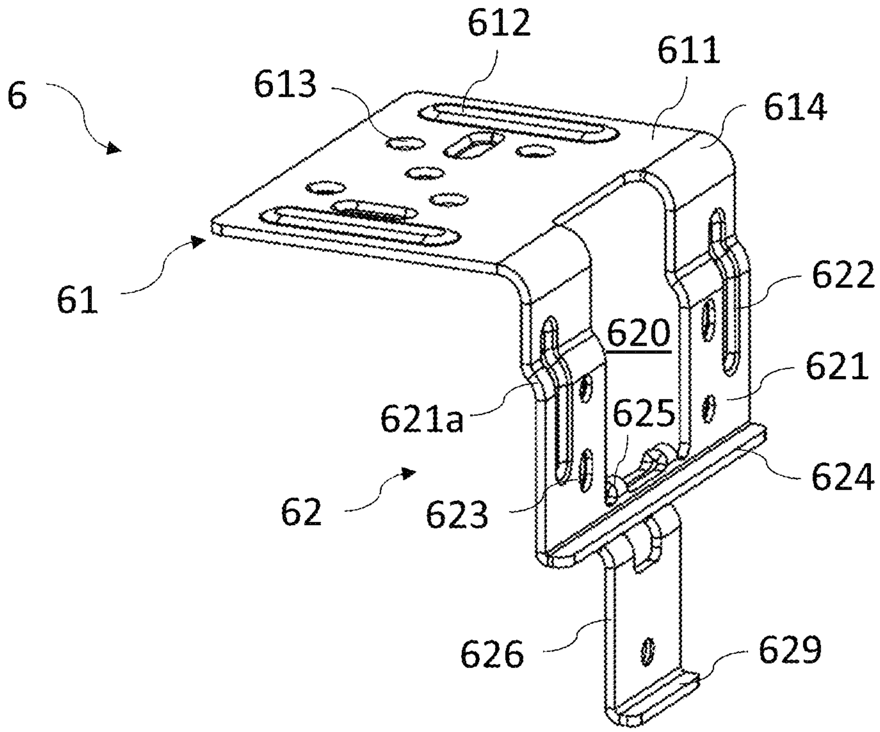
FIGS. 5 and 6 are perspective views from different angles of the mounting bracket in the embodiment of FIGS. 3 and 4.
Figure 6:
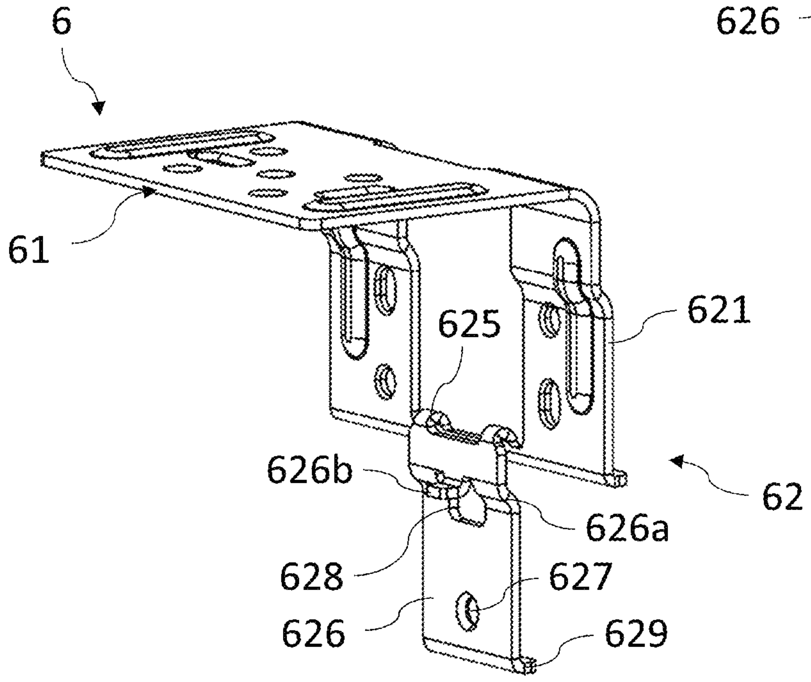

As shown in FIG. 5, the first section 621 is provided with an offset **621*a***. This allows for accommodation of auxiliary equipment including an underroof collar. Details of such auxiliary equipment are described in more detail in Applicant's co-pending patent applications filed on the same date as the present application.

In order to allow alternative mounting of the mounting bracket 6 at a different height position on the side frame member 22, the second section 626 is provided with an offset **626*a* matching the offset 621*a* such that the offset 626*a* of the second section 626 is located substantially in line with the offset 621*a* of the first section 621 in the inactive position of the second section 626 of the second bracket leg 62 of the mounting bracket 6**.

Correct positioning in the height direction ensures that fastening means such as screws (not shown) for fastening the second bracket leg 62 to the side frame member 22 may be dimensioned to suitable length and diameter to be received in a sufficient material thickness of the side frame member 22. As shown for instance in FIG. 4, the side frame member 22 has a larger material thickness towards the interior; it is thus suitable to ensure that fastening means are entered into this area.

Specifically, this is ensured in that at least one opening 622, 628 in each of the first and second section 621, 626 spans the respective offset **621*a*, 626*a*. The aperture 620 of the first section 621 spans the bend 614 and the engagement means 629 of the second section 626 is accommodated in the part of the aperture 620 spanning the bend 614 when in the inactive position. The first bracket leg 61 comprises one or more openings 612, 613 to receive fastening means in the mounted condition of the mounting bracket 6 on the frame 2 of the roof window 1 for fastening the mounting bracket 6** to the roof structure.

As mentioned in the above, the mounting bracket 6 has a supply condition in which the second engagement means 629 is in its inactive position. In order to ensure that the mounting bracket 6 is brought to an installation condition and subsequently mounted in the correct height position, i.e. the one shown in FIG. 4, the second section 626 is provided with a protrusion **626*b* configured to face outwards, away from the outer side of the frame member in the mounted condition when the engagement means 629 of the second section 626 is in its active position, and to face inwards, towards the outer side of the frame member in the mounted condition when the engagement means 629 of the second section 626 is in its inactive position. In this way, the protrusion 626*b* acts as a guard to prevent that an installer does not bring the second section 626 with the second engagement means 629 to its active position and/or positions the mounting bracket 6 at a more interior position on the side frame member 22, since the protrusion 626*b* will in that case come into contact with the outer side of the side frame member 22** such that face contact is not possible.

In the event that it is in fact desired to position the mounting bracket 6 further to the interior in the height direction of the side frame member 22, it is possible to provide a further receiving structure (not shown) in the outer side of the side frame member 22 to accommodate the protrusion **626*b* of the second section 626 while the first engagement means 624 is received in the second outer groove 27*b***.

Figure 3:
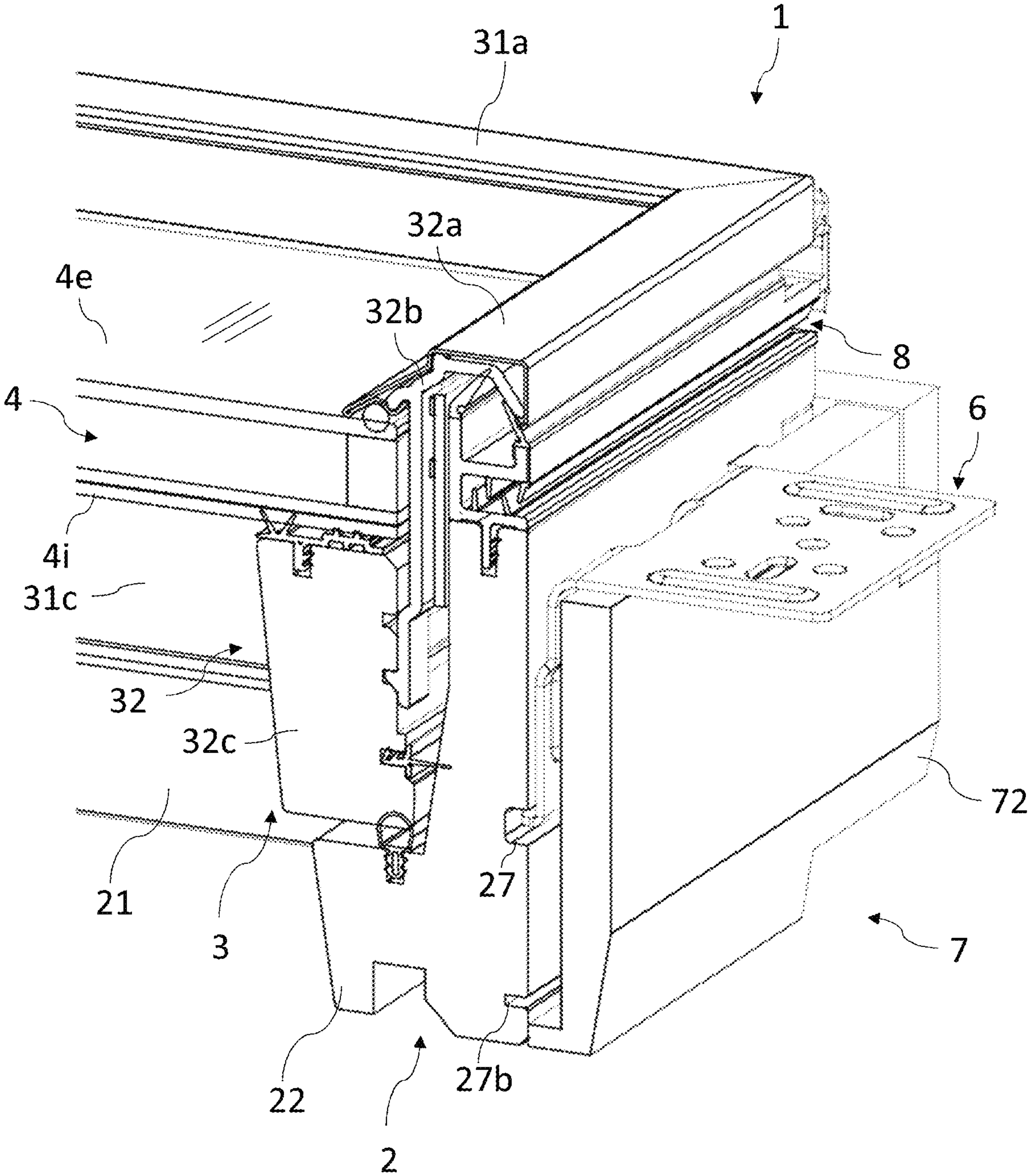
FIG. 3 is a perspective cross-sectional view of a side of a roof window in another embodiment, with a mounting bracket, corresponding to a cross-section along the line Ill-Ill in FIG. 2.
Figure 4:
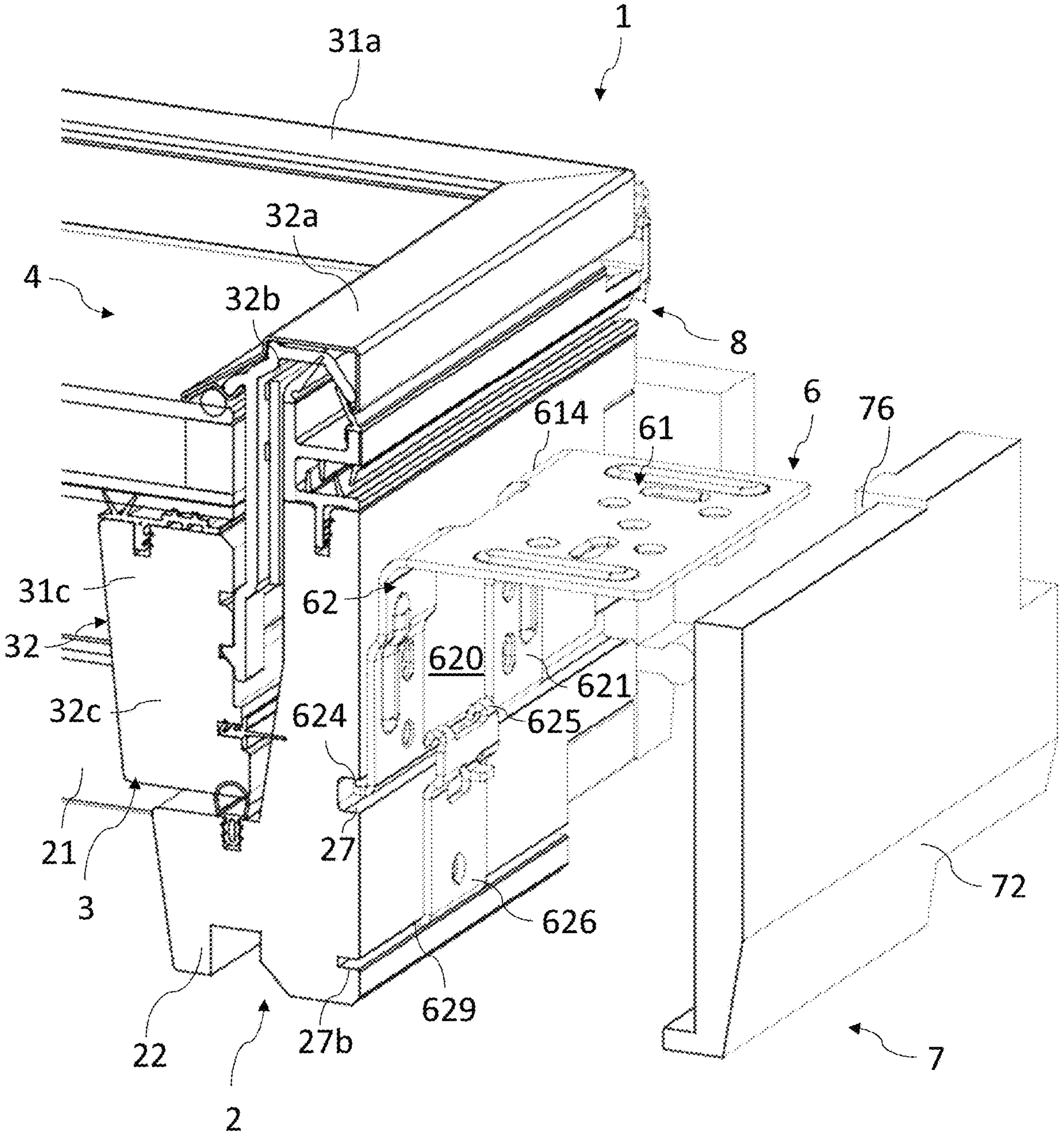
FIG. 4 is a view corresponding to FIG. 3, with an insulating frame piece shown exploded.

Also visible in FIGS. 3 and 4 is an interface unit 8 mounted to the frame 2 and having multiple functions relative to other components of the roof window 1, including acting as sealing towards the sash 3 and for accommodating auxiliary equipment including a covering assembly (not shown) providing a weather-tight transition to the surrounding roofing.

Hinge Assembly, First Operational Condition—FIGS. 7 to 14

Figure 7:
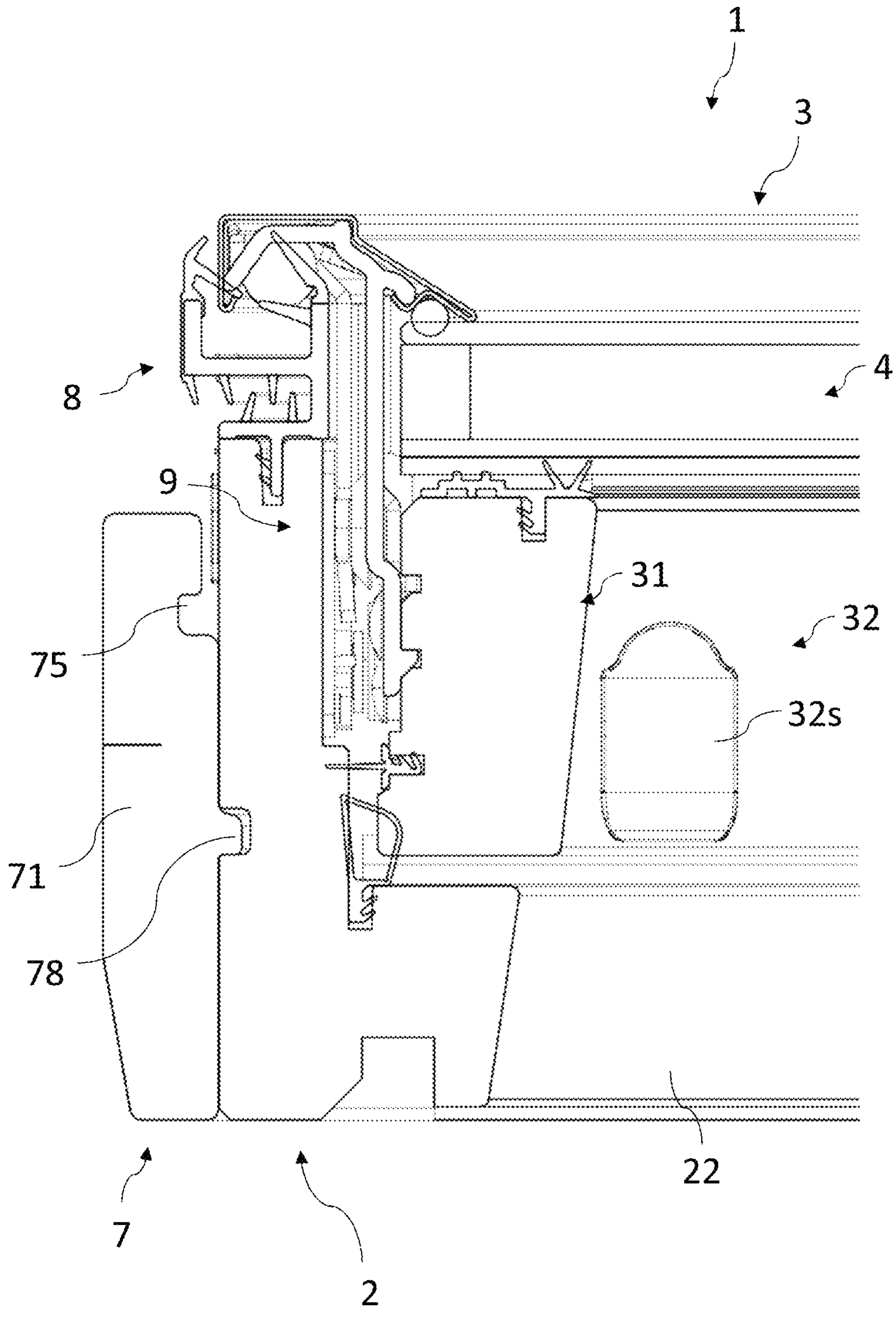
FIG. 7 is a cross-sectional view of a roof window in a further embodiment, corresponding to a cross-section along the line VII-VII in FIG. 2.
Figure 8:
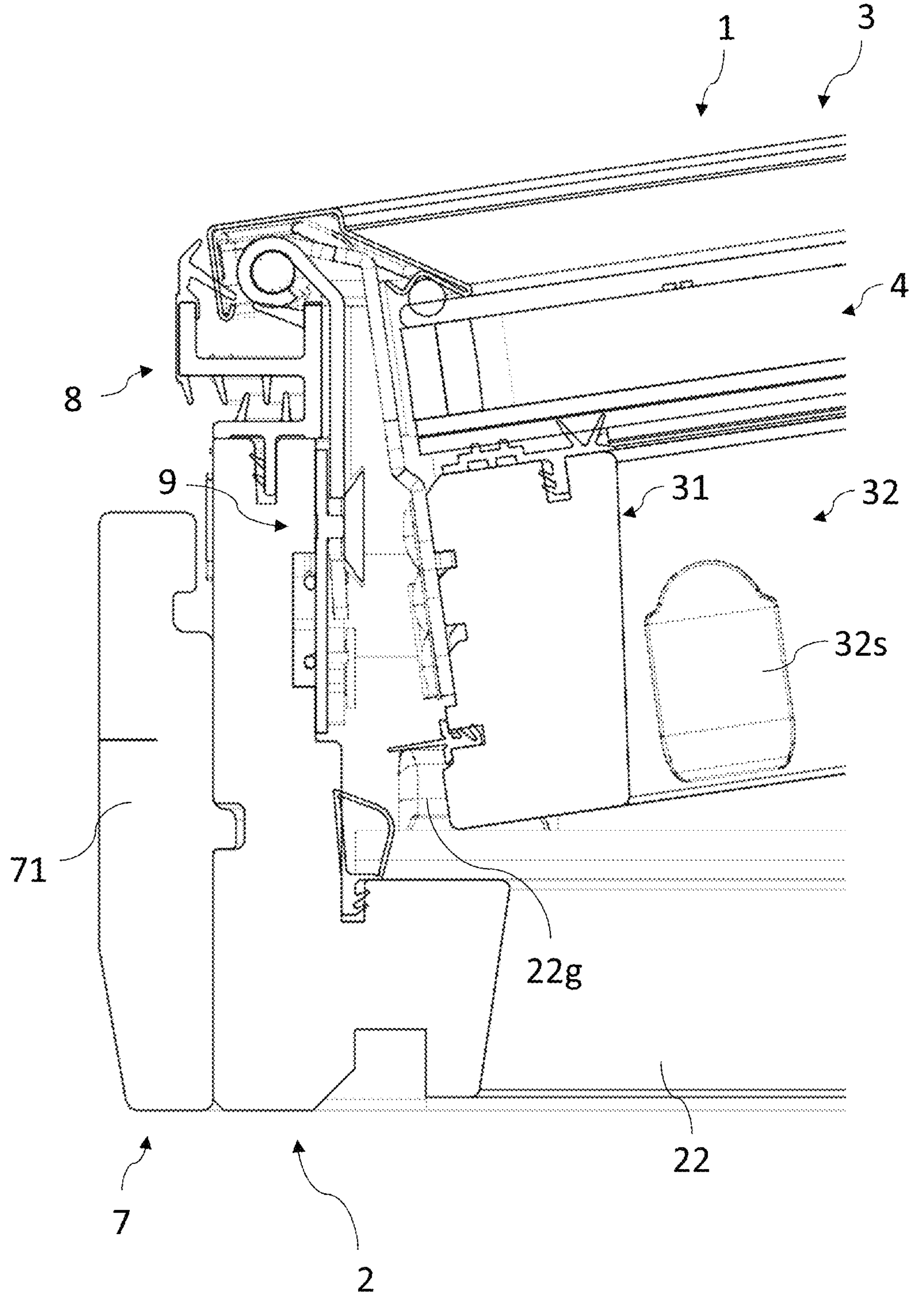
FIG. 8 is a view corresponding to FIG. 7, with the sash in an open position.

Referring first to FIGS. 7 and 8 it is shown that the roof window 1 furthermore comprises a hinge assembly 9.

The hinge assembly 9 is configured in such a way that it allows the sash 3 to be tophung in a first operational condition corresponding to normal use. That is, during normal use the sash 3 is rotated about a substantially horizontal first hinge axis α at or near the top frame member 21 and top sash member 31 between a closed position and an open position.

Figure 12:
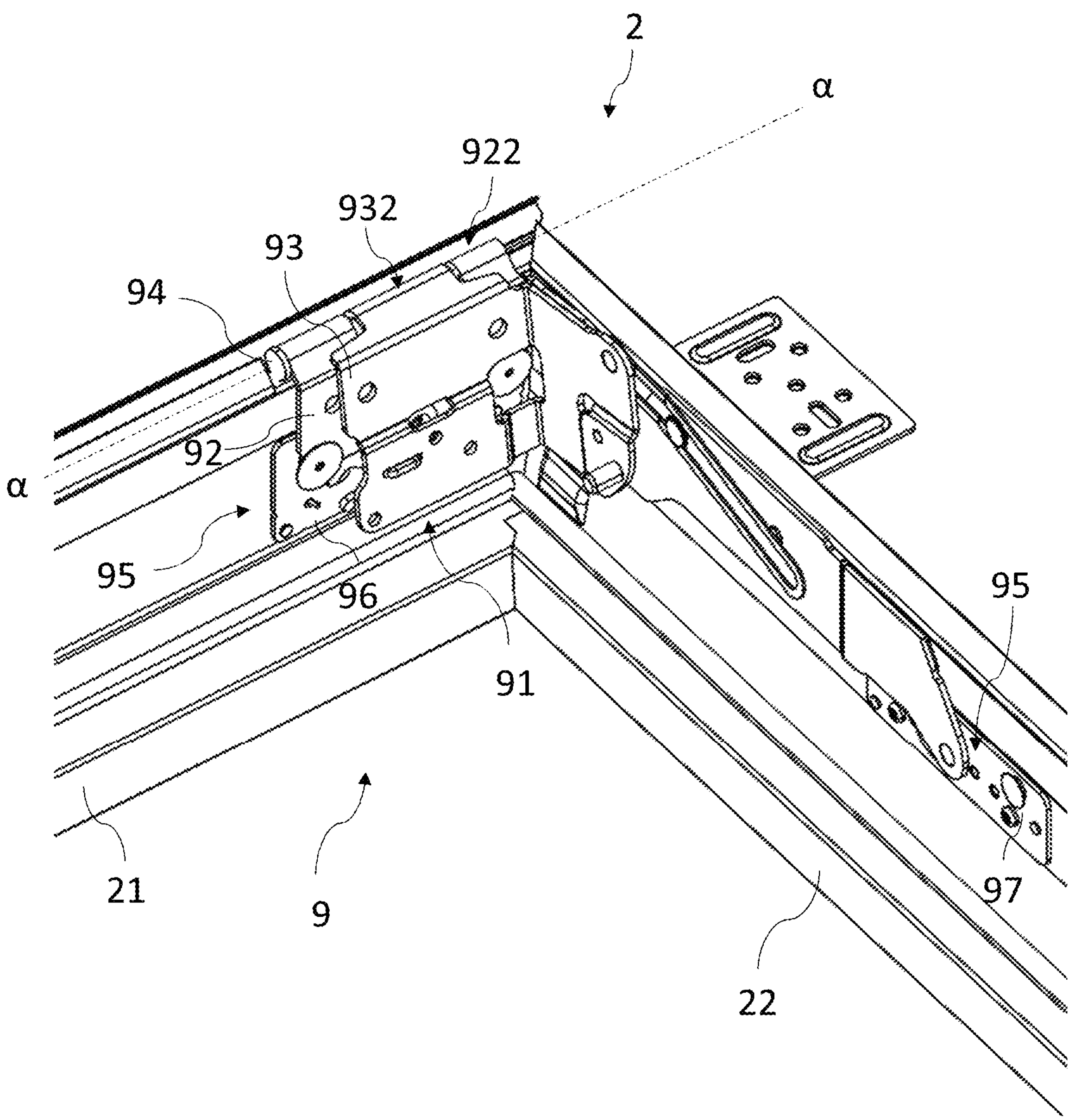
FIG. 12 is a partial perspective view of a roof window in an embodiment incorporating a hinge assembly, with the sash removed and with the hinge assembly in a position corresponding to an open position of the sash.
Figure 13:
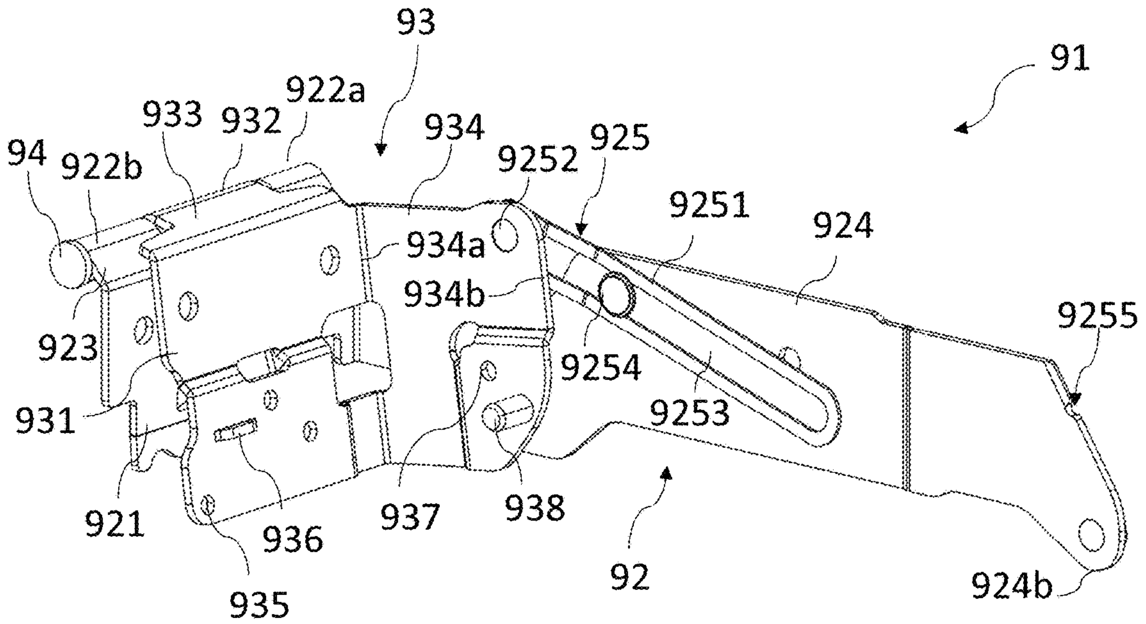
FIGS. 13 and 14 are perspective views from different angles of a hinge unit forming part of the hinge assembly of the embodiment of FIG. 12.
Figure 14:
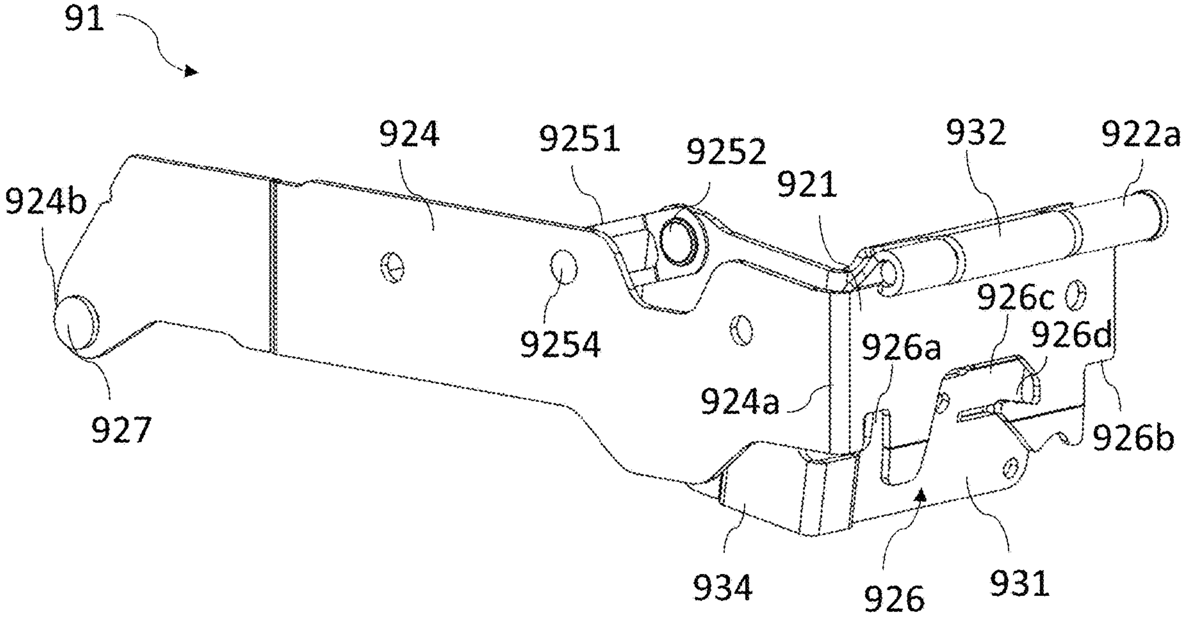
Figure 15:
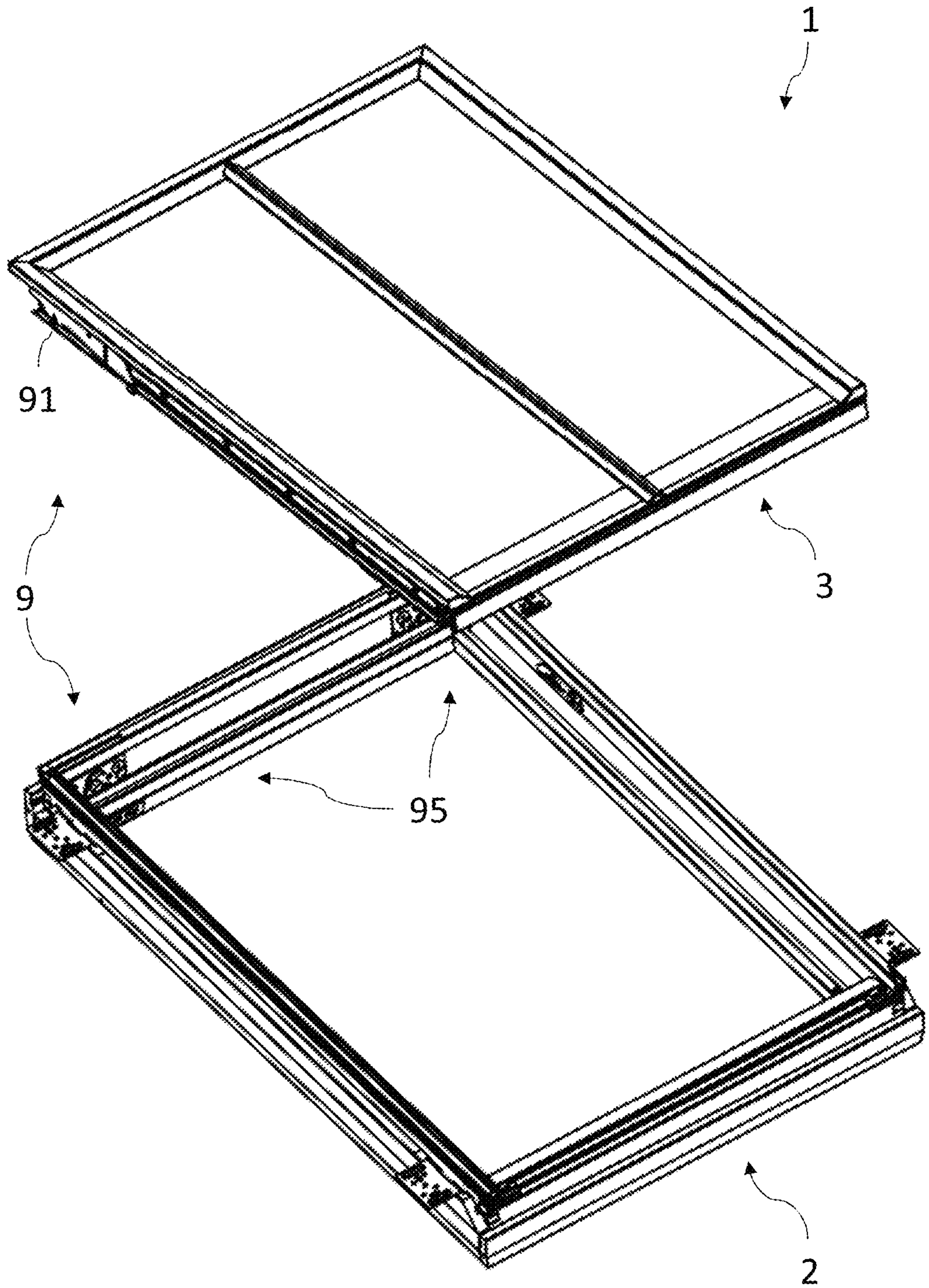
FIG. 15 is an exploded perspective view of a roof window in an embodiment incorporating a hinge assembly.
Figure 16:
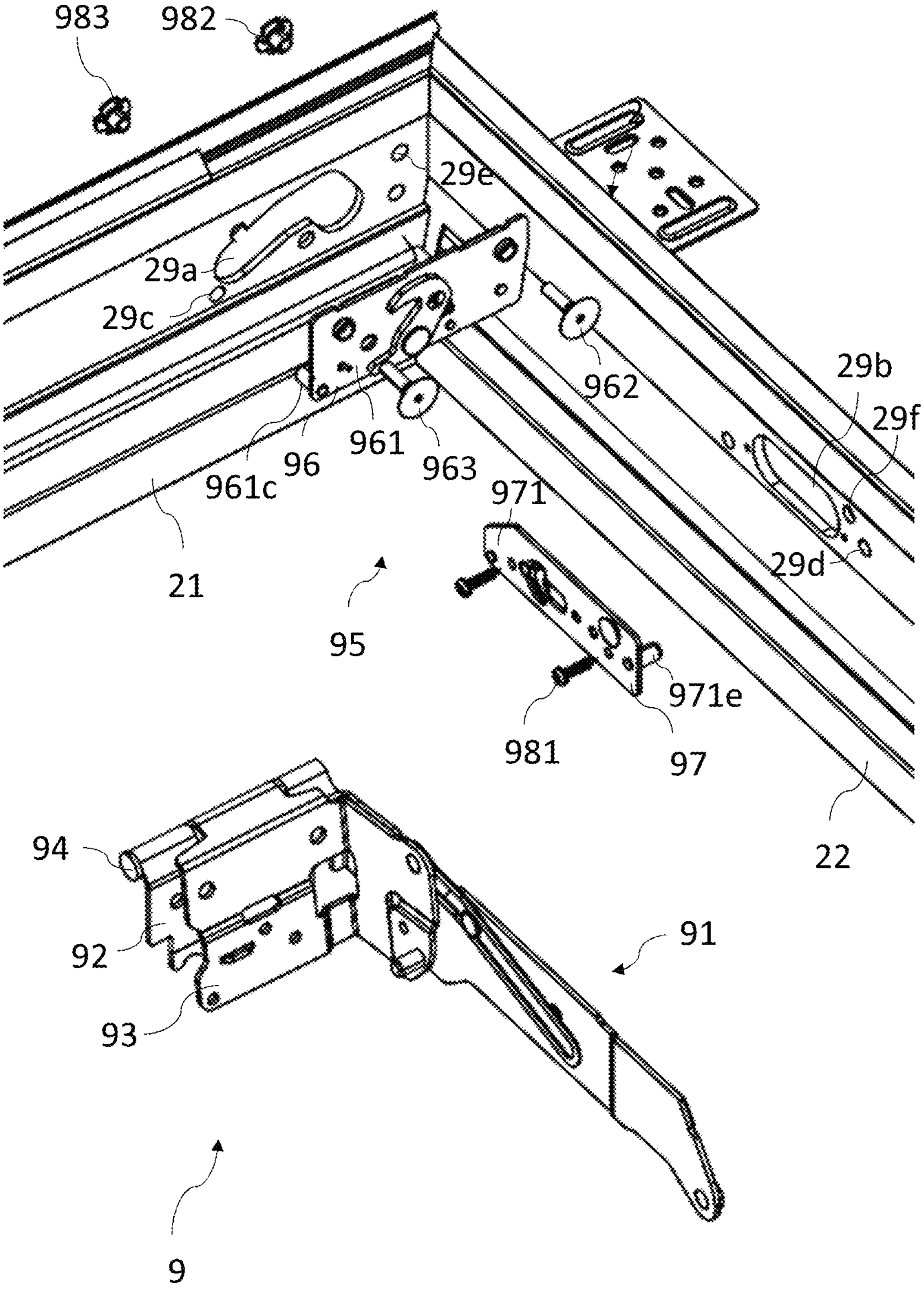
FIG. 16 is a view corresponding to FIG. 12, with some parts shown exploded.
Figure 17:
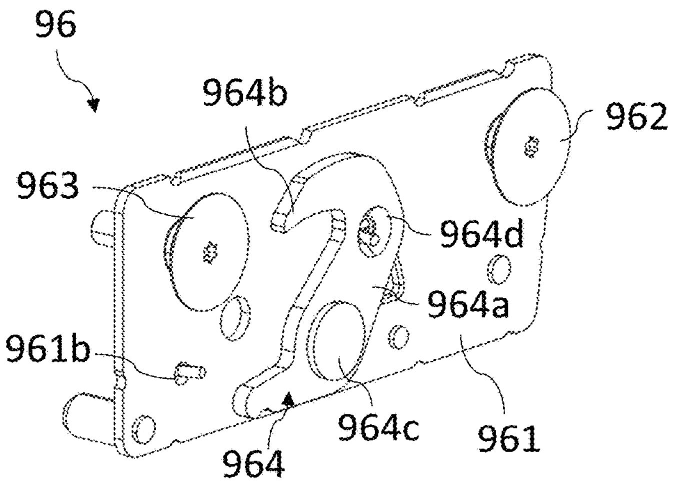
FIGS. 17 to 20 are perspective views from different angles of components of a coupling unit forming part of the hinge assembly of the embodiment of FIG. 12.
Figure 18:
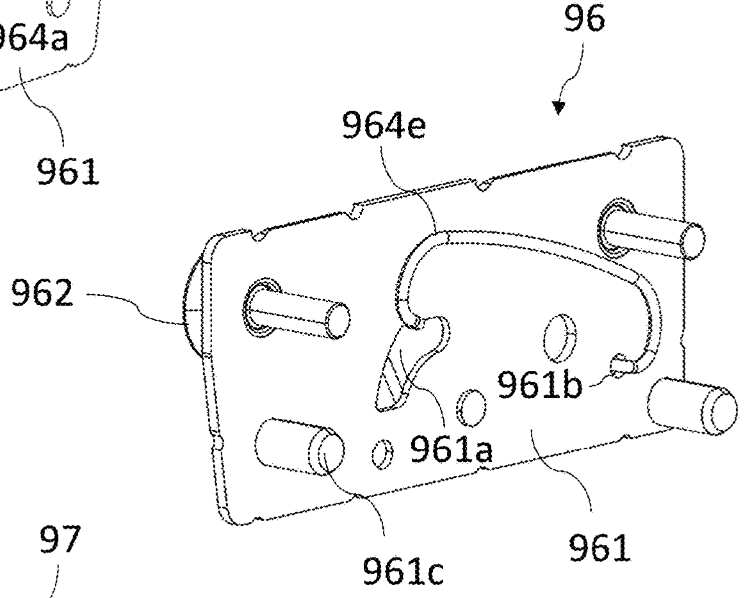

Referring now also to FIGS. 12 to 14, it is seen that the hinge assembly 9 comprises a hinge unit 91 with a frame hinge part 92 connected to or connectable to at least the top frame member 21, a sash hinge part 93 connected to at least the top sash member 31, and a hinge pin 94 connecting the frame hinge part 92 with the sash hinge part 93.

The term "connected to" implies that the component in question is in a condition, state or position in which the component in question is in fact connected to a part, whereas "connectable to" is intended to encompass such conditions, states and positions in which the component in question may be connected to the relevant part, but is not necessarily in connection with the part. In the description of FIGS. 12 to 14, the frame hinge part 92 including any sub-components will be described as being connected to parts of the frame 2. Further below, the possibility of providing the frame hinge part 92 and sub-components as connectable to parts of the frame 2 will be described in more detail.

The frame hinge part 92 comprises a frame hinge base plate 921 connected to an inner side of the top frame member 21 and provided with a receiving structure 922 for the hinge pin 94 defining the hinge axis, and the sash hinge part 93 comprises a sash hinge base plate 931 connected to an outer side of the top sash member 31 and provided with a receiving structure 932 for the hinge pin 94, such that the hinge unit 91 forms a pin-and-barrel hinge.

In the embodiment shown, the receiving structure 922 of the frame hinge part 92 forms a two-part barrel, the barrel parts 922*a*, 922*b* surrounding a barrel 932 formed by the receiving structure of the sash hinge part 93. A gap is provided between the barrel 932 of the sash hinge part 93 and the barrel parts 922*a*, 922*b* to accommodate manufacturing tolerances.

The frame hinge base plate 921 is substantially parallel to the inner side of the top frame member 21 in the mounted condition, and the sash hinge base plate 931 is substantially parallel to the frame hinge base plate 921 in the closed position of the sash 3.

Furthermore, the receiving structure 922 of the frame hinge part 92 is connected to the frame hinge base plate 921 via an inclined section 923, and the receiving structure 932 of the sash hinge part 93 is connected to the sash hinge base plate 931 via an inclined section 933, such that the first hinge axis α is offset outwards relative to the base plate 921 of the frame hinge part 92.

Although not shown in these drawing figures, the hinge assembly 9 may comprise a set of hinge units 91 connected to or connectable to top corners of the frame 2 and sash 3, such that one hinge unit 91 is connected to top corners of the top frame member 21 and one side frame member 22, and the top sash member 31 and one side sash member 32, and another, preferably mirror-inverted, hinge unit is connected to or connectable to top corners of the top frame member 21 and the other side frame member 23, and the top sash member 31 and the other side sash member 33.

While each hinge unit 91 could in principle be connected only to the top frame member 21 and top sash member 31, the embodiment shown provides for connection also to the adjoining side frame member and side sash member as well. Thus, the frame hinge base plate 921 is connected to a frame hinge side flange 924, here in a one-piece integral connection, and the frame hinge side flange 924 is connected to an inner side of the side frame member 22. Some portions of the frame hinge base plate 921 and the frame hinge side flange 924 are offset from other portions, but in general, the frame hinge side flange 924 extends substantially perpendicularly to the frame hinge base plate 921 from a transition section 924*a* to a free end section 924*b*.

Correspondingly, the sash hinge base plate 931 is connected to a sash hinge side flange 934, preferably in a one-piece integral connection, and wherein the sash hinge side flange 934 is connected to an inner side of a side sash member 32. As for the frame hinge portion 92, the sash hinge side flange 934 generally extends substantially perpendicularly to the sash hinge base plate 931 from a transition section 934*a* to a free end section 934*b*, but some portions may be offset from other portions.

At the free end section 924*b* of the frame hinge side flange 924, a secondary hinge pin 927 is provided (shown in FIG. 14). In this way, the hinge assembly 9 provides for means to allow the sash 3 to be rotated about a substantially horizontal second hinge axis β at a distance from the top frame member 21 and top sash member 31.

The hinge assembly 9 thus makes it possible to put the roof window 1 in a second operational condition in which a plurality of additional open positions are achievable. As will be described further on in the description, means are provided to allow decoupling of the frame hinge base plate 921 from the top frame member 21 so as to allow the sash 3 to rotate about the second hinge axis β.

In order to ensure that the movement of the sash 3 is restricted, the hinge unit 91 may be provided with opening restricting means. In the embodiment shown, two independent opening restricting means are present, but other configurations including only one opening restricting means are conceivable.

A first opening restrictor 925 is provided by an arm 9251 rotatably connected to a sash or frame member, and the arm 9251 comprises a track 9253 engaging with a pin 9254 on a frame or sash member. The arm 9251 is rotatably connected to the sash hinge side flange 934 in a rotatable joint 9252, and wherein the pin 9254 interacting with the track 9253 is provided on the frame hinge side flange 924.

A second opening restricting means is foreseen in that an abutment notch 9255 is provided on the frame hinge side flange 924 and configured to cooperate with a stop pin 971*g* provided at the side frame member 22, in the embodiment shown on a side frame coupling plate 97 (FIG. 19) to be described in more detail below. The stop pin could alternatively be provided on the side frame member 22 itself.

While the coupling of the frame hinge part 92 to the top and side frame members by means of a coupling unit 95 will be described under a separate heading below, the connection between the sash hinge part 93 and the top and side sash members is less complicated:

The sash hinge part 93 comprises a plurality of fastening means to allow connection of the sash hinge part 93 to the sash 3, preferably comprising one or more holes 935 in the sash hinge base plate 931, one or more holes 937 in a sash hinge side flange 934 and/or a spigot 938 in the sash hinge side flange 934. The top sash member 31 and side sash members 32, 33 comprise suitable receiving means (not shown).

Further details visible in the figures describing the first operational condition of the roof window include guiding elements 22*g* (see FIG. 8) and 32*g* (see FIG. 11), which ascertain that the sash 3 is aligned relative to the frame 2 when closing the sash such that any skewness occurring in the open position of the sash 3 is eliminated.

Figure 11A:
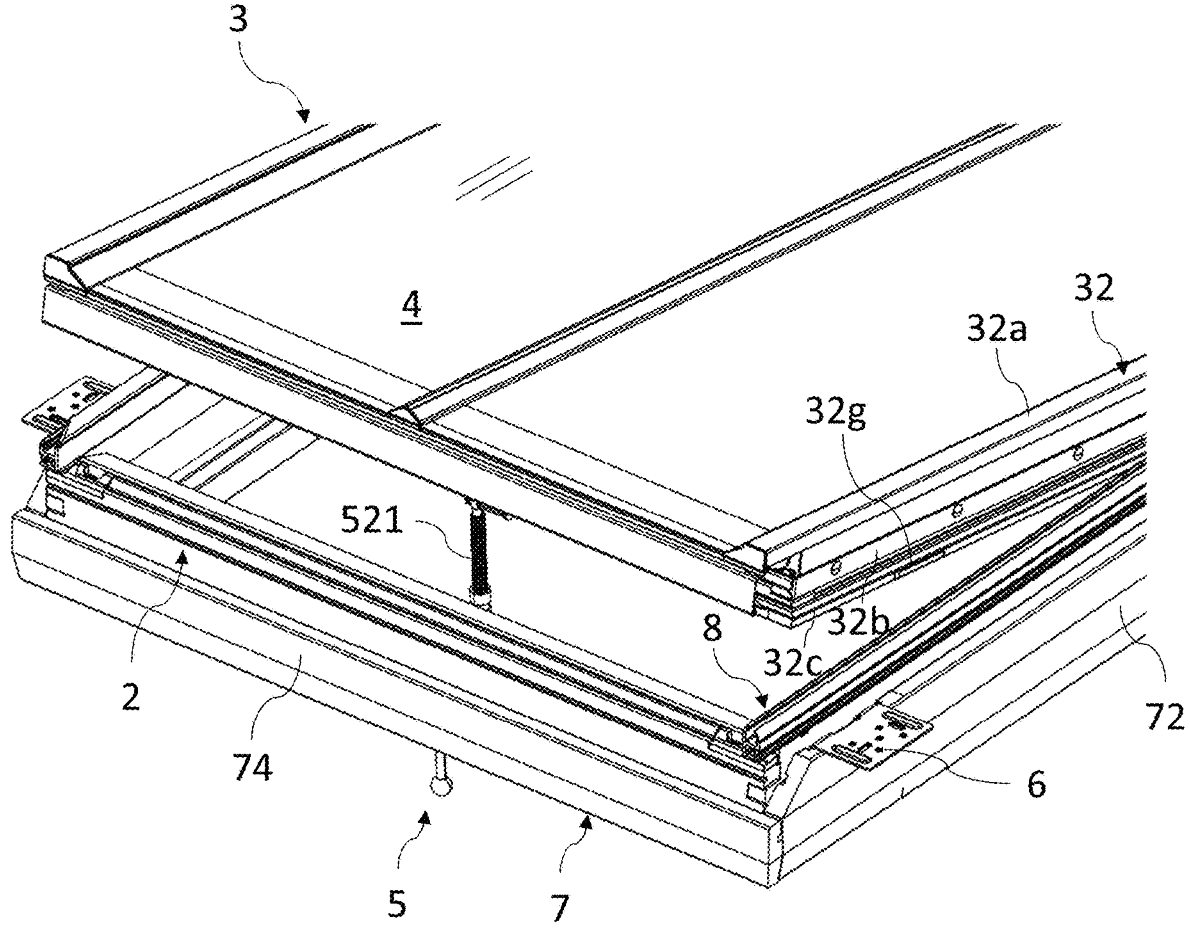
FIG. 11*a* is a partial perspective view of the roof window of FIG. 10, seen from an exterior side.
Figure 11B:
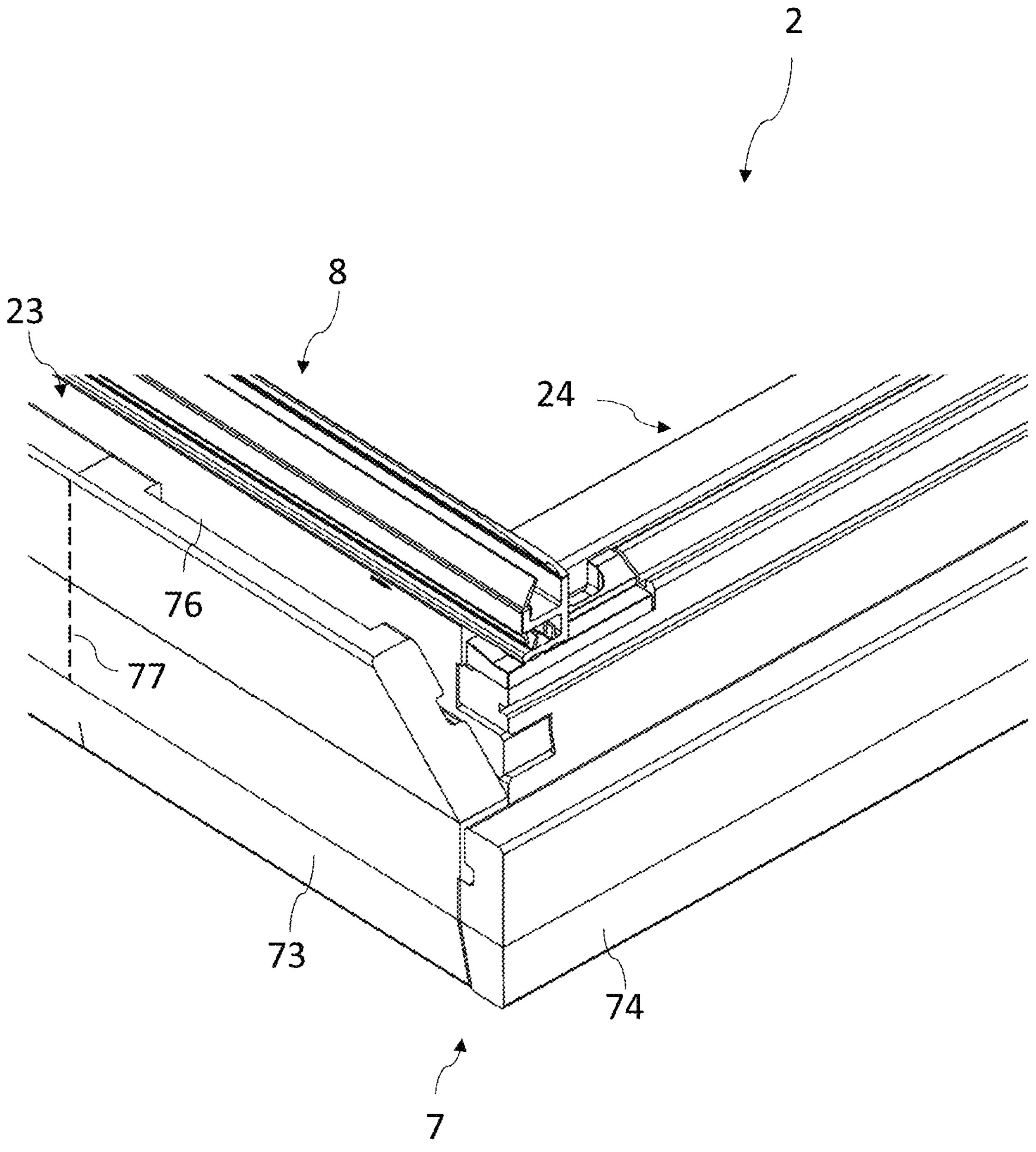
FIG. 11*b* is a partial perspective sectional view of the frame of the roof window of FIG. 10, together with an insulating frame.

Details of the insulating frame 7 are also shown in these figures; these include a top piece 71, side pieces 72, 73, and a bottom piece 74. In the embodiments shown, each such insulation frame piece comprises a protrusion 78 to be received in the outer side of the respective frame member, and an indentation 75 to interact with auxiliary equipment in the form of an underroof collar described in more detail in Applicant's co-pending patent applications filed on the same date as the present application. With particular reference to FIG. 11*b*, a recess 76 is shown which makes place for the mounting bracket 6 to be mounted on the side frame member 23 of the frame 2, and a folding line 77 which allows folding back of part of the side piece 73 of the insulating frame 7 to allow access to the outer side of the side frame member 23. At least the side pieces 72, 73 of the insulating frame 7 are provided with such recesses 76 and folding lines 77 at or near the location of the intended positions of the mounting brackets 6 of the set of mounting brackets supplied with the roof window 1.

Finally, a number of features visible in the figures but not immediately related to the present invention include the configuration of members of the sash 3, namely to include a profile element, an intermediate element and an inner element, and of the bottom frame member 24 including an outer piece 24*a*, a separate inner piece 24*b*, a cover 24*c* and an insulating piece 24*d*. Details of the configuration are described in more detail in Applicant's co-pending patent application filed on the same date as the present application. Exemplary elements include a profile element 31*a*, intermediate element 31*b* and inner element 31*c* of the top sash member 31, profile element 32*a*, intermediate element 32*b* and inner element 32*c* of the side sash member 32, and profile element 34*c* and inner element 34*c* of the bottom sash member 34. A screening mounting bracket 32*s* is visible in FIGS. 7 and 8, by which it is possible to install an interior screening device (not shown) in the sash 3 to provide screening of the pane 4.

Operating Assembly and Transportation Fitting—FIGS. 9 to 11*b* and 36 to 39

During normal use, i.e. when the roof window 1 has been installed, and a user wishes to put the sash 3 in a ventilating position, the opening, closing and parking may be carried out by the assistance of an operating assembly, for instance as the shown manual handwinder or screwjack constituting the operating assembly 5.

Figure 9:
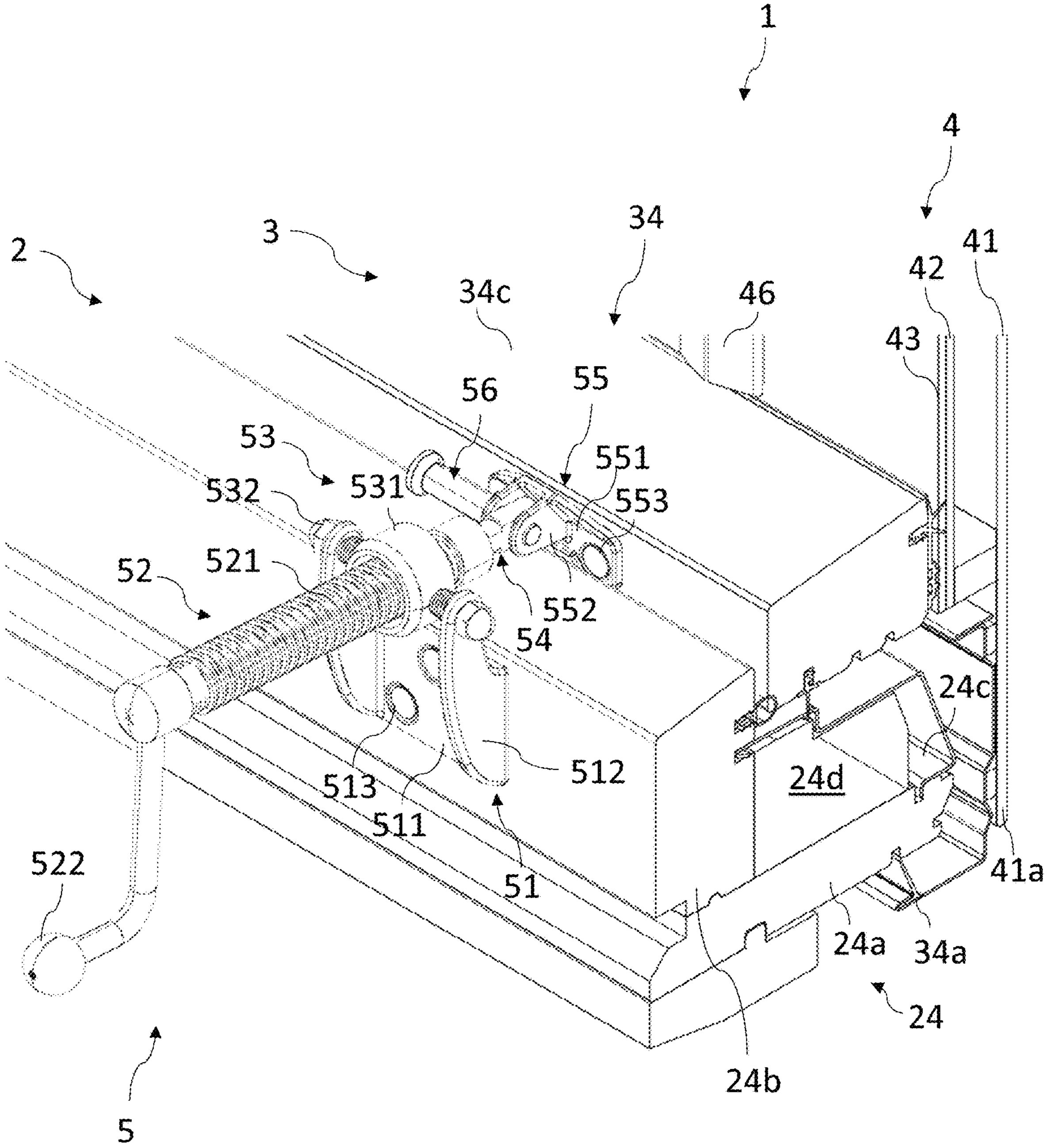
FIG. 9 is a perspective cross-sectional view of a roof window in an embodiment incorporating an operating assembly, corresponding to a cross-section along the line IX-IX in FIG. 2.
Figure 10:
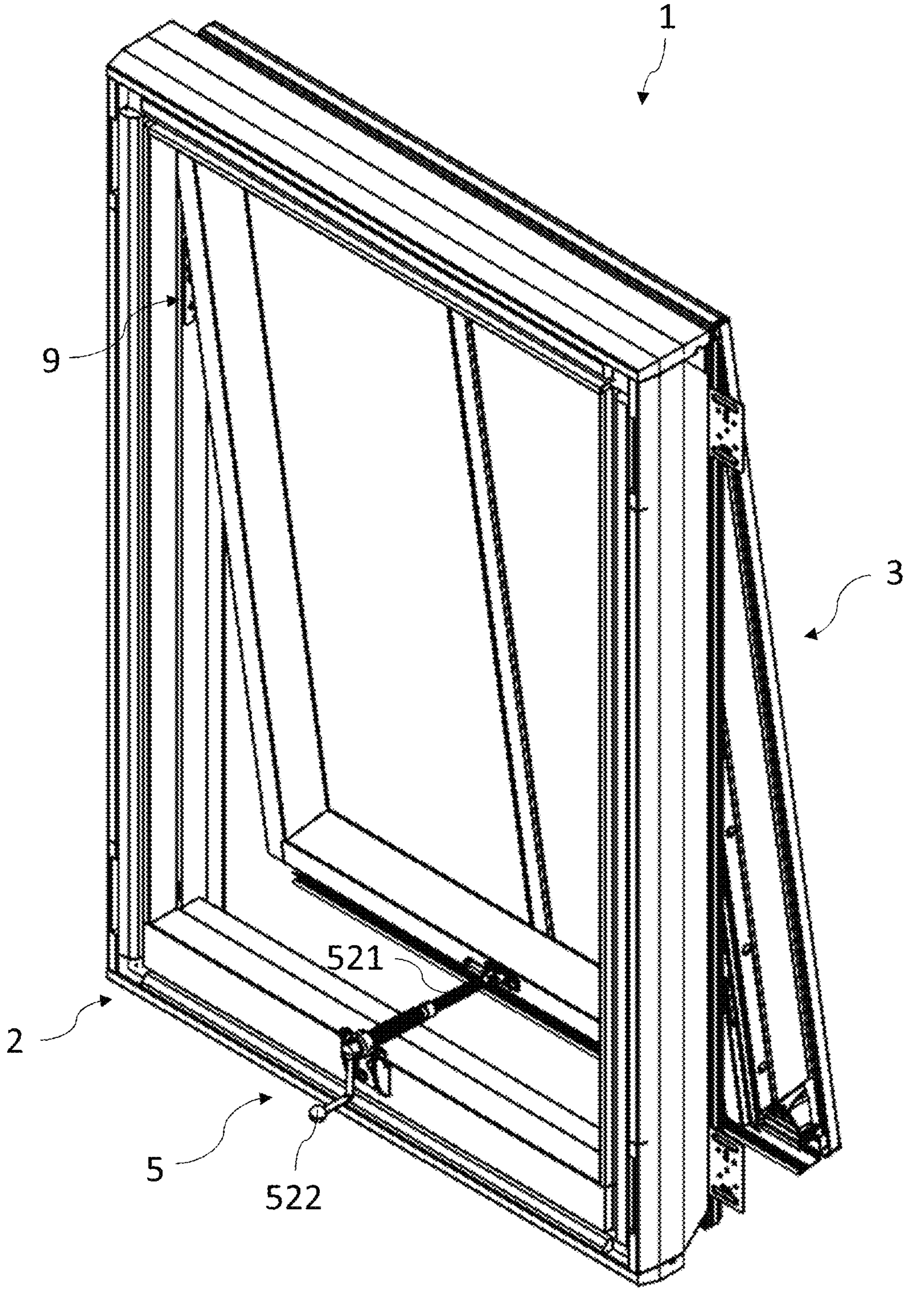
FIG. 10 is a perspective view of a roof window in an embodiment incorporating an operating assembly, seen from an interior side, and in an open position of the sash, in a first operational condition of the roof window.

Referring first to FIG. 9, the operating assembly 5 comprises a sash fitting 55, a spindle part 52 with a spindle 521 connected to a socket fitting 51 via a nut part 53, and a handle 522, the sash fitting 55 being connected to the bottom sash member 34 and the socket fitting 51 being connected to the bottom frame member 24 in a mounted condition of the operating assembly, such that upon rotation of the spindle part 52 relative to the nut part 53, the bottom sash member 34 is moved relative to the bottom frame member 24.

In the embodiment shown, in which the roof window 1 defines a supply condition which is suitable for packaging and transportation, the sash fitting 55 is connected to the bottom sash member 34 of the roof window 1 whereas the spindle part 52 with the nut part 53 and the socket fitting 51 are provided separately from the roof window 1.

The nut part 53 comprises a nut ring 531 connected to a set of flanges 512 protruding from a base plate 511 of the socket fitting 51, here by means of a set of bolts 532.

The operating assembly 5 furthermore comprises a split 56 associated to the sash fitting 55, the split 56 being displaceable between an active position in which it is in engagement with a set of openings 553 in a set of flanges 552 protruding from a base plate 551 of the sash fitting 55 and an inactive position to reveal a reception gap between the flanges 552 of the sash fitting 55.

The spindle part 52 comprises an end portion 54 configured to cooperate with the sash fitting 55 in the mounted condition.

Figure 39:
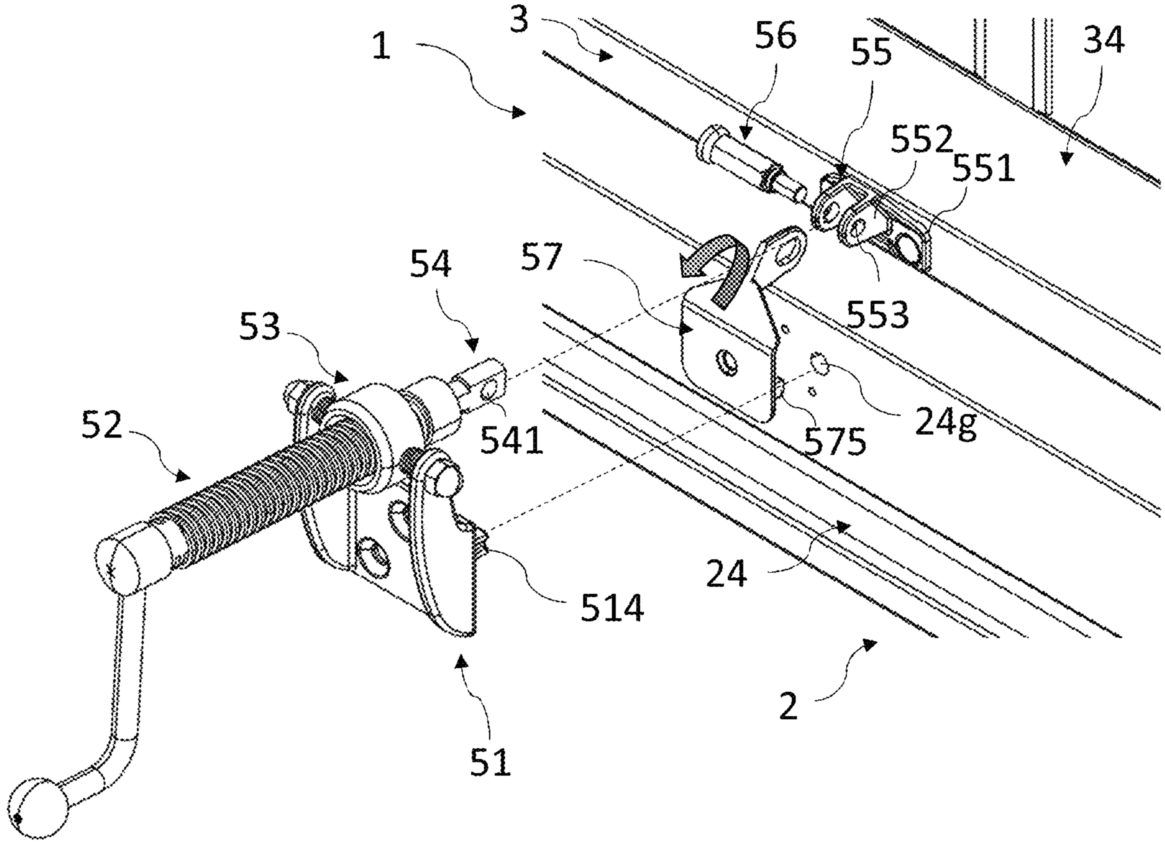
FIG. 39 is an exploded partial perspective view of a bottom part of the roof window in the embodiment of FIG. 36, showing the replacement of the transportation fitting with the operating assembly.

Referring now also to FIG. 39, the end portion 54 of the spindle part 52 is provided with an opening 541 configured to cooperate with the split 56 in the mounted condition.

The socket fitting 51 is provided with at least one guide protrusion 514 configured to be accommodated in at least one corresponding guiding hole 24*g* of the bottom frame member 24 in the mounted condition of the operating assembly 5.

Figure 36:
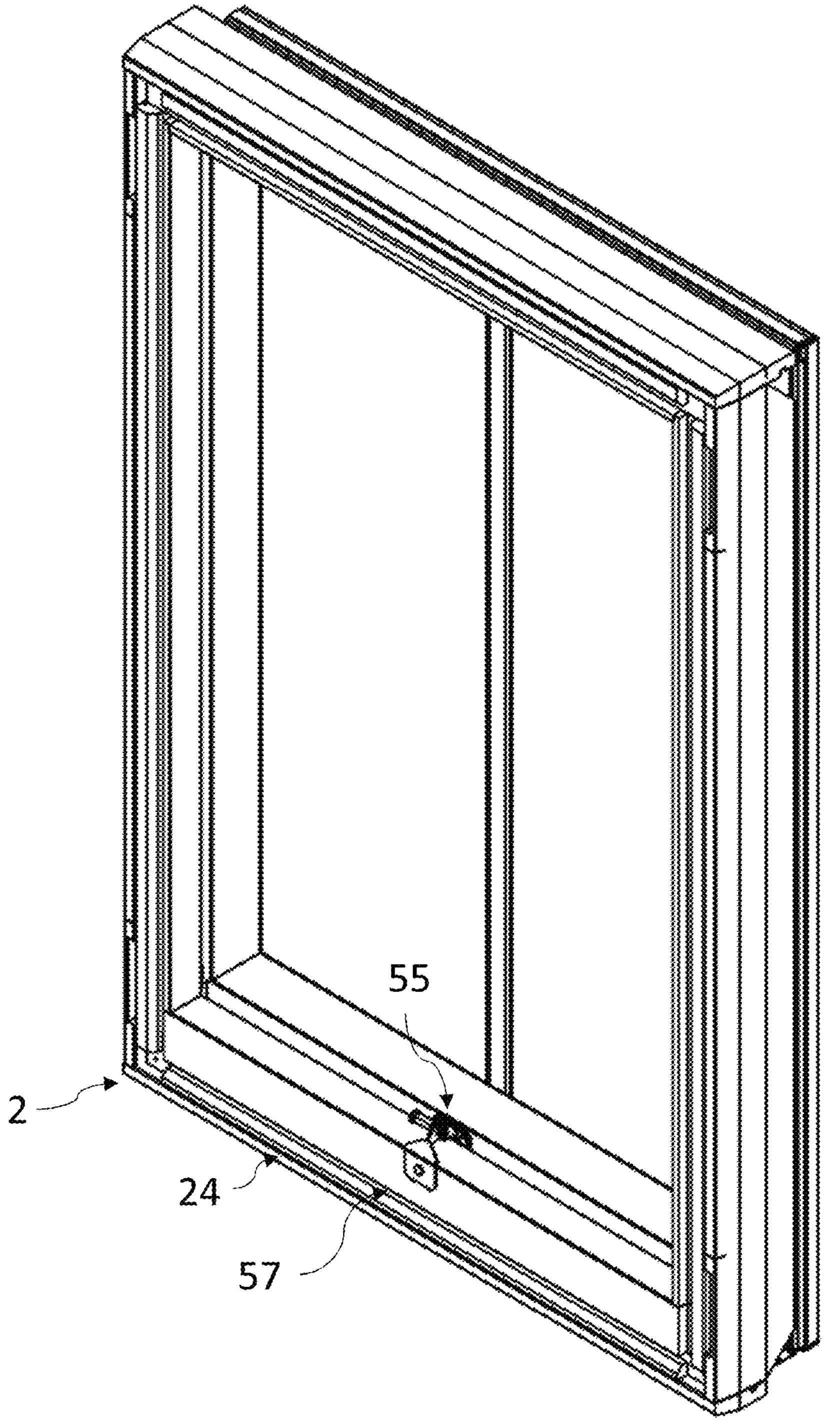
FIG. 36 is a perspective view of a roof window in an embodiment incorporating an operating assembly and a transportation fitting, seen from an interior side.

As shown in FIG. 36, in the supply condition of the roof window 1, a transportation fitting 57 is connected to the sash fitting 55 and to the bottom frame member 24 such that the sash 3 is held stationary relative to the frame 2.

Figure 37:
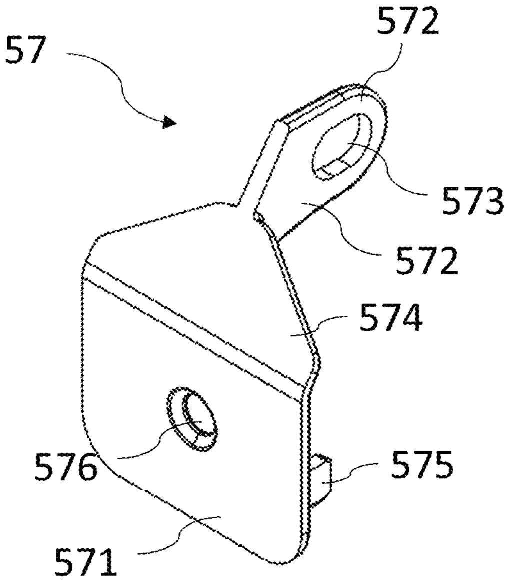
FIGS. 37 and 38 are perspective views from different angles of the transportation fitting in the embodiment of the embodiment of FIG. 36.
Figure 38:
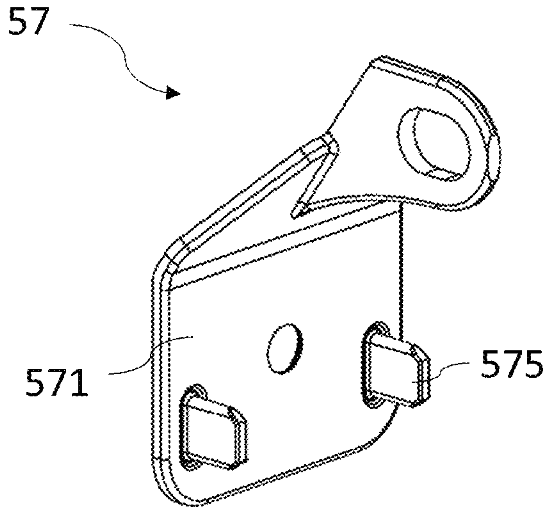

Referring now also to FIGS. 37 and 38, the transportation fitting 57 comprises a base portion 571 configured to abut an inner side of the bottom frame member 24 and an anchor portion 572 with an aperture 573 cooperating with the split 56 associated with the sash fitting 55 in the supply condition of the roof window 1, said anchor portion 572 extending substantially perpendicularly to the base portion 570.

The transportation fitting 57 comprises an inclined portion 574 forming a transition between the base portion 571 and the anchor portion 572.

In order to ensure correct positioning of the transportation fitting 57, the base portion 571 is provided with at least one guide protrusion 575 cooperating with at least one corresponding guiding hole 24*g* of the bottom frame member 24 in the supply condition of the roof window 1.

To retain the stationary relationship between the sash 3 and frame 2, the base portion 571 is provided with a hole 576 configured to receive fastening means such as a screw to provide the connection of the transportation fitting 57 to the bottom frame member 24.

Coupling Unit—FIGS. 15 to 23

In the following, the coupling unit 95 of the hinge assembly 9 will be described in some detail.

The coupling unit 95 is configured to allow selective coupling of at least the frame hinge part 92 of the hinge unit 91 to the top frame member 21 and optionally to one of the side frame members 22, 23. In the following, the hinge unit 91 will be described as comprising both the frame hinge base plate 921 and the frame hinge side flange 924, and the coupling unit 95 will be described as comprising both a top frame coupling plate 96 and a side frame coupling plate 97. Alternative configurations are conceivable.

To render the selective coupling possible, the frame hinge part 92 is provided with engagement means 926, 927 to cooperate with the top frame coupling plate 96 and the side frame coupling plate 97, respectively, such that the frame hinge base plate 921 of each hinge unit 91 of the hinge assembly 9 is connectable to the top frame coupling plate 96 and the frame hinge side flange 924 is connectable to the side frame coupling plate 97.

The top frame coupling plate 96 comprises a base section 961 connected to an inner side of the top frame member 21. The top frame coupling plate 96 is connected to the top frame member 21 by means of a plurality of fastening means including at least one spigot 961*c* on the base section 961 and two bolt elements functioning also as engagement pins 962, 963 of the engagement means of the top frame coupling plate 96. In this case, each engagement pin 962, 963 cooperates with an insert nut 982, 983 on the outer side of the top frame member 21. To accommodate the top frame coupling plate 96, the top frame member 21 comprises a hinge assembly receiving milling 29*a* and a set of openings 29*c*, 29*e* of which openings 29*e* are through-going openings, or through-holes.

In the embodiment shown, the engagement means 926 of the frame hinge part 92 provided on the frame hinge base plate 921 comprise a set of receiving recesses including two abutment recesses 926*a*, 926*b* to interact with counterpart engagement means on the top frame coupling plate 96 to align the hinge unit 91 relative to the coupling unit 95 in the longitudinal direction of the top frame member 21, preferably also to act as a stop for the hinge unit 91 in the direction towards the interior and in the inwards direction relative to the inner side of the top frame member 21. Here, the counterpart engagement means comprise two engagement pins 962, 963 protruding inwards relative to the base section 961 and relative to the inner side of the top frame member 21.

A further engagement means of the top frame coupling plate 96 comprise a hook element 964 comprising an arm 964*a* with a hook 964*b* and connected to the base section 961 in a rotational joint 964*c*. The hook element 964 is configured to cooperate with a nook section 926*d* of a lock recess 926*c*) formed in the frame hinge base plate 921 and forming part of the set of receiving recesses constituting the engagement means 926 of the frame hinge part 92 to lock the hinge unit 91 relative to the coupling unit 95 in the direction towards the exterior.

The hook element 964 is biased towards a locking position in which the hook 964*b* is lodged in the nook section 926*d* of the lock recess 926*c*. Here, the bias is provided by a spring 964*e* accommodated with one end in a spring-receiving opening 964*d* in the arm 964*a* and with another end in a spring-receiving opening in the base section 961, such that the spring 964*e* passes through an opening 961*a* allowing movement of the spring 964*e* during movement of the hook element 964 from the locking position to an unlocking position in which the hook 964*b* is free of the nook section 926*d*.

The engagement means of the frame hinge part 92 provided on the frame hinge side flange 924 are constituted by the secondary hinge pin 927 to lock the hinge unit 91 to the side frame member 22 in the first operational condition and to allow rotation of the sash 3 in the second operational condition.

By forming each coupling unit 95 with one top frame coupling plate 96 and one side frame coupling plate 97, the coupling unit 95 allows selective coupling of the frame hinge part 92 of the associated hinge unit 91 to the top frame coupling plate 96 and the side frame coupling plate 97 in the first operational condition, and to only the side frame coupling plate 97 in the second operational condition.

The side frame coupling plate 97 comprises a base section 971 connected to the inner side of the side frame member 22, and the engagement means of the top frame coupling plate 96 comprise a key-hole shaped recess 971*r* in the base section 971 of the side frame coupling plate 97. The key-hole shaped recess is configured to cooperate with a secondary hinge pin 927 to engage and lock the hinge unit 91 to the side frame member 22 in the first operational condition and to allow rotation of the sash 3 about the substantially horizontal second hinge axis β in the second operational condition.

Figure 19:
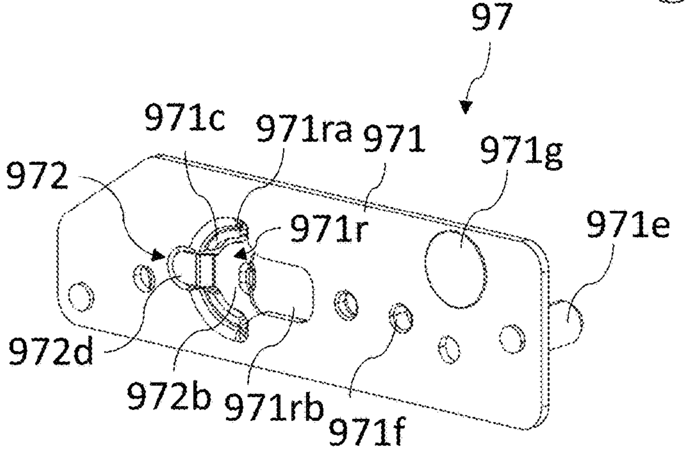
Figure 20:
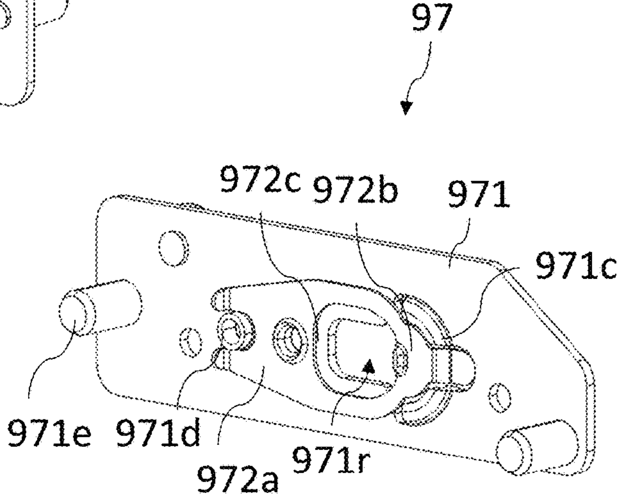
Figure 21:
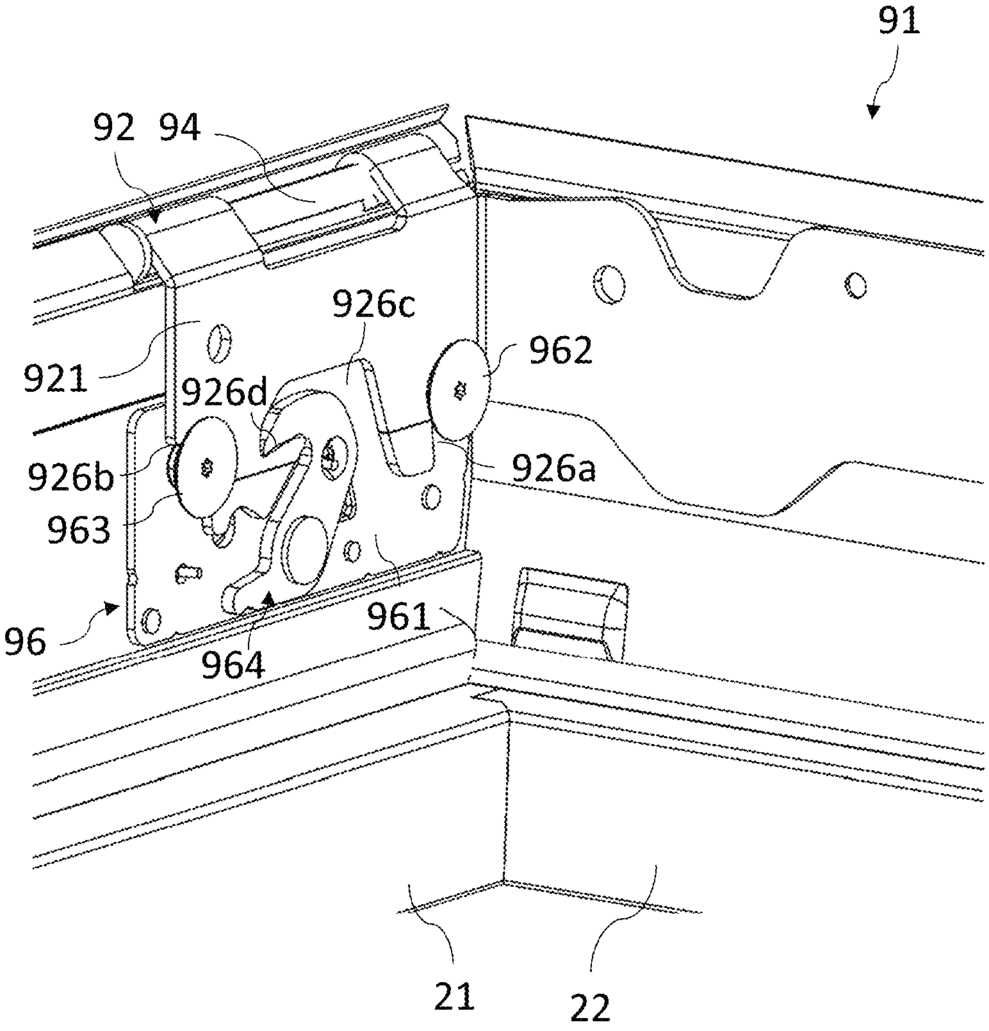
FIG. 21 is a partial perspective views of details of the hinge assembly shown in FIG. 12, some parts of the hinge assembly being removed for better viewing.
Figure 22:
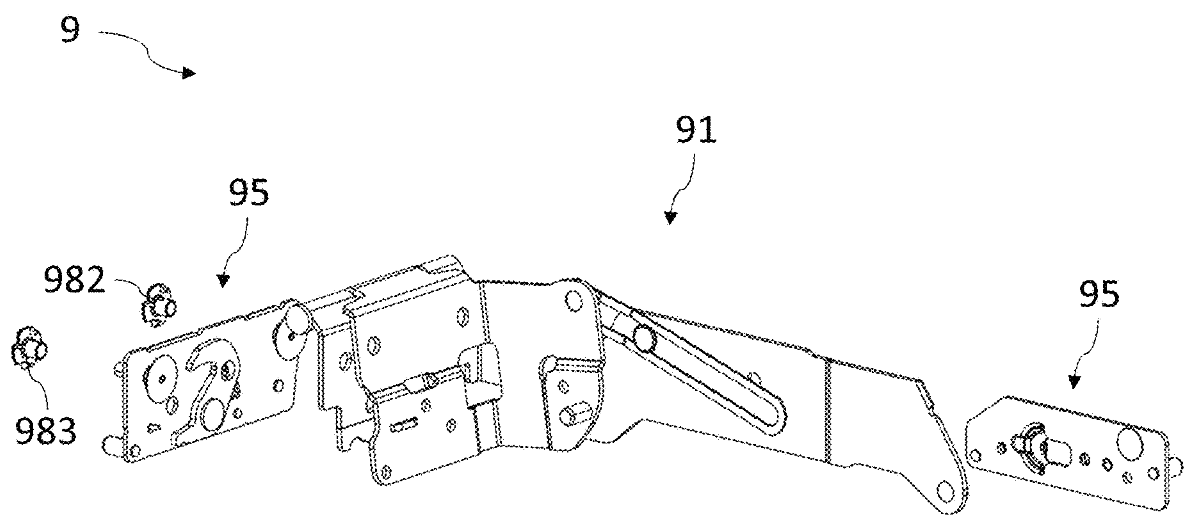
FIGS. 22 and 23 are exploded perspective views from different angles of the hinge assembly shown in FIG. 12.
Figure 23:
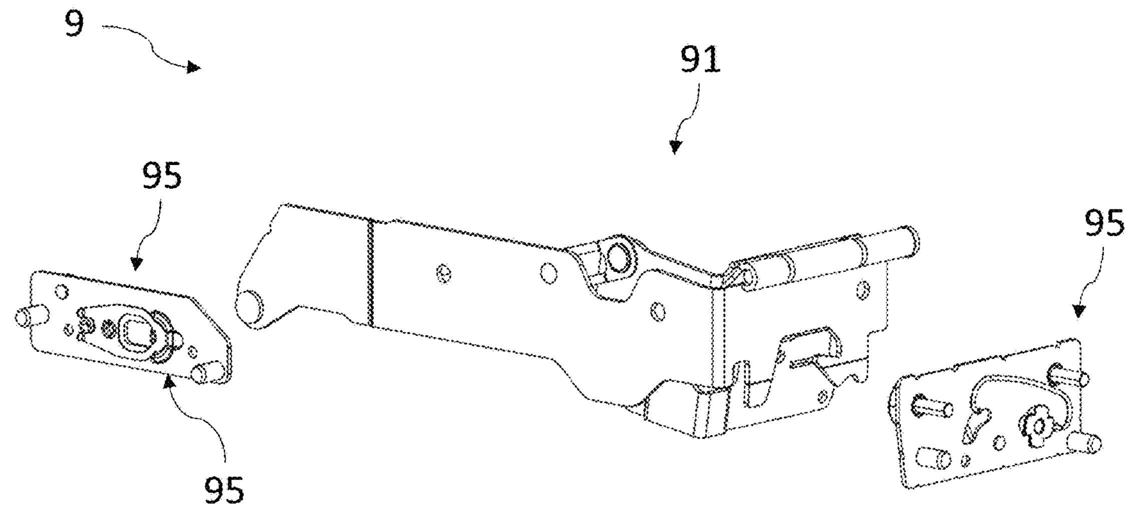
Figure 24:
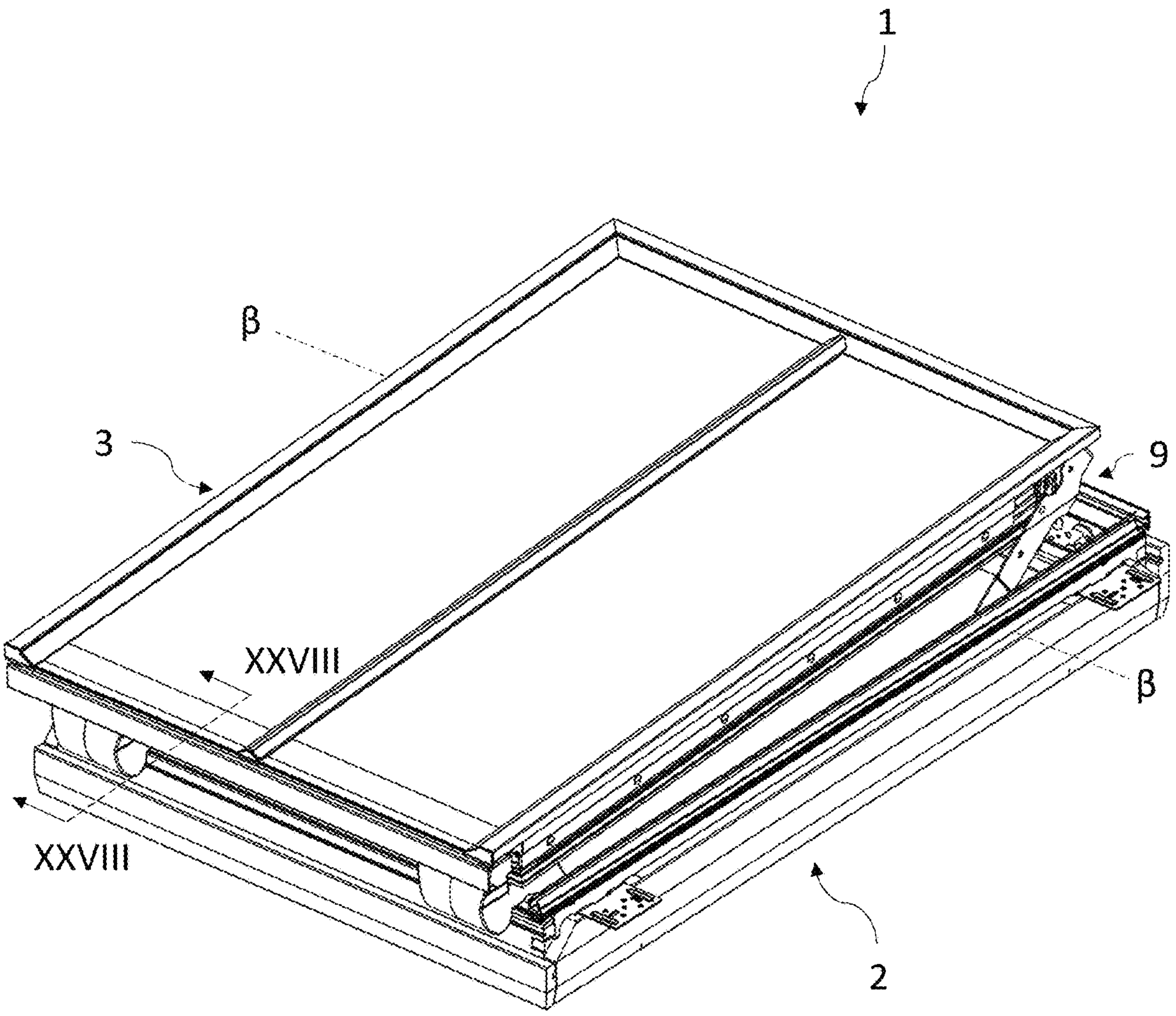
FIG. 24 is a perspective view of a roof window in an embodiment incorporating a sash installation component, seen from an exterior side, in a second operational condition of the roof window and in which the sash is in a side coupling position.
Figure 25:
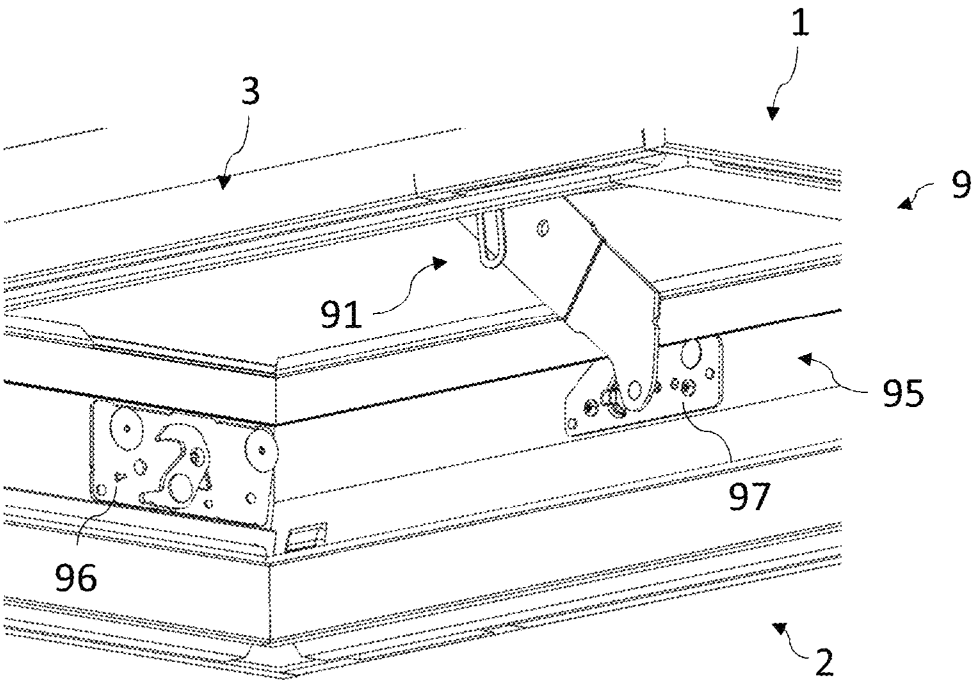
FIGS. 25 and 26 are partial perspective views of the roof window of FIG. 24.
Figure 26:
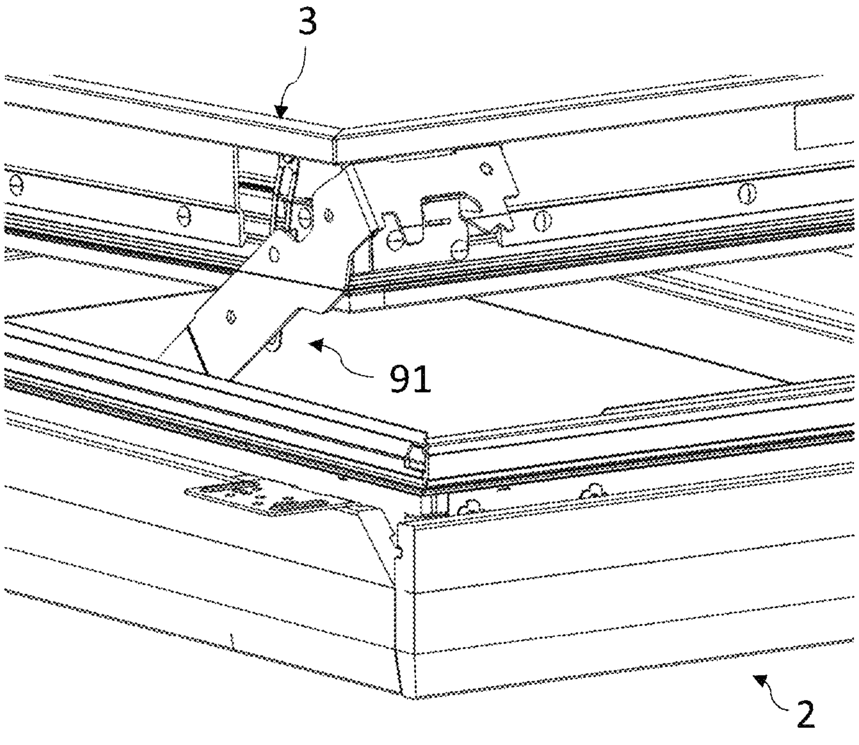
Figure 27:
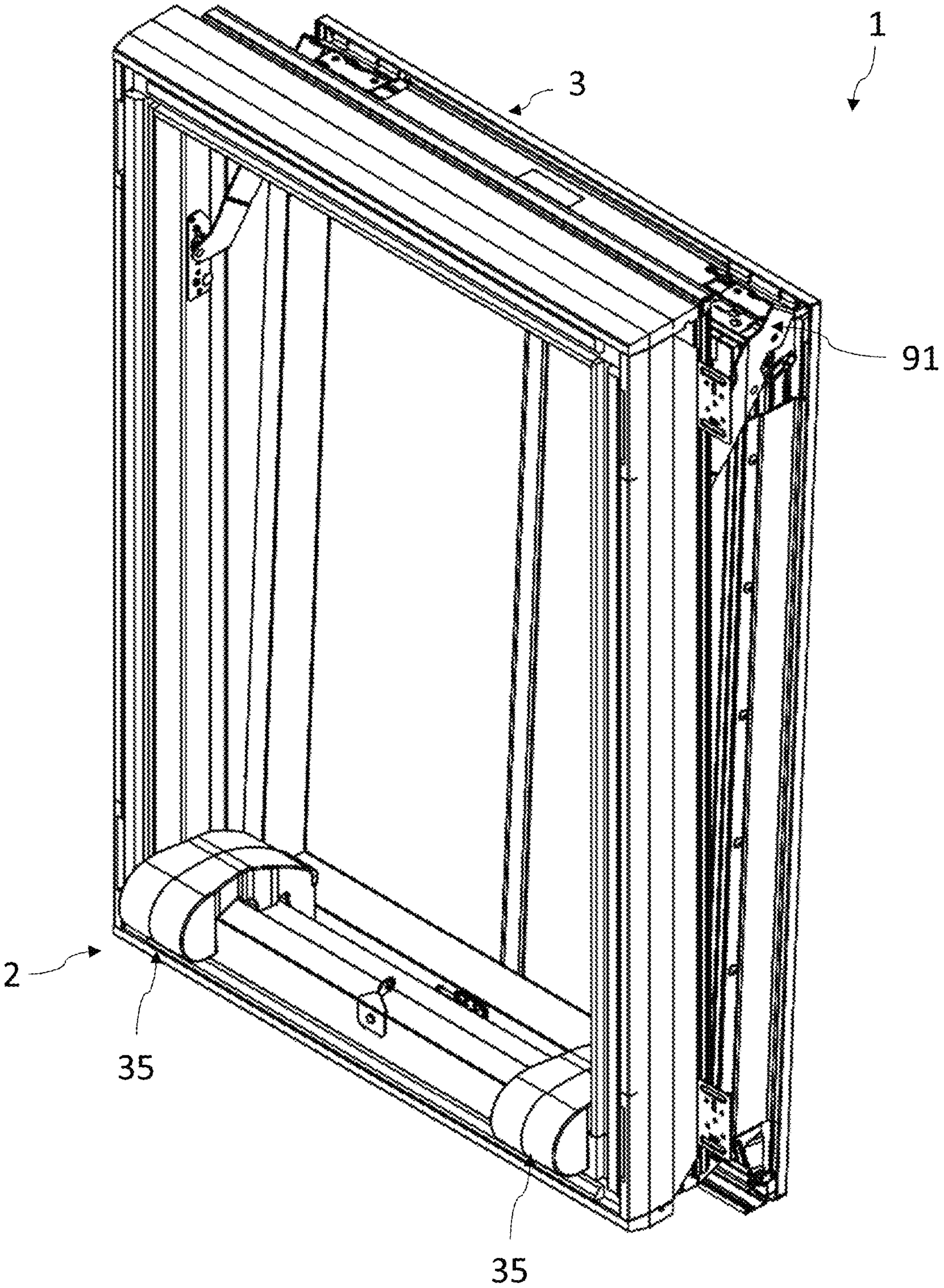
FIG. 27 is a perspective view of the roof window in the embodiment of FIGS. 24 to 26, seen from an interior side.
Figure 28:
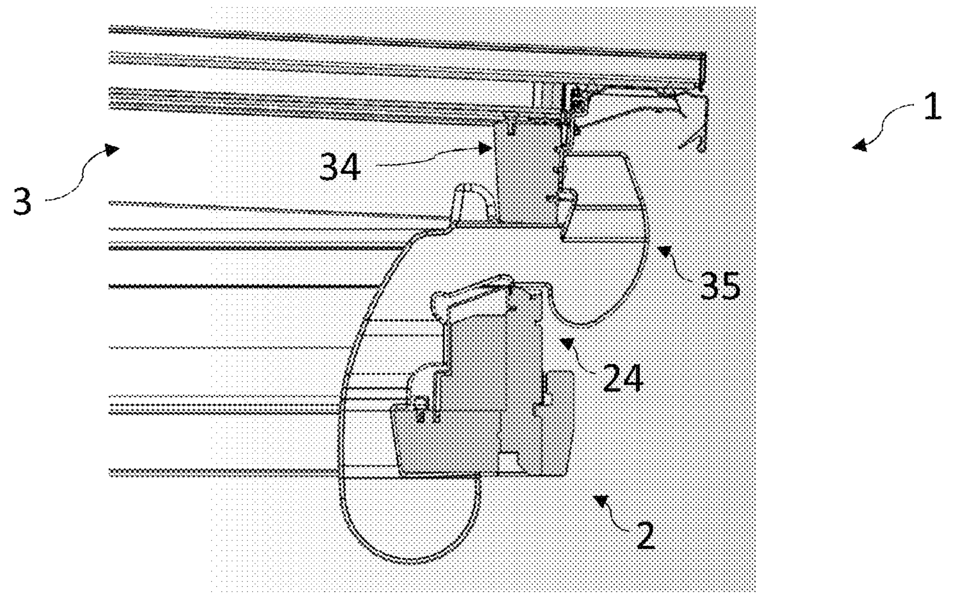
FIG. 28 is a cross-sectional view along the line XXVIII-XXVIII in FIG. 24.

The secondary hinge pin 927 comprises an enlarged head and a shaft, and the key-hole shaped recess 971*r* comprises an entry opening 971*ra* allowing entry of the head of the secondary hinge pin 927 and a narrowed track section 971*rb* allowing entry of the shaft but preventing withdrawal of the head of the secondary hinge pin 927, as shown in FIG. 19.

In order to guide the secondary hinge pin 927 into the key-hole shaped recess, the entry opening 971*ra* comprises a recessed section 971*c*.

Once the secondary hinge pin 927 has entered the key-hole shaped recess 971*r*, it is locked by means of a biased lock element 972 on the side of the base section 971 facing the inner side of the side frame member 22. The biased lock element 972 comprises a connection section 972*a* and a resilient end section 972*b* with an opening 972*c* allowing entry of the head of the secondary hinge pin 927. In order to release the locked engagement, the resilient end section 972*b* is provided with a release tab 972*d*, which may be manipulated manually.

The side frame coupling plate 97 is connected to the side frame member 22 by means of a plurality of fastening means including at least one spigot 971*e* on the base section 971 and at least one opening 971*f* for fastening means such as screws 981. To receive the side frame coupling plate 97, the side frame member 22 comprises a hinge assembly receiving milling 29*b* and a set of openings 29*d*, 29*f*.

Hinge Assembly, Second Operational Condition and Sash Installation Component—FIGS. 24 to 35

Turning now to FIGS. 24 to 35, possible movement patterns and positions of the sash 3 in the second operational condition will be described. Three positions will be described, namely a side coupling position corresponding to the position in which the sash 3 with the hinge unit 91 is first coupled to the frame 2 in that the frame hinge side flange 924 is brought into engagement with the side frame coupling plate 97, a top coupling position corresponding to the position in which the sash 3 with the hinge unit 91 is ready to be brought into engagement with the top frame coupling plate 96, and a service position, in which a clearing is created between the top sash member 31 and the top frame member 21. It is self-evident that the sash 3 may assume other positions in the second operational condition.

To protect the components of the roof window 1 and to facilitate the coupling, a sash installation component 35 is provided to support the sash 3 during installation and use.

Figure 29:
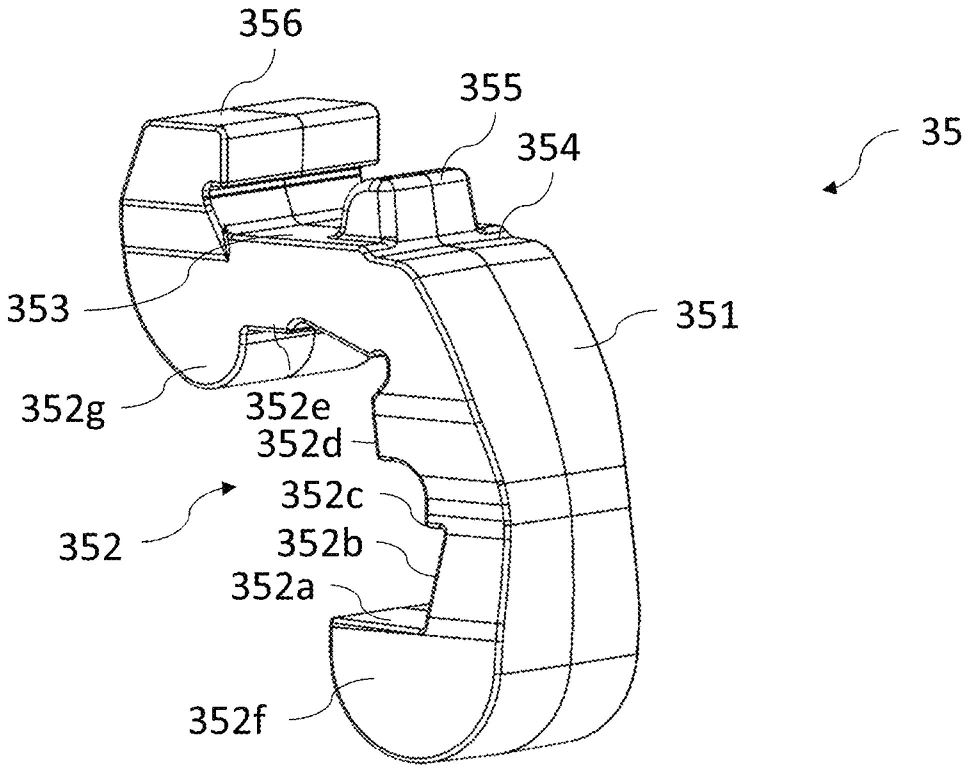
FIG. 29 is a perspective view of the sash installation component in an embodiment of the invention.

Referring in particular to FIG. 29, the sash installation component 35 comprises a body portion 351, a frame engagement portion 352 and a plurality of support surfaces 353, 354, 356 for the sash 3.

In the embodiment shown, the sash installation component 35 comprises three distinct support surfaces.

Of these support surfaces, a first support surface 353 supports the bottom sash member 34 in the side coupling position. The side coupling position is shown in FIGS. 24 to 28, and the abutment between the first support surface 353 and the bottom sash member 34 is shown most clearly in the cross-sectional view of FIG. 28.

Figure 30:
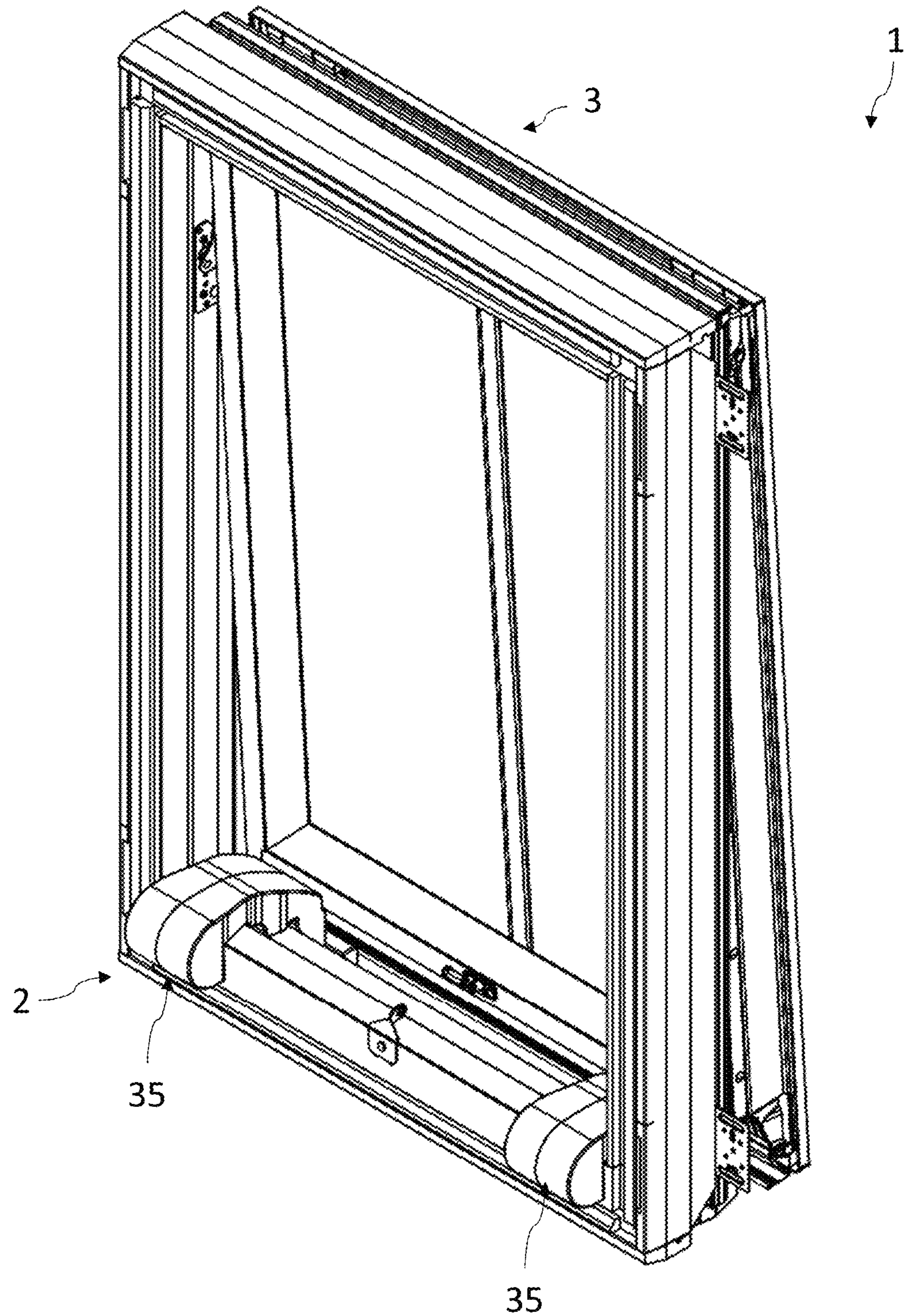
FIG. 30 is a view corresponding to FIG. 27, with the sash in a top coupling position.
Figure 31:
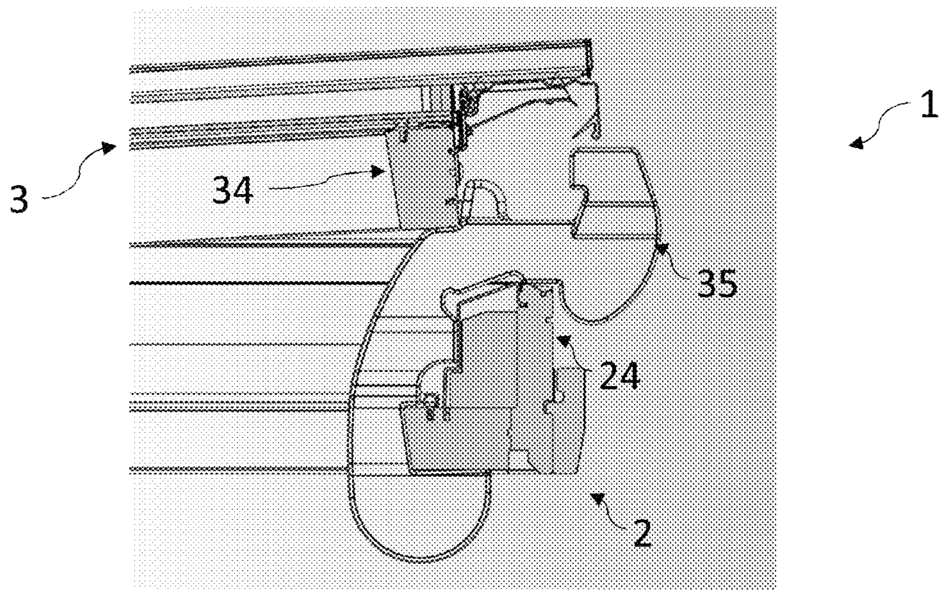
FIG. 31 is a cross-sectional view corresponding to FIG. 28, but with the sash in the top coupling position.
Figure 32:
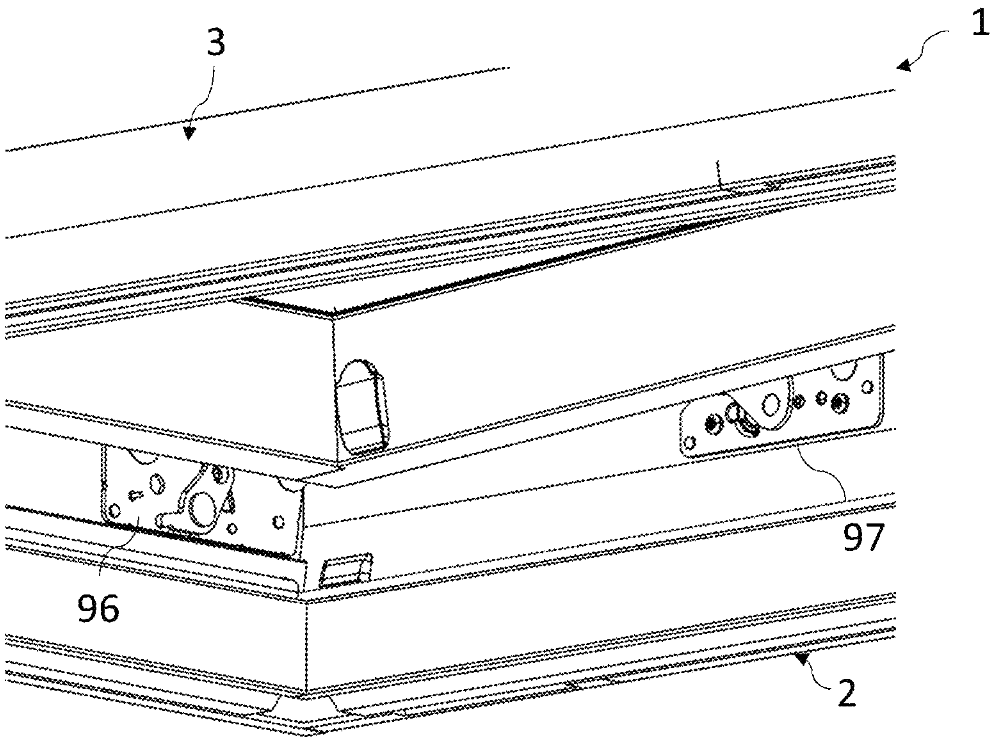
FIG. 32 is a partial perspective view of the roof window of FIG. 30.
Figure 33:
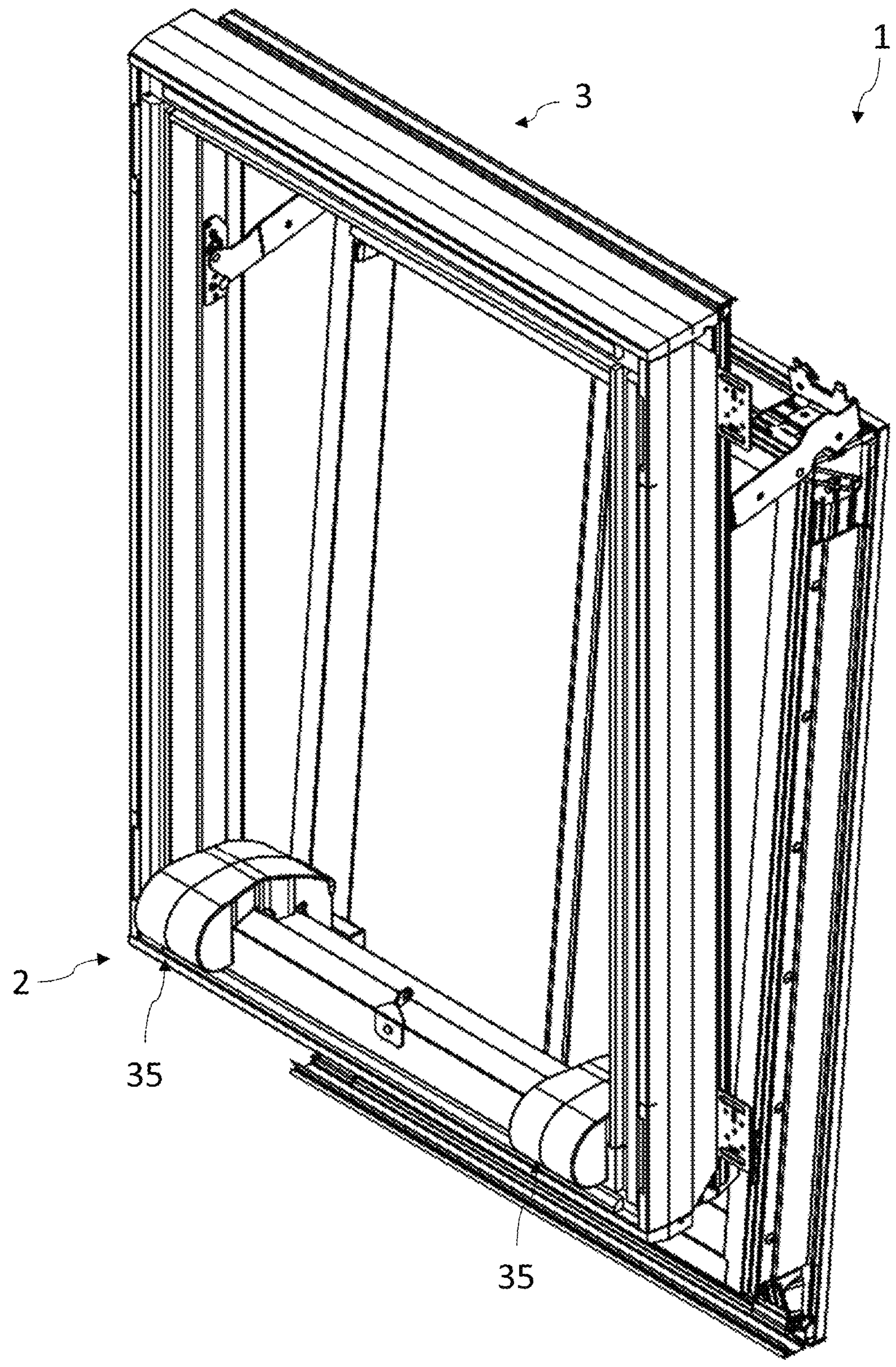
FIG. 33 is a view corresponding to FIG. 27, with the sash in a service position.
Figure 34:
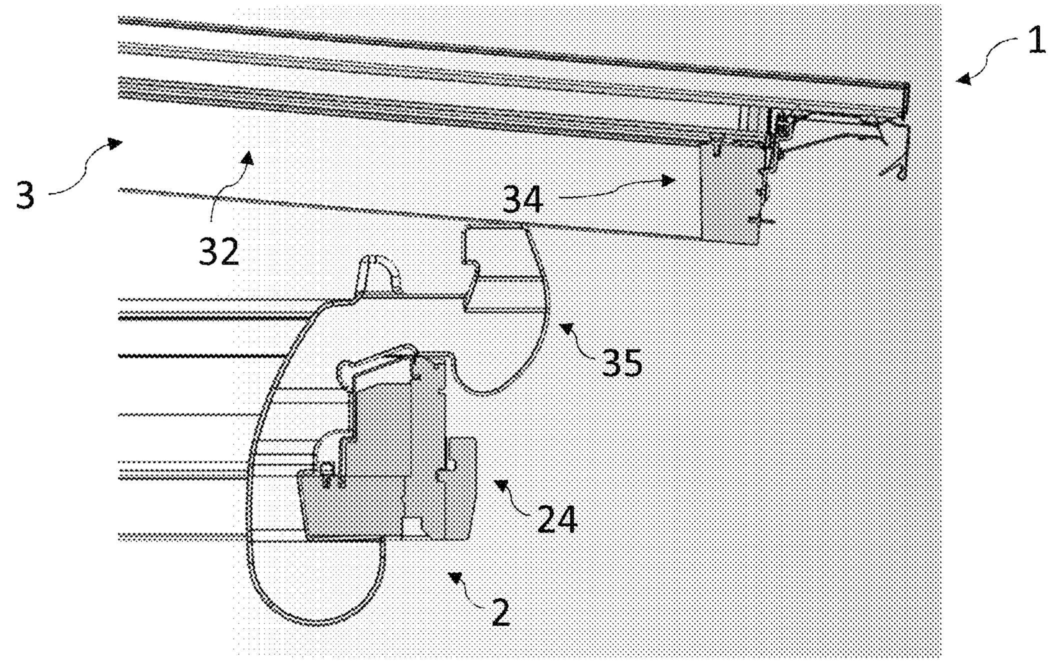
FIG. 34 is a cross-sectional view corresponding to FIG. 28, but with the sash in the service position.
Figure 35:
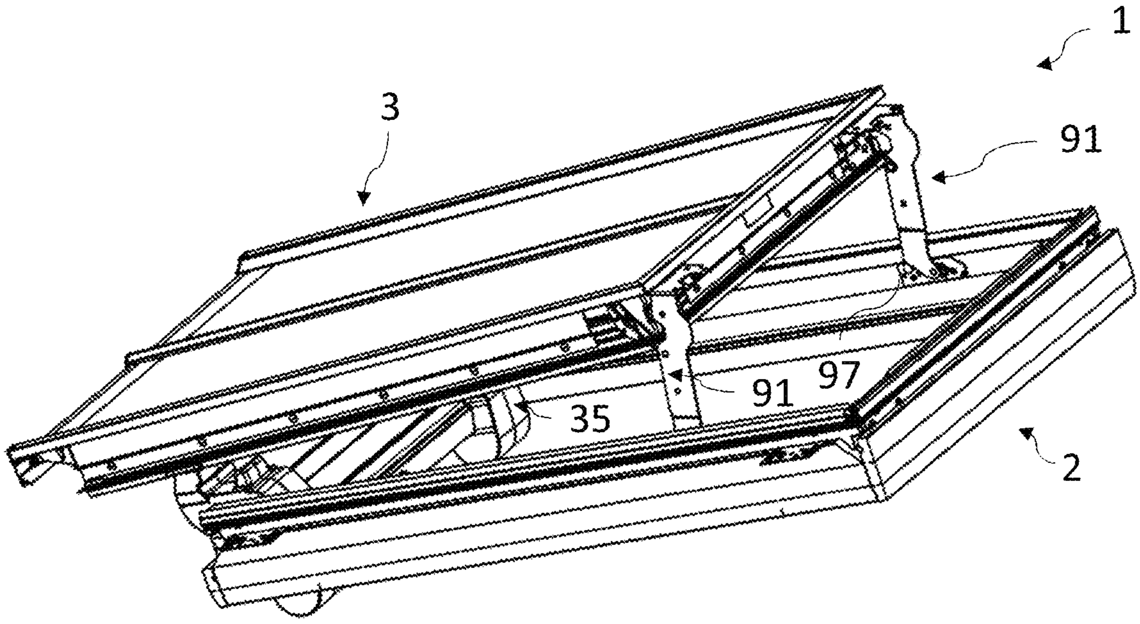
FIG. 35 is a perspective view of the roof window of FIG. 33, from another angle.

A second support surface 353 supports the bottom sash member 34 in the top coupling position shown in FIGS. 30 to 32. As is apparent, the sash 3 has been moved closer to the top frame member 31 and thus, the hinge unit 91 is in closer proximity to the top frame coupling plate 96. In this position, it is possible to bring the recesses 926*a* and 926*b* over the engagement pins 962, 963, and the hook element 964 is moved into engagement with the lock recess 926*c* until the hook 964*b* is lodged in the nook 926*d*. If the engagement is indeed carried out, the roof window 1 is in its first operational condition and may be taken into normal use.

If the first operational condition has been reached, and it is desired to obtain the service position, the hinge unit 91 is first disengaged from the top frame coupling plate 96 by releasing the hook element 964, for instance by applying a suitable tool.

Once the disengagement has been carried out and the roof window 1 is in its second operational condition, the sash installation component 35 is arranged at the longitudinal ends of the bottom frame member 24. In this way, it is possible to allow a third support surface 356 to support the side sash member or members 22, 23. To provide adequate support, the portion of the sash installation component 35, in which the third support surface 356 is formed, is wider than the body portion 351.

To ensure safe retention of the sash installation component 35 on the bottom frame member 24, the frame engagement portion 352 is shaped in accordance with a profile of the bottom frame member 24, such that the dimensions of the engagement portion 352 match the contours and dimensions of the bottom frame member 23. In the embodiment shown, an interior contact section 352*a*, a first inner contact section 352*b*, a first exterior contact section 352*c*, a second inner contact section 352*d*, and a second exterior contact section 352*e* are provided. Additionally, an interior end section 352*f* and an outer end section 352*g* are provided.

Finally, the first support surface 353 is separated from the second support surface 354 by a dividing rib 355.

Two sash installation components 35 are suitably provided together with the roof window 1 in its supply condition. While not preferred, it is also possible to provide support of the sash 35 by a single sash installation component 35, just as more than two may be provided, for instance in the case of wide roof windows.

Installation Method—FIGS. 40 to 50*d*

In the following, an exemplary method of installing the roof window 1 in a roof structure (not shown) will be described. It is understood that various steps may be carried out differently, or in a different order.

Figure 40:
FIGS. 40 to 48*c* are schematic views showing steps of the installation of an exemplary roof window.

FIG. 40 shows the roof window 1 when mounted in a roof structure (not shown) and in a position of normal use, i.e. in the first operational condition allowing opening of the sash 3 relative to the frame 2. When mounted, the roof window 1 is surrounded by underroofing and flashing assemblies (not shown) providing a weather-tight transition to a surrounding roofing. Details of the configuration of such assemblies are described in more detail in Applicant's co-pending patent applications filed on the same date as the present application.

In the following description, the installation steps will be described only briefly. For a detailed description of the interaction between components, reference is made to the relevant sections in the above description of embodiments.

Figure 41A:
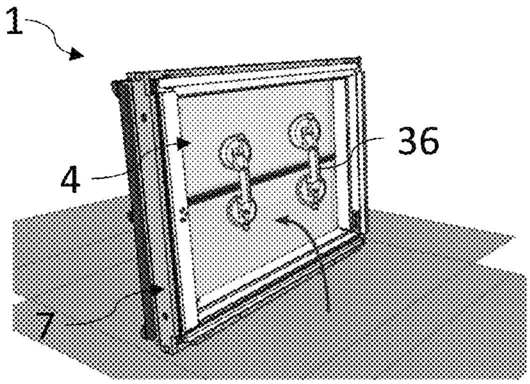
Figure 41B:
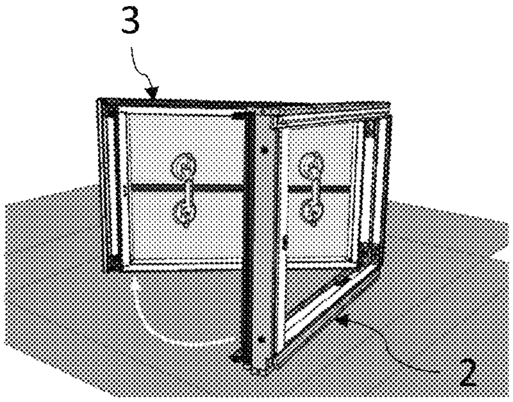
Figure 41C:
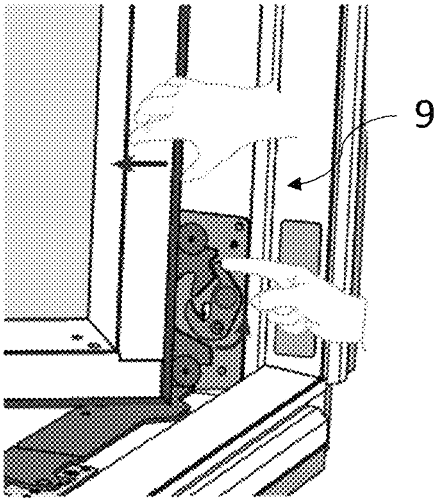
Figure 41D:
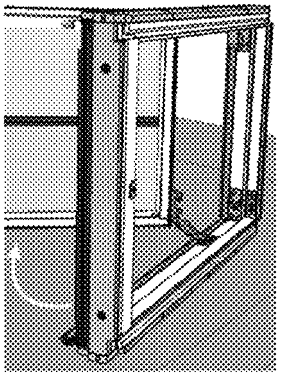
Figure 41E:
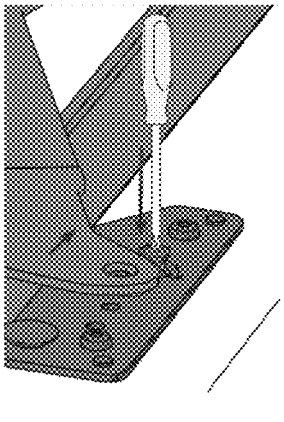
Figure 41F:
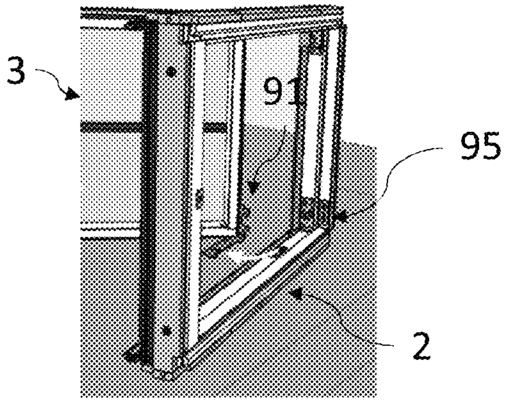

The roof window 1 with the frame 2, sash 3, and pane 4 are provided in a supply condition. Depending on the conditions on the installation site, the roof window 1 is typically supplied in a packaging which is opened in proximity to the building, in which the roof window 1 is to be installed, possibly inside a room of the building. One example of an unpacking situation is shown in FIG. 41*a*. To ease handling of the sash 3, a set of suction disc tools 36 is provided; however, it is also possible to handle the roof window 1 manually without tools, or craning with or without suction disc tools, cf. FIGS. 46 and 47.

It is noted that in the shown embodiment, the insulation frame 7 is connected to the frame 2 in the supply condition. The principles of the present invention are however also applicable to roof windows in which the insulation frame 7 is supplied separately, or without an insulation frame altogether.

The operating assembly 5 is supplied with only some components fastened to the sash 3, while others are supplied separately. In case the transportation fitting 57 is present, such transportation fitting 57 is removed.

Following unpacking, the sash 3 is opened relative to the frame 2. The hinge unit 91 of the hinge assembly 9 is disengaged from the coupling unit 95 as shown in FIGS. 41*c* to 41*f* until the sash 3 is detached from the frame 2.

The sash 3 with the hinge unit 91 is placed at a suitable location awaiting further handling. This allows easy handling and subsequent installation of the frame 2 in the roof structure. In preparation of the installation, the mounting brackets 6 need to be fastened to the frame 2.

Figure 42:
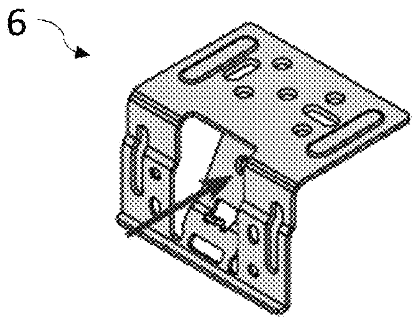
Figure 43:
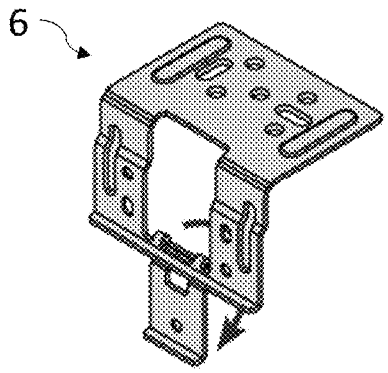

The set of mounting brackets 6 is typically provided separately, for instance in a separate packaging within the roof window packaging. As indicated in FIGS. 42 and 43, each mounting bracket 6 is brought from its supply condition to the installation condition.

Figure 44A:
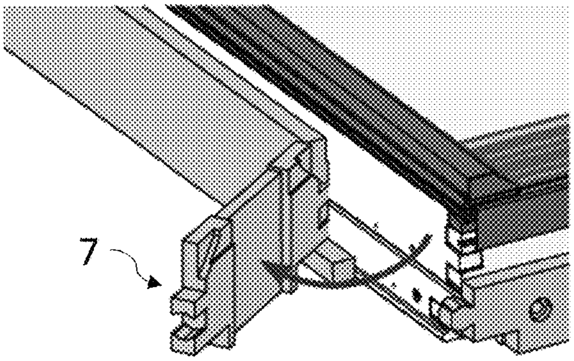
Figure 44B:
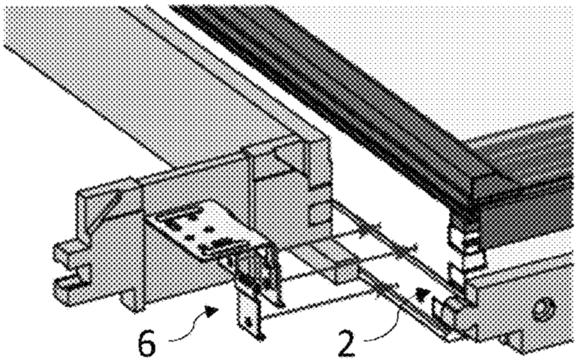
Figure 44C:
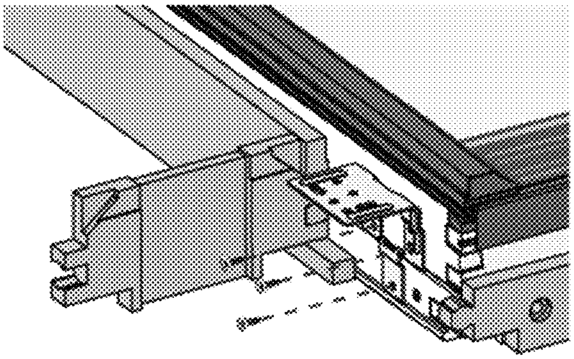
Figure 44D:
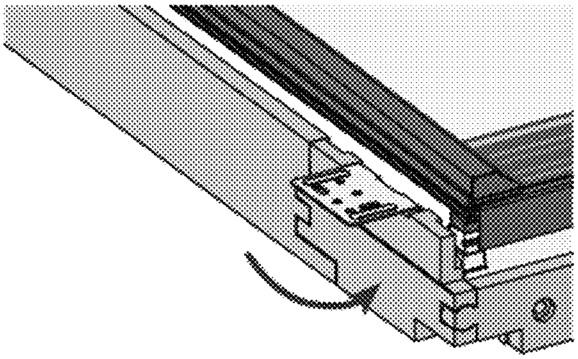

Subsequently, access to the frame 2 is provided by swinging portions of the insulating frame 7 to reveal the outer side of the side frame members as outlined in FIG. 44*a*. Once the mounting bracket 6 has been fastened as outlined in FIGS. 44*b* and 44*c*, the portions of the insulating frame 7 are repositioned as shown in FIG. 44*d*.

Installation of the frame 2 takes place by positioning the frame 2 in the opening provided and fastening the mounting brackets 6 to the subjacent roof structure. Underroofing and flashing assemblies are installed as prescribed.

Figure 45A:
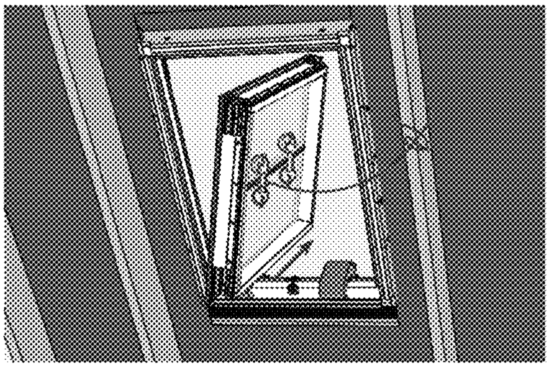
Figure 45B:
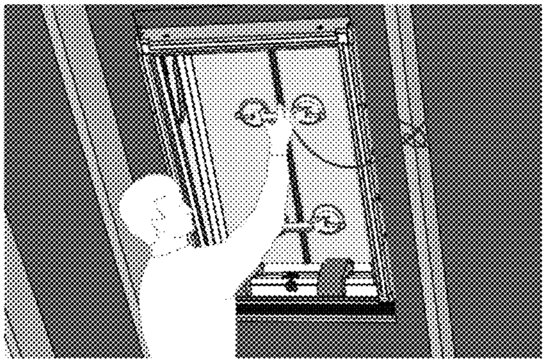
Figure 45C:
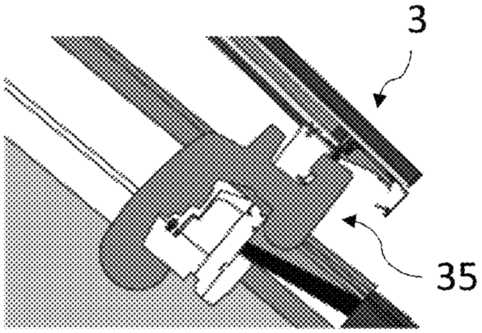
Figure 45D:
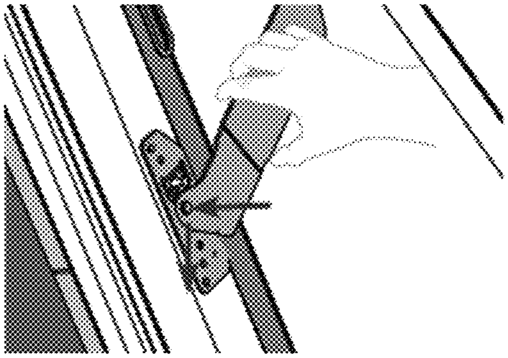
Figure 45E:
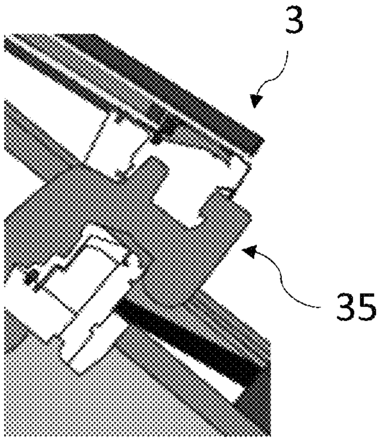

When the frame 2 is in its appropriate place, the sash installation components 35 are positioned on the bottom frame member and the sash 3 lifted into the opening of the frame 2, resting on one of the sash installation components 35 as shown in FIG. 45*a*. The sash 3 is placed in the side coupling position on the sash installation components 35 as shown in FIG. 45*c* and each hinge unit 91 is engaged with the respective side frame coupling plate at either side of the frame 2 and sash 3 as indicated in FIG. 45*d*.

Figure 45F:
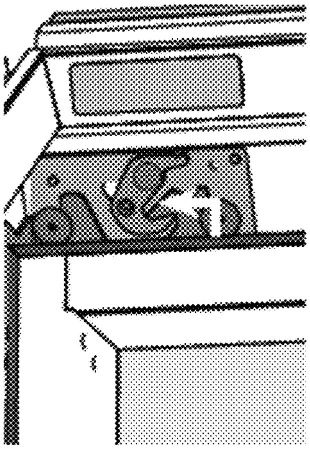
Figure 46:
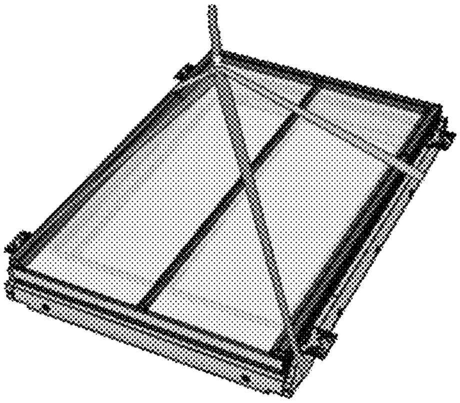

The sash 3 is then moved into the top coupling position on the sash installation components 35 as shown in FIG. 45 and each hinge unit 91 then engaged with the respective top frame coupling plate as shown in FIG. 45*f*.

Figure 47:
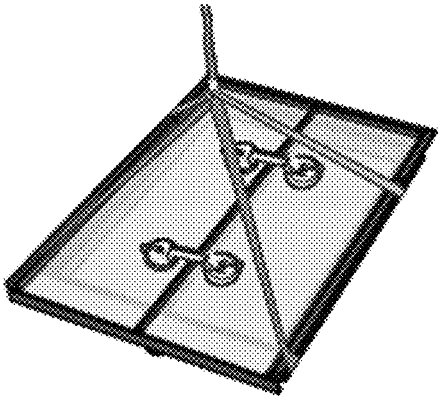
Figure 48A:
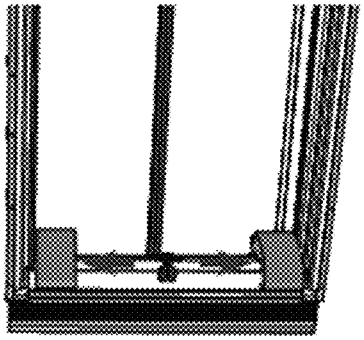
Figure 48B:
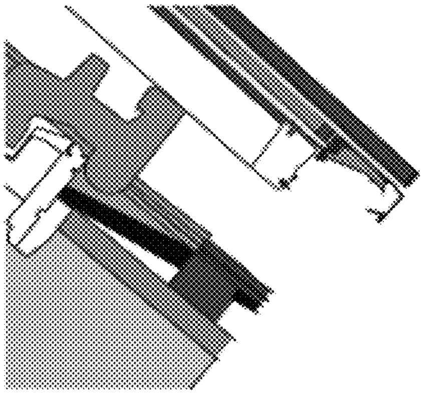
Figure 48C:
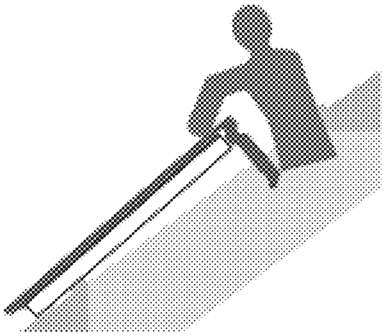
Figure 49A:
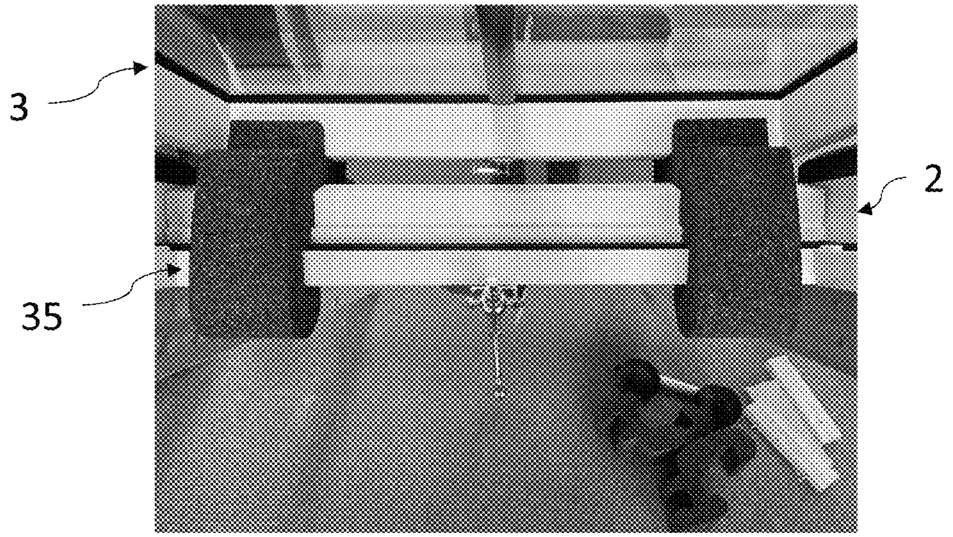
FIGS. 49*a* to 49*c* and 50*a* to 50*d* are photographs of details of an exemplary roof window.
Figure 49B:
Figure 49C:
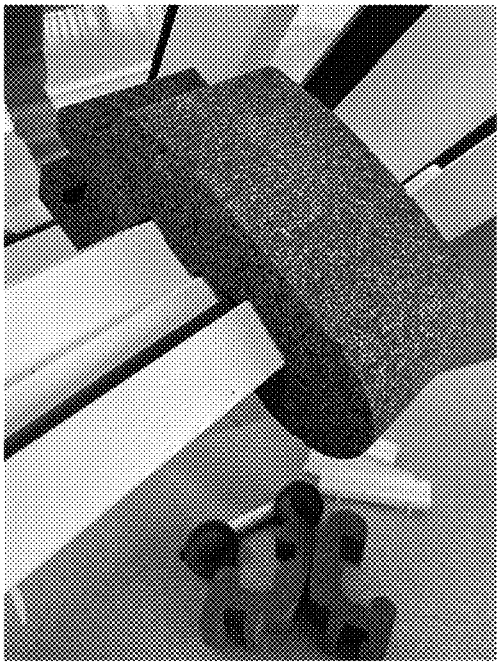
Figure 50A:
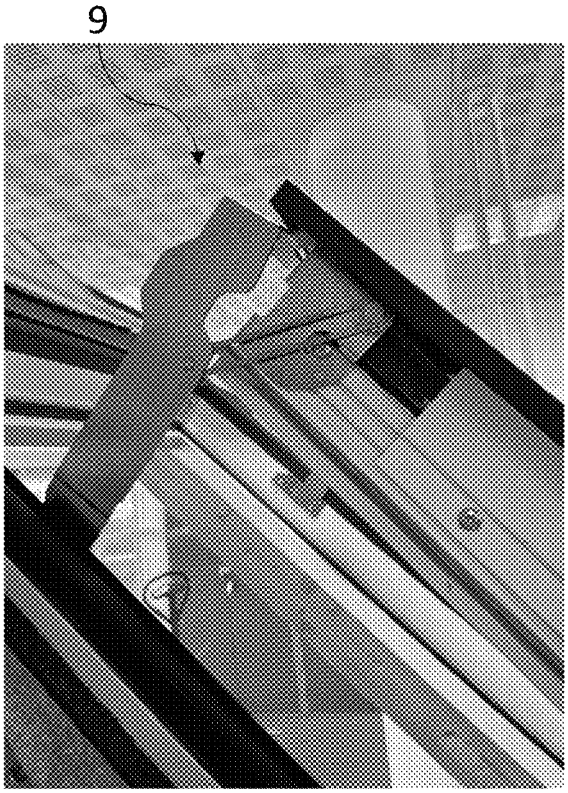
Figure 50B:
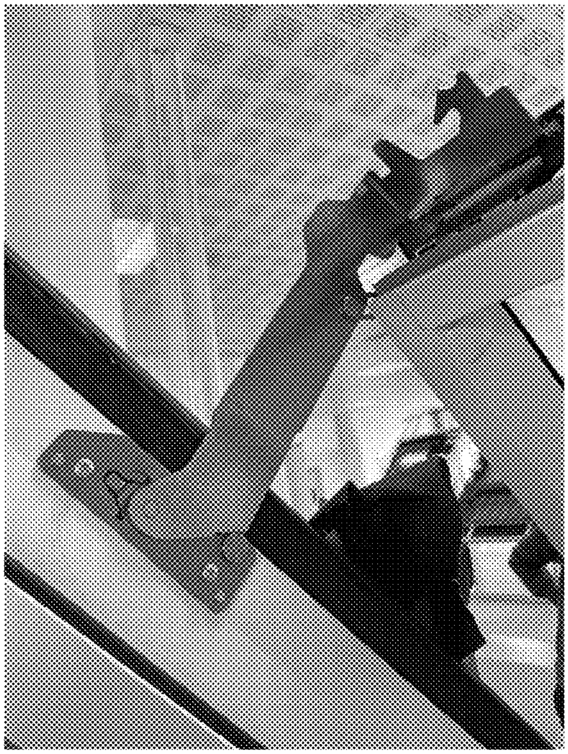
Figure 50C:
Figure 50D:

In case the roof window 1 has been craned into position including suction disc tools 36 as shown in FIG. 47, the tools 36 may be removed from the interior of the building by placing the sash 3 in the service position shown in FIG. 48*b*. As mentioned in detail above, this operation requires disengagement of the hinge units 91 from the top frame coupling plates of the coupling units 95 and positioning of the sash installation components 35 at the ends of the bottom frame member as shown in FIG. 48*a*. Once the service opening between the frame and sash has been established, an installer or other person may gain access to the exterior of the sash and remove the tools.

It is understood that the service position may be established at any time during use of the roof window.

Finally, a series of photographs of details of an actual roof window is shown in FIGS. 49*a* to 49*c* and 50*a* to 50*d*.

Alternative Embodiments of Coupling Unit—FIGS. 51 to 64

In the following, alternative embodiments of the coupling unit 95 will be described in some detail. Only differences relative to the above embodiments will be described in detail. Elements having the same or analogous function as in the above embodiments are denoted by the same reference numerals. In some embodiments, an apostrophe 'has been added to reference numerals to identify counterpart elements.

Figure 51:
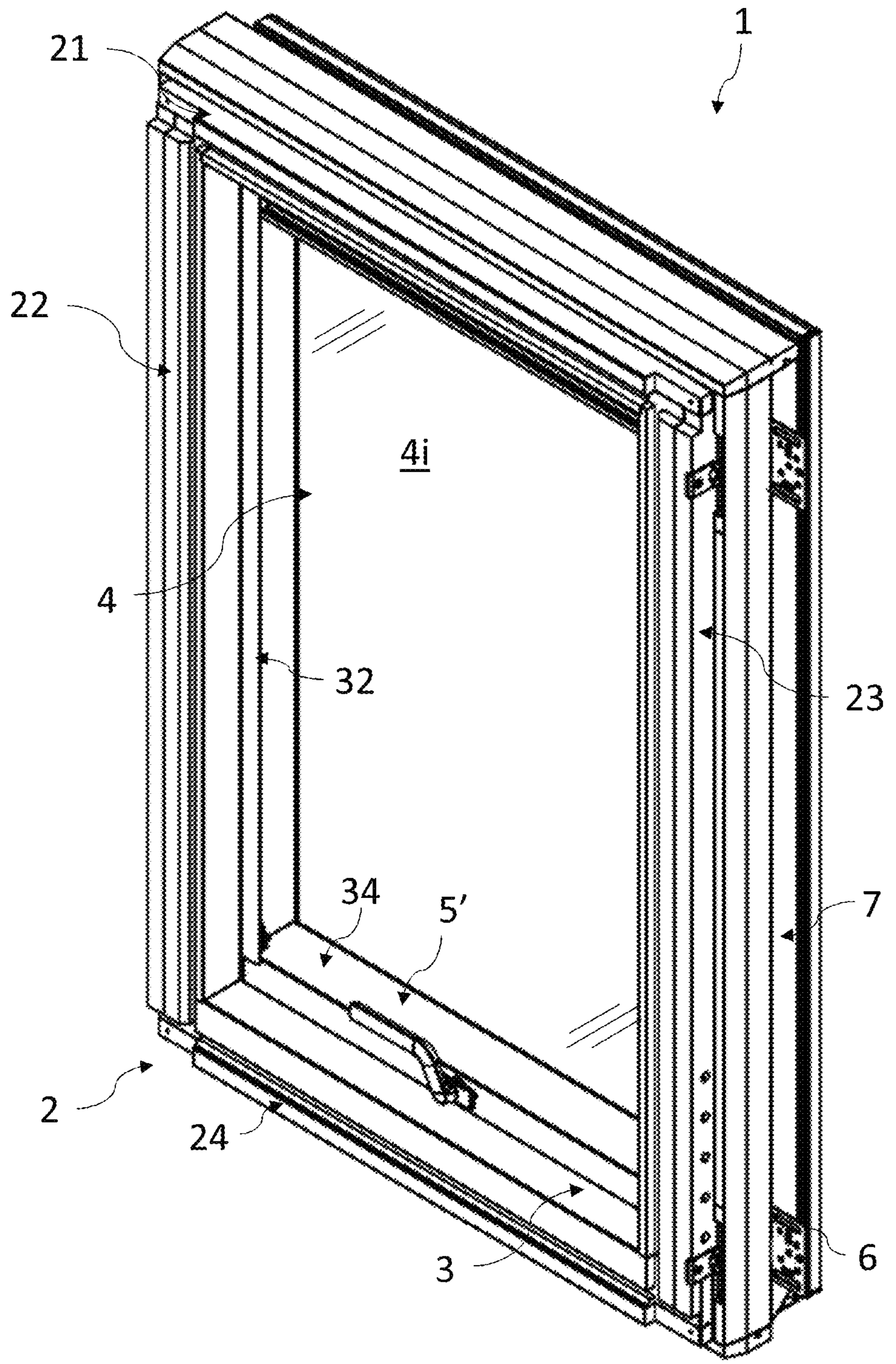
FIG. 51 is a perspective view of a roof window in an alternative embodiment of the invention, seen from an interior side.
Figure 52:
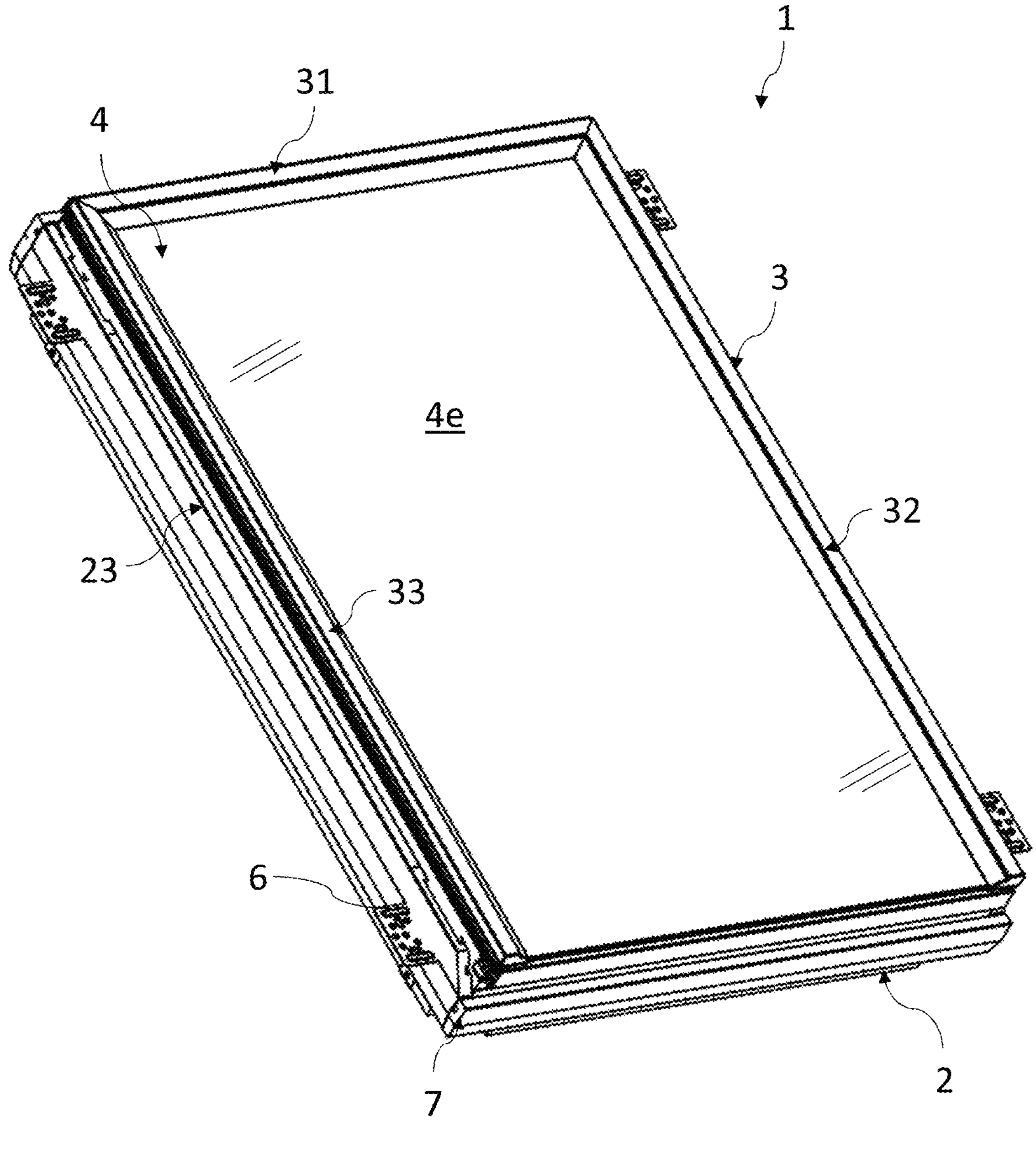
FIG. 52 is perspective of the roof window of FIG. 51, seen from an exterior side.

As shown in FIG. 51, the operating assembly 5 here comprises a handle 5'. A further difference from the above embodiments is that no glazing bar is provided.

Figure 53:
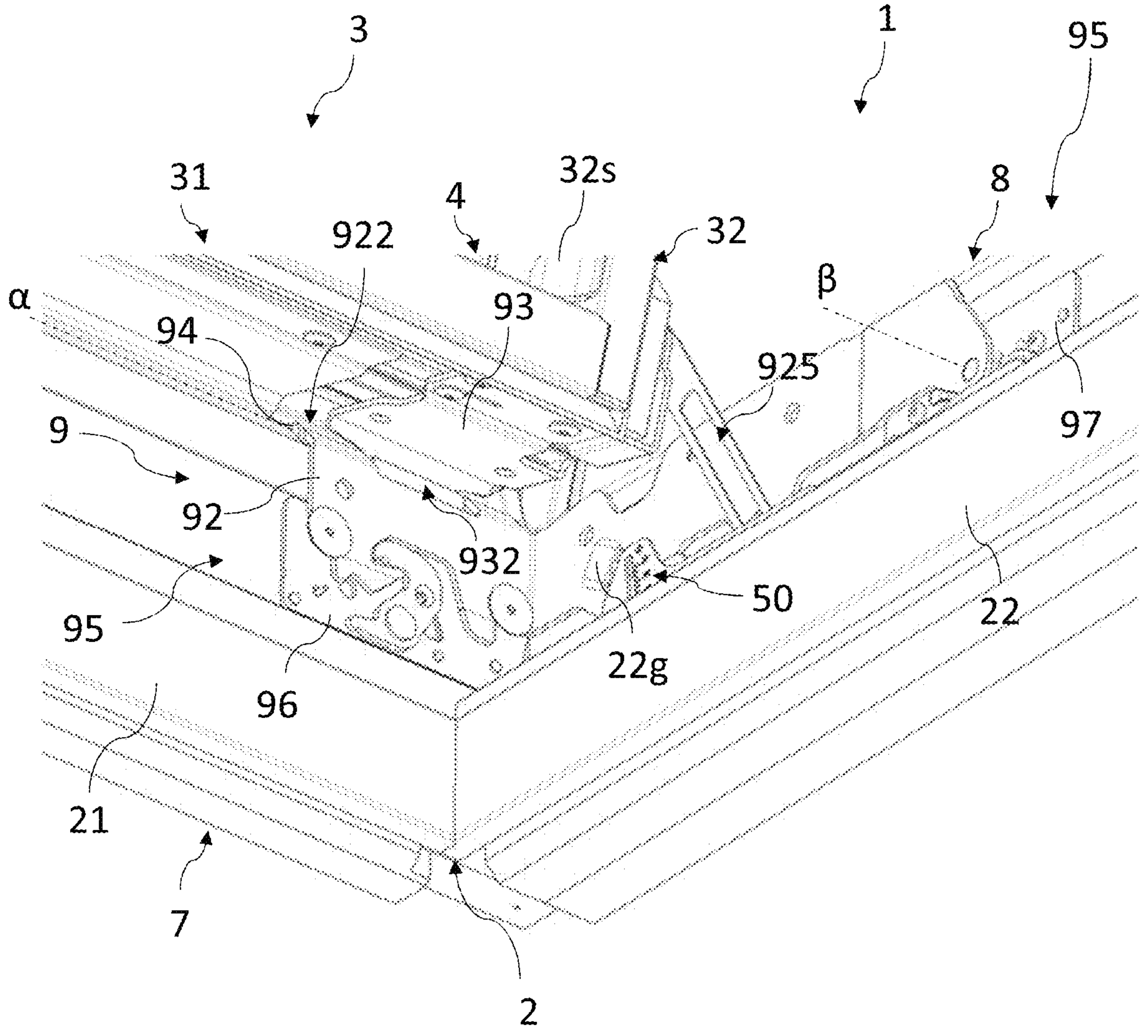
FIG. 53 is a perspective cross-sectional view of a roof window in another embodiment, with the sash in an open position.
Figure 54:
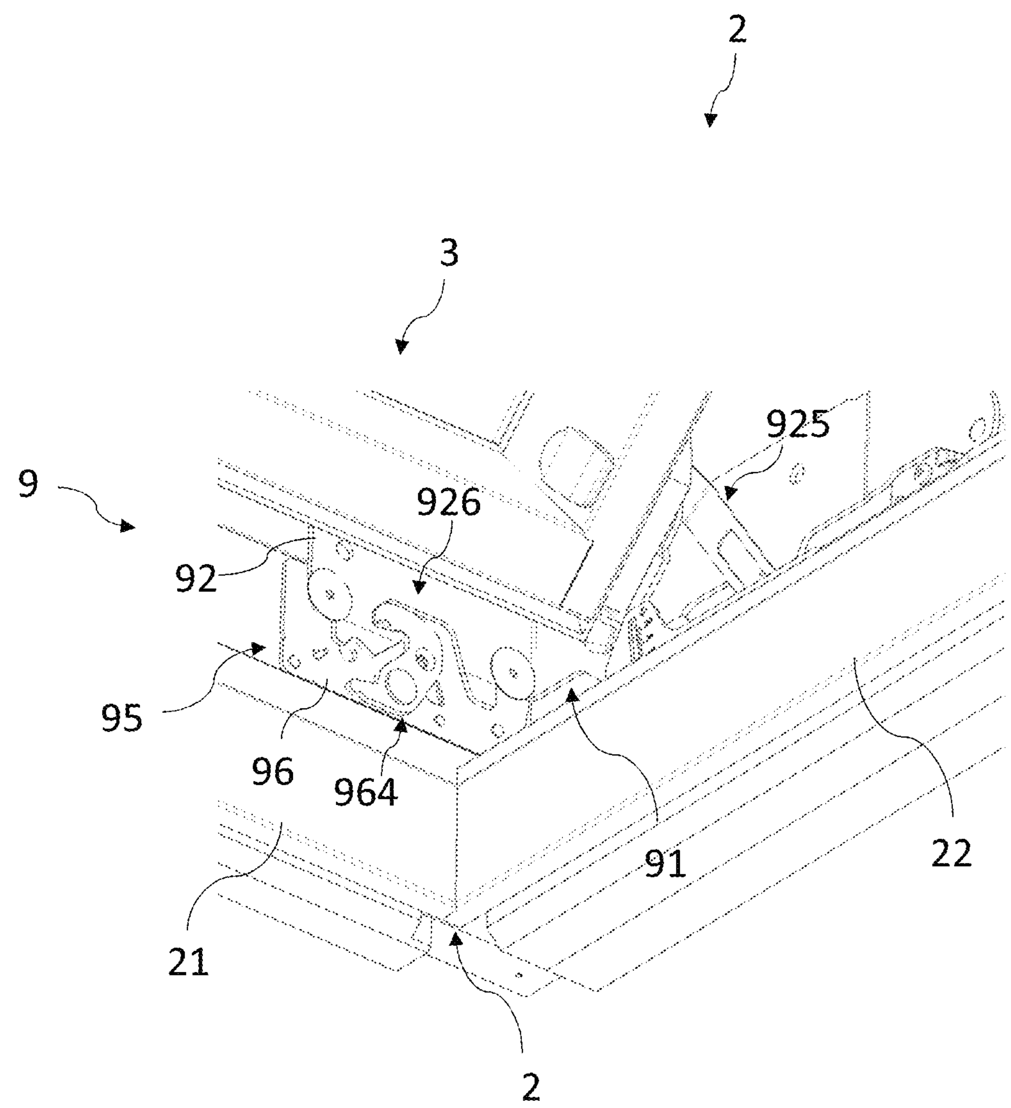
FIG. 54 is a view corresponding to FIG. 53, with the sash in another open position.

Turning now to FIGS. 53 and 54, it emerges that the roof window 1 in the embodiment shown is provided with a lifting device 50 mounted on the frame 2 and interacting with the sash 3.

Figure 55:
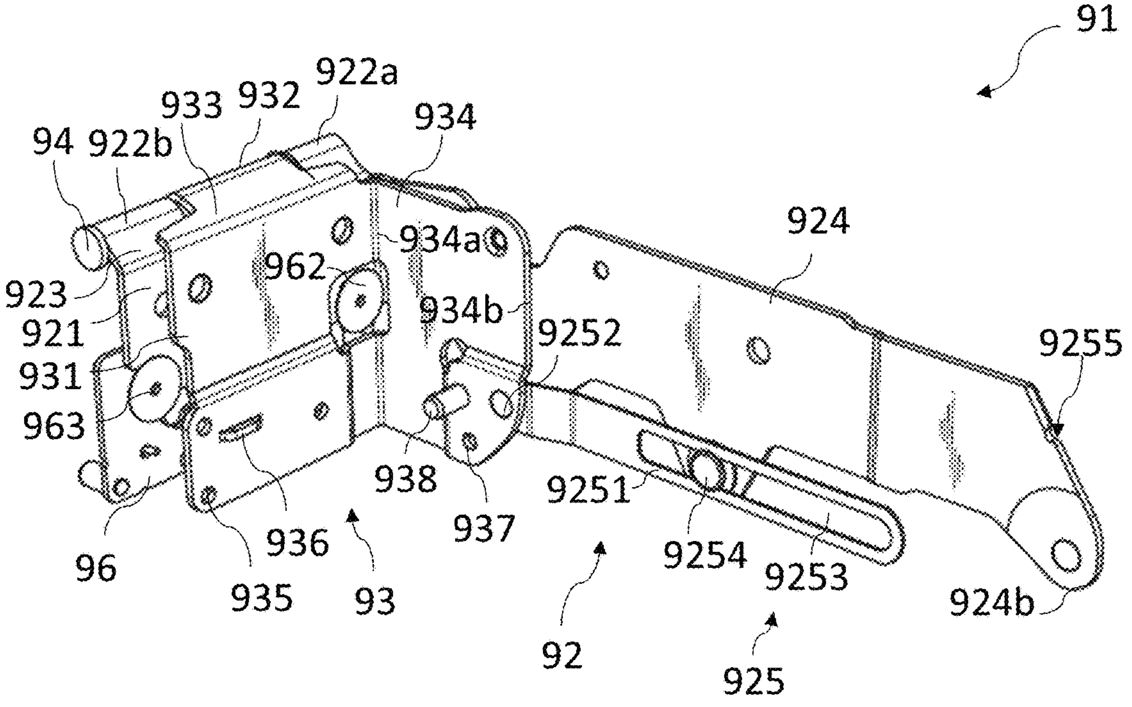
FIGS. 55 and 56 are perspective views from different angles of a hinge assembly of a roof window in a further embodiment of the invention.
Figure 56:
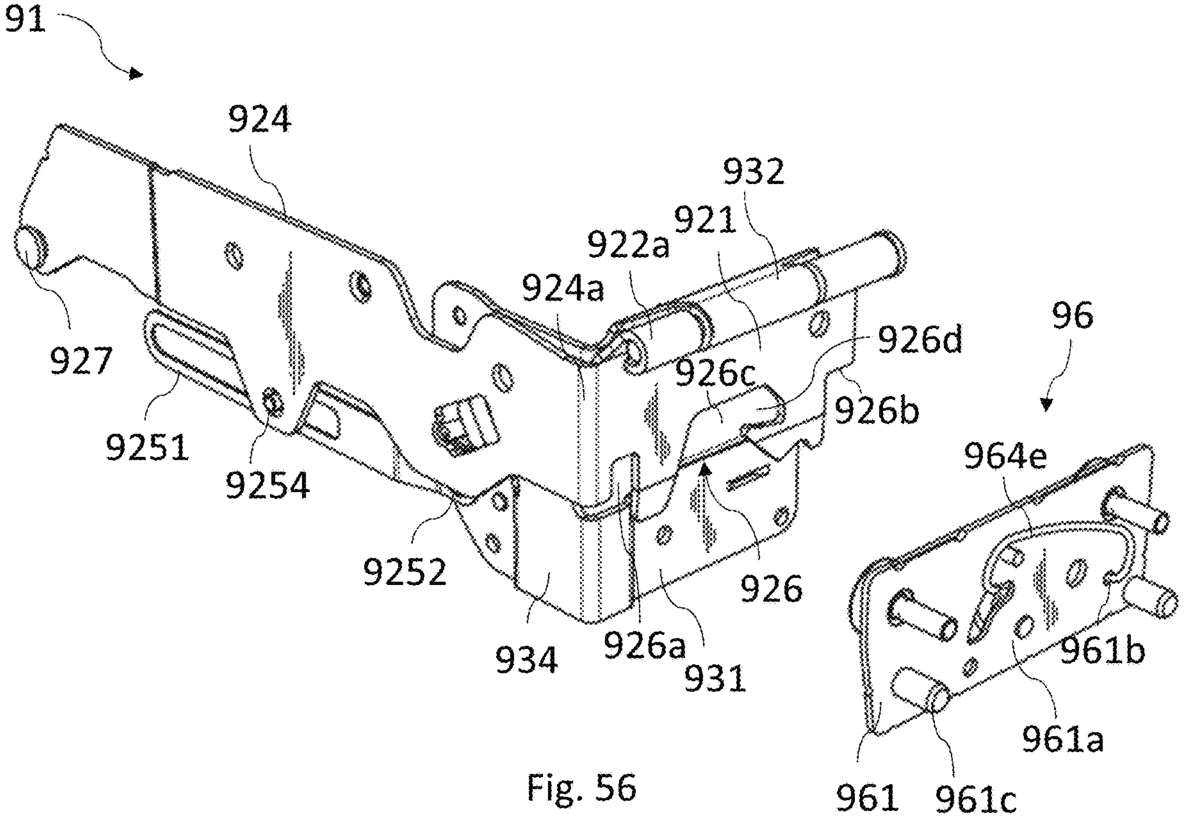
Figure 57:
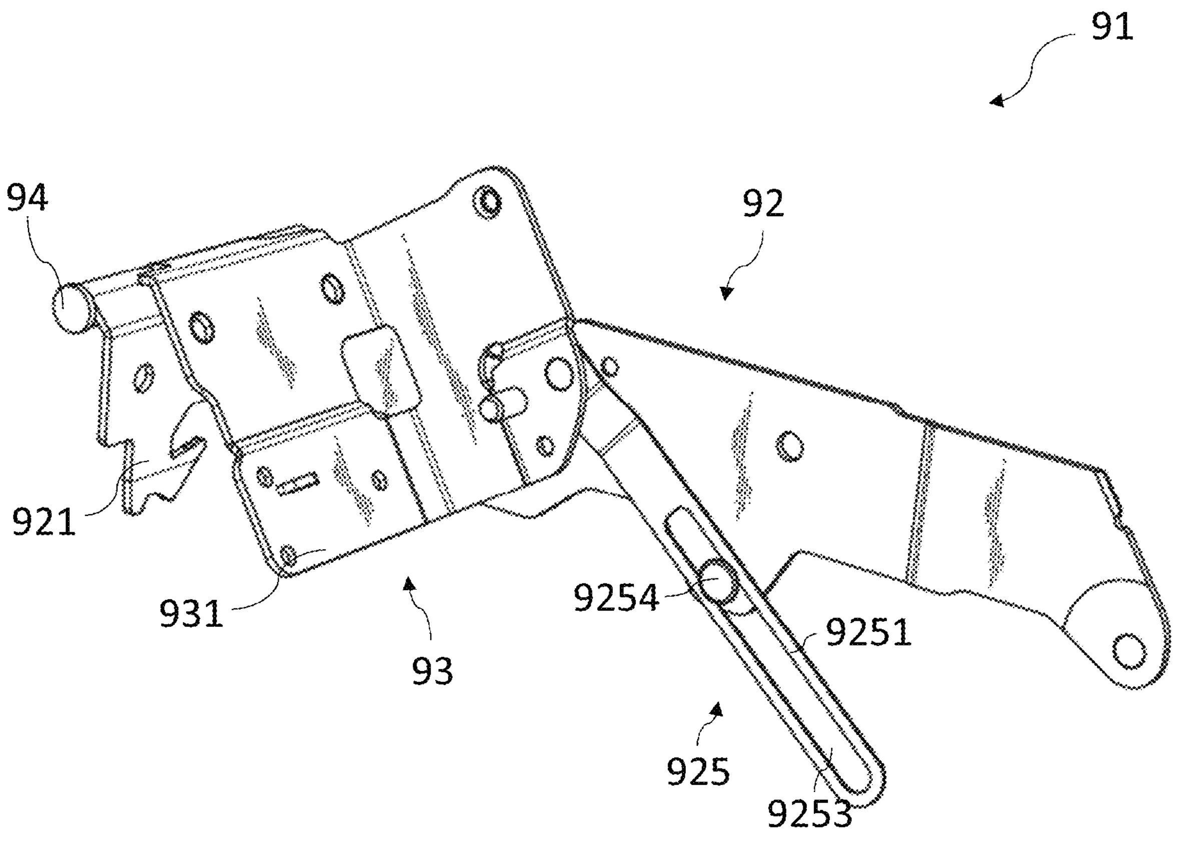
FIG. 57 is a view of the hinge assembly of FIGS. 55 and 56, corresponding to an open position of the sash.

In FIGS. 55 and 56, details of the hinge unit 91 of the alternative embodiment are shown. Compared to the embodiment of FIGS. 13 and 14, it is seen that the arm 9251 of the first opening restrictor 925 of the alternative embodiment is rotatably connected to the sash hinge side flange 934 in rotatable joint 9252 at a lower position than in the previous embodiment. The functionality of the first opening restrictor during the opening movement of the sash 3 relative to the frame 2 is shown in FIG. 57.

Figure 58:
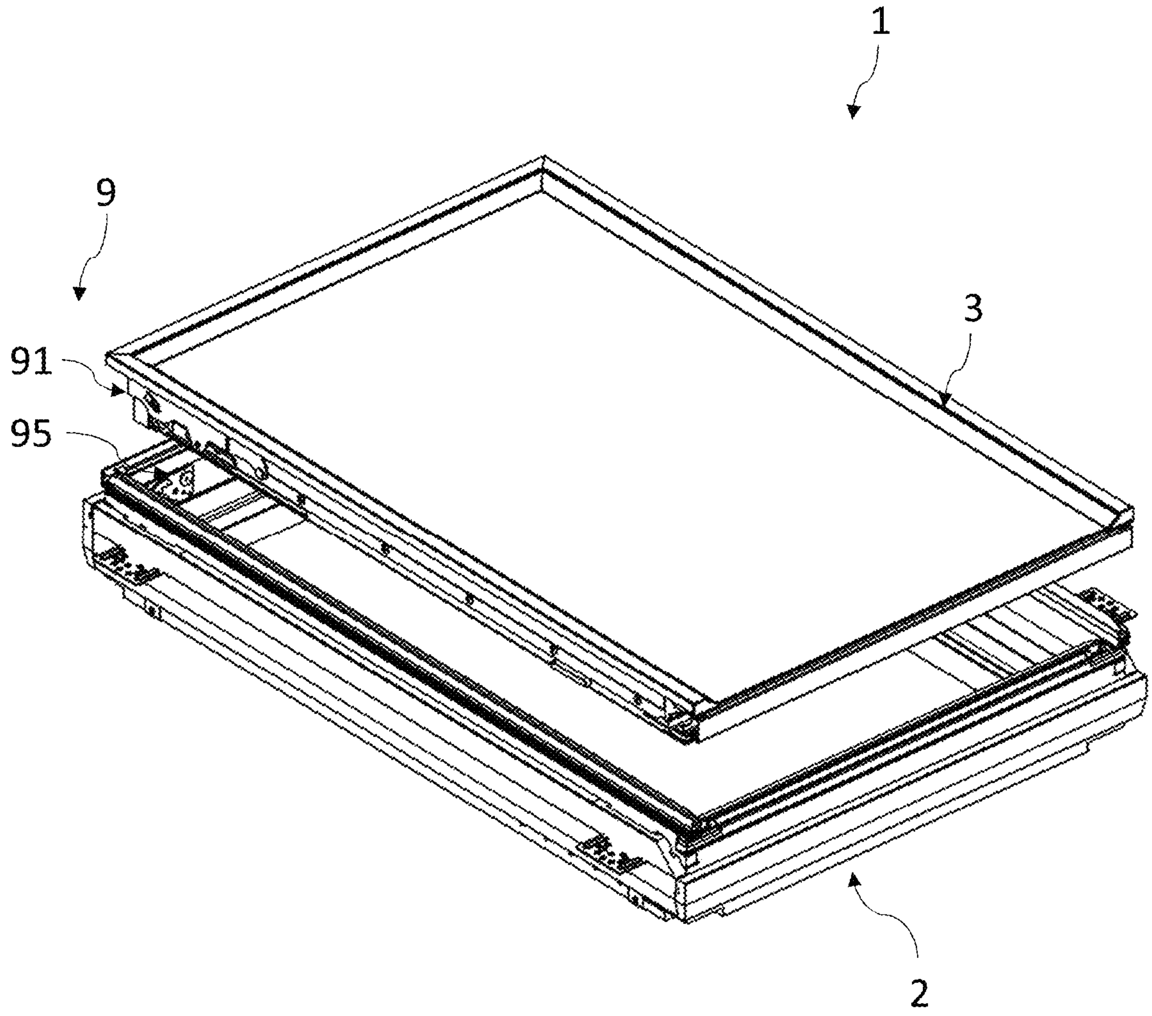
FIG. 58 is an exploded perspective view of a roof window in an embodiment incorporating a hinge assembly.

As in the above embodiments, it is foreseen that the hinge unit 91 is connected to the sash 3 when initiating installation, whereas the coupling unit 95 is connected to the frame 2 as per FIG. 58.

Also, as in the above embodiments, the coupling unit 95 is configured to allow selective coupling of at least the frame hinge part 92 of the hinge unit 91 to the top frame member 21 and/or an adjacent side frame member 22, 23. In the following, the hinge unit 91 will be described as comprising both the frame hinge base plate 921 and the frame hinge side flange 924, and the coupling unit 95 will be described as comprising both a top frame coupling plate 96 and a side frame coupling plate 97. Alternative configurations are conceivable.

To render the selective coupling possible, the frame hinge part 92 is provided with engagement means 926; 926', 927 to cooperate with the top frame coupling plate 96 and the side frame coupling plate 97, respectively, such that the frame hinge base plate 921 of each hinge unit 91 of the hinge assembly 9 is connectable to the top frame coupling plate 96 and the frame hinge side flange 924 is connectable to the side frame coupling plate 97.

Different from the above embodiments, the engagement between the frame hinge part 92 and the top frame coupling plate 96 allows for step-wise engagement, i.e., it is possible to attain one or more intermediate position(s) of the sash 3 relative to the frame 2 during coupling at the top. In the following, "an intermediate position" denotes one or more such positions, between a supply or installation condition, and a mounted condition.

In the following, it will be described how the coupling unit 95 and the hinge unit 91 are configured to assume the following positions relative to each other during installation of the roof window 1:

i) an intermediate position; and ii) a final position, corresponding to the mounted condition of the roof window.

In the three embodiments shown in FIGS. 59-60, 61-62 and 63-64, this two-step coupling comprises the engagement between the coupling unit 95 and the hinge unit 91 taking place at the top frame member 21. It could also be considered to include such a two-step coupling at the side frame member 22.

These three embodiments will be described jointly, where appropriate. The embodiment of FIGS. 59-60 corresponds in substance to the embodiment shown in FIGS. 53-57. Reference numerals having the same or analogous function as in the embodiments described in the above carry the same reference numerals. Only differences relative to previously described embodiments and between the two embodiments will be described in detail.

Thus, the top frame coupling plate 96 is here provided with coupling plate engagement means 964; 965 to cooperate with counterpart frame hinge part engagement means 926; 926' of the frame hinge part 92.

In the embodiment of FIGS. 59-60 and 61-62, the coupling plate engagement means 964; 965 include two distinct engagement portions to cooperate with counterpart frame hinge part engagement means 926; 926'.

As will be described, the coupling plate engagement means 964; 965 are moveable or stationary relative to the coupling plate 96, and the frame hinge engagement means 926; 926' are stationary or moveable.

Further, the coupling plate engagement means are female or male engagement means, and the frame hinge part engagement means are male or female engagement means.

In this way, it will be possible to provide suitable combinations of various types of engagement means to ascertain the functionality aimed at.

Figure 59:
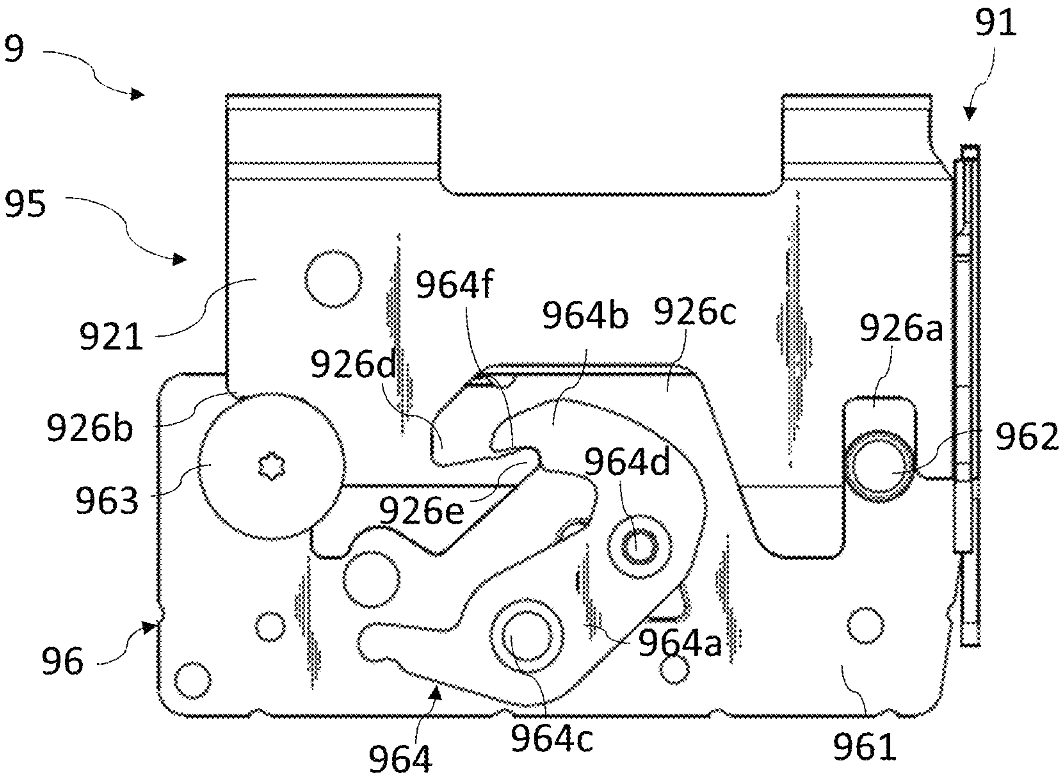
FIGS. 59 and 60 are plan views of a hinge assembly of a roof window in an embodiment of the invention, showing an intermediate position during installation and a final position, respectively.
Figure 60:
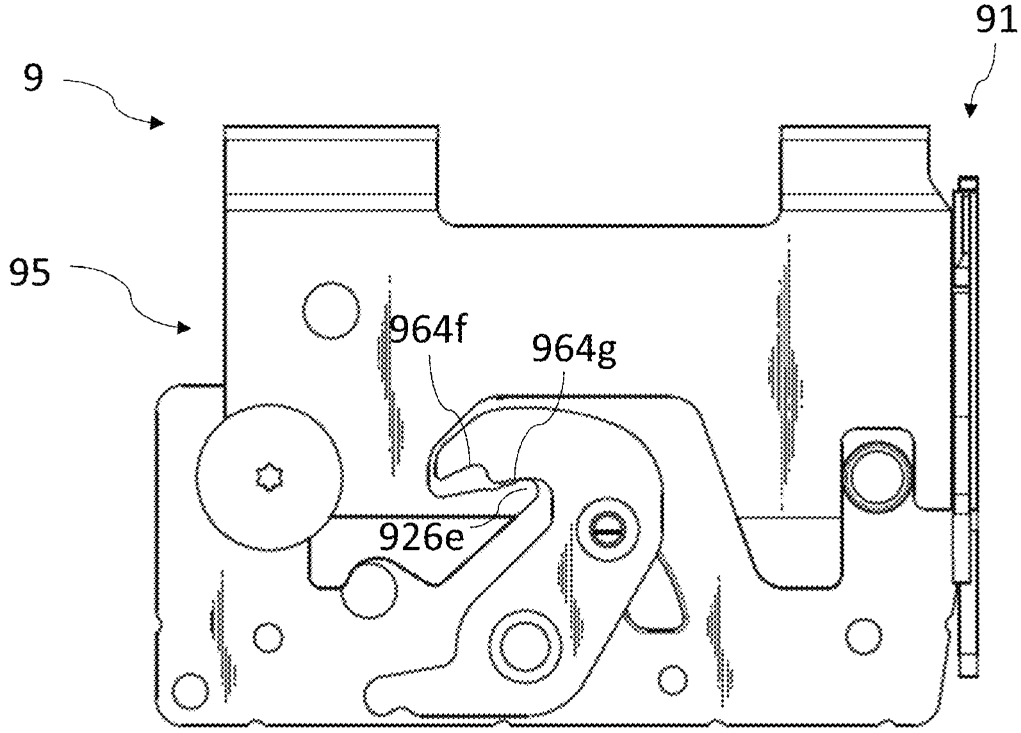

In the embodiment shown in FIGS. 59-60, the coupling plate engagement means comprise a hook element 964 comprising an arm 964*a* with a hook 964*b* and connected to the base section 961 in a rotational joint 964*c*. The frame hinge base plate 921 comprises a protrusion 926*e* constituting the frame hinge part engagement means and is configured to cooperate successively with an intermediate engagement portion 964*f* and a final engagement portion 964*g* of said hook element 964.

The hook element 964 is here biased towards a locking position in which the protrusion 926*e* of the frame hinge base plate 921 is in engagement with the final engagement portion 964*g*. Referring back to FIG. 56, it is shown how the bias is provided by a spring 964*e* accommodated with one end in a spring-receiving opening 964*d* in the arm 964*a* and with another end in a spring-receiving opening in the base section 961, the spring 964*e* passing through an opening 961*a* allowing movement of the spring 964*e* during movement of the hook element 964.

Further details visible in FIGS. 59-60 include a nook section 926*d* of a lock recess 926*c* formed in the frame hinge base plate 921.

In the position shown in FIG. 59, the hinge unit 91 is placed in an intermediate position relative to the top frame coupling plate 96. The intermediate position is here a single intermediate position. As shown, the hook element 964 hatches on to the projection 926*e* by the intermediate engagement portion 964*f*. The sash 3 is now in principle connected to the frame 2, but other configurations may be envisaged.

In comparison, in the position shown in FIG. 60, the sash 3 with the hinge unit 91 has been pulled further into the frame 2 and the hook element 964 has been rotated in the counter-clockwise direction by the bias of the spring 964*e*. Following this movement, the final engagement portion 964*g* is now engaged with the protrusion 926*e*. To achieve effective locking, the sash 3 may need to be "over-closed", that is pulling the sash 3 deeper into the frame 2 than the position the sash 3 assumes during normal operation. To that end, abutment recesses 926*a*, 926*b* are formed with sufficient height to allow this operation. Release of the engagement from the final position may also require such over-closing of the sash; this also provides additional security against unintentional release.

Figure 61:
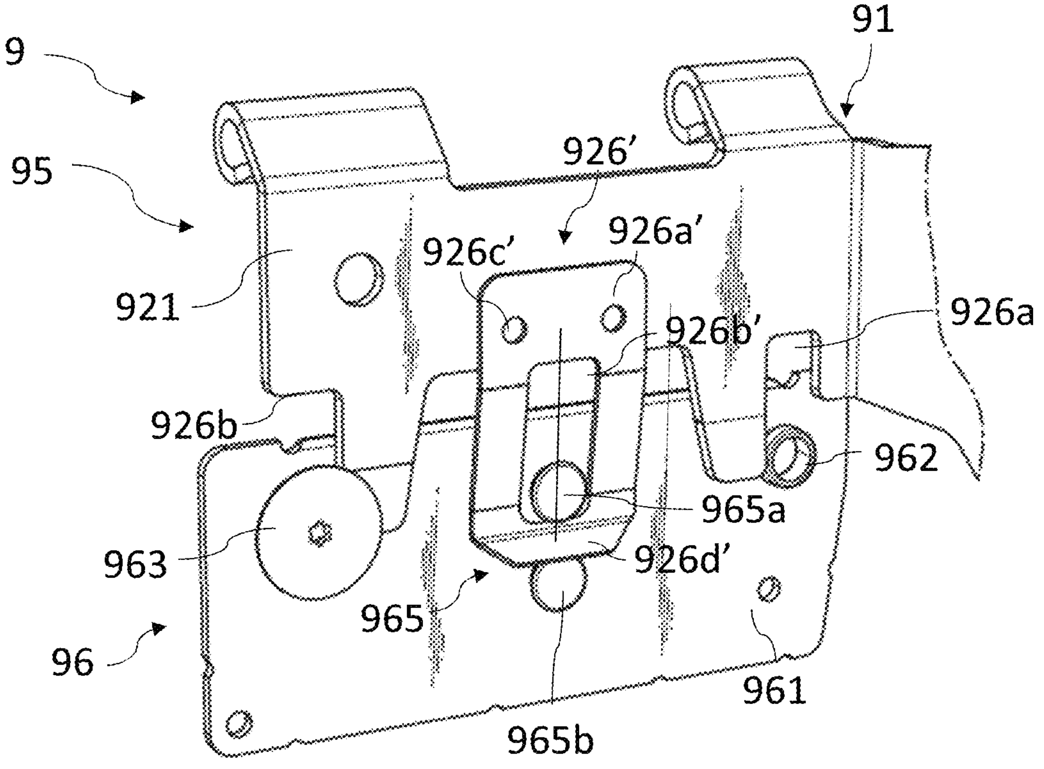
FIGS. 61 and 62 are perspective views corresponding to FIGS. 59 and 60, of a further alternative embodiment of the invention.
Figure 62:
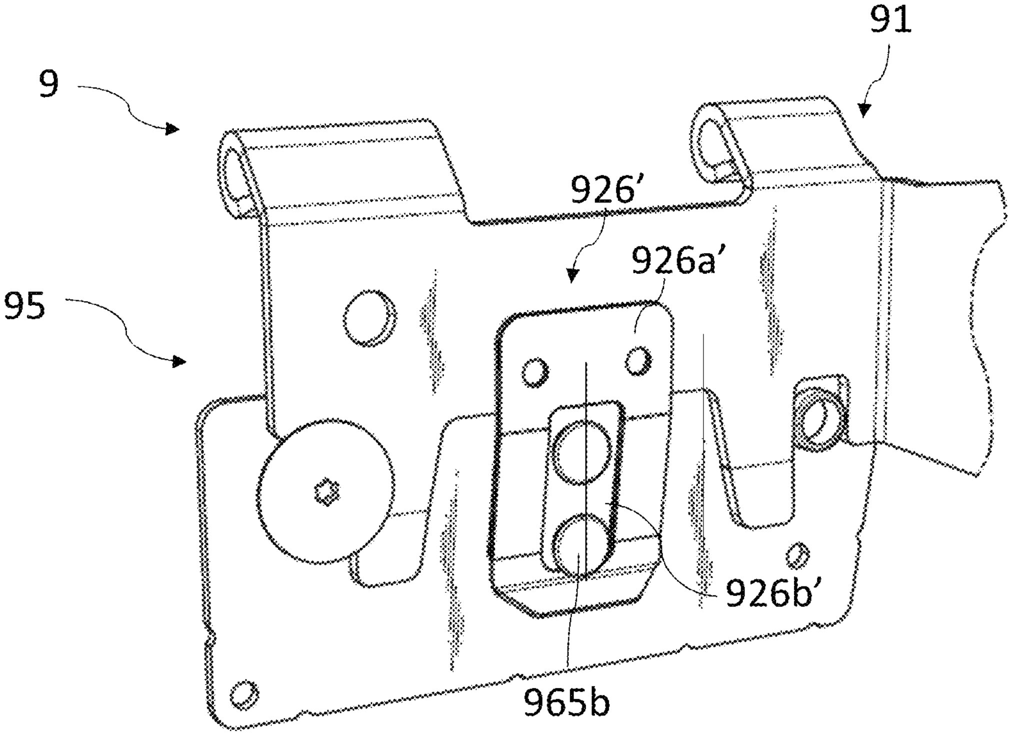

In the further alternative embodiment of FIGS. 61-62, the coupling plate engagement means 965 comprise a set of engagement pins 965*a*, 965*b* located with a mutual spacing in a height direction of the coupling plate 96. The frame hinge part engagement means 926' comprise a locking tab 926*a*' with a track 926*b*' extending in a height direction of the frame hinge part 96. Comparing the position in FIG. 61 with the position in FIG. 62, it is seen how the track 926*b*' is configured to cooperate successively with an intermediate engagement pin 965*a* and a final engagement pin 965*b*.

The locking tab 926*a*' comprises a fastening section 926*c*' at a first end of the locking tab 926*a*' in which the locking tab 926*a*' is fastened to the base section 961 of the top frame coupling plate 96. At a second end, opposite the first end, a flange 926*d*' is formed. The flange 926*d*' facilitates the movement between the intermediate position and the final position. It is also possible to use the flange 926*d*' for release of the engagement. In case it is desired to release the engagement, for instance in order to de-couple the sash 3 from the frame 2, over-closure of the sash 3 as described in the above may be carried out.

Figure 63:
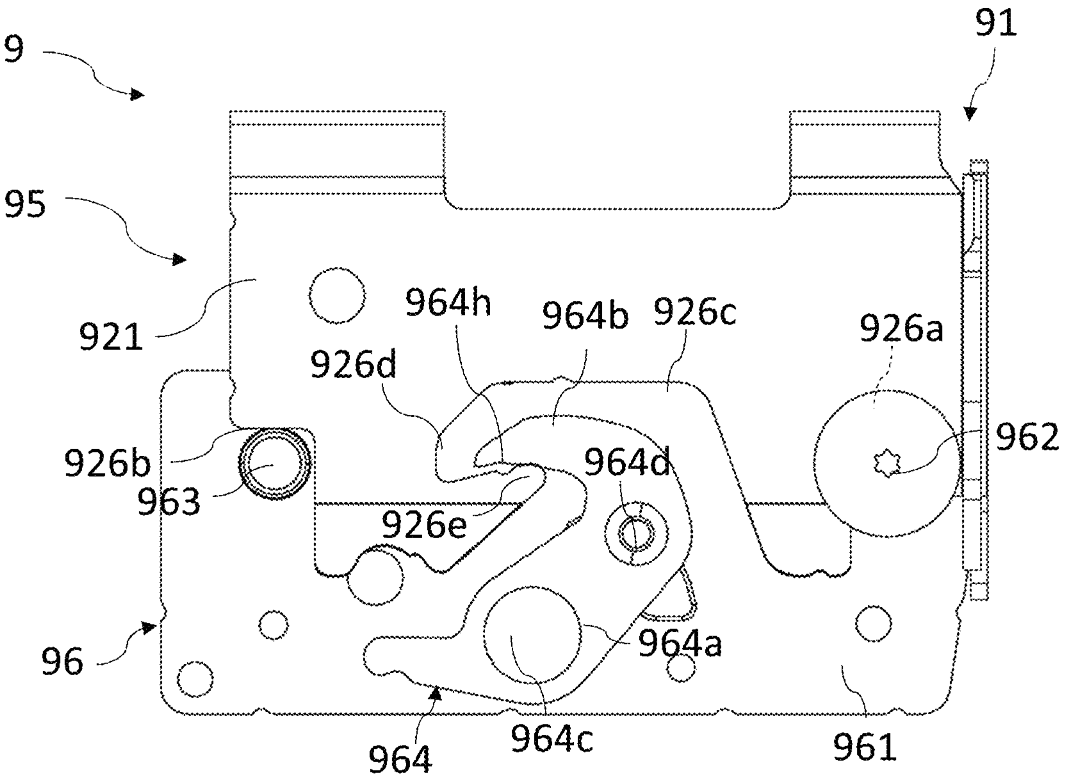
FIGS. 63 and 64 are plan views corresponding to FIGS. 59 and 60, of a still further alternative embodiment of the invention.
Figure 64:
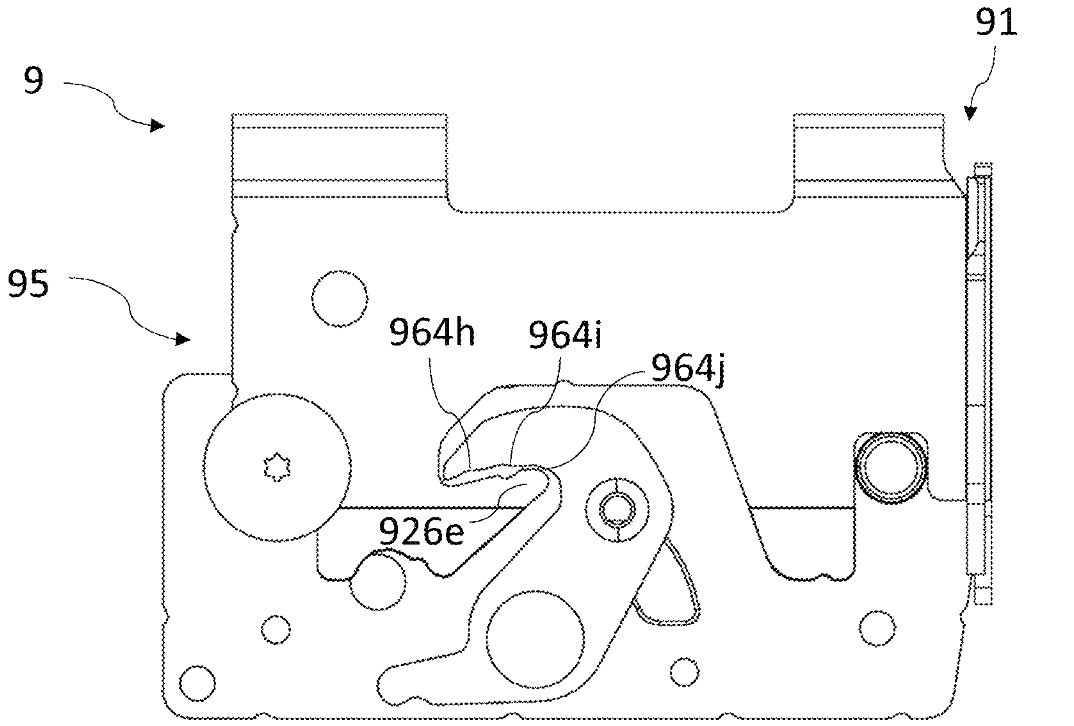

In the still further embodiment of FIGS. 63-64, the hook element 964 is provided with a plurality of indentations in the side facing the frame hinge part engagement means 926. The plurality of indentations constitute sequential engagement portions. One or more of the indentations are formed by a curve prompting the hook element 964 to move in one direction, namely towards the final engagement position, possibly assisted by the bias from a spring (not shown). However, the hook element 964 is not allowed to move backwards, away from the final engagement position. In this way, the plurality of indentations function as a ratchet. In the embodiment shown, a first intermediate engagement portion 964*h*, a second intermediate engagement portion 964*i*, and a final engagement portion 964*j* are formed in the hook element 964, to cooperate with the projection 926*e* of the frame hinge part engagement means 926. In addition to ensuring a safe and reliable engagement operation, this embodiment has the additional advantages of reduced frictional forces and furthermore reduced impact of unavoidable manufacturing tolerances in the roof window 1.

Although not described in detail for the alternative embodiments, the engagement means of the frame hinge part 92 provided on the frame hinge side flange 924 are constituted by the secondary hinge pin 927 to lock the hinge unit 91 to the side frame member 22 in the first operational condition and to allow rotation of the sash 3 in the second operational condition.

By forming each coupling unit 95 with one top frame coupling plate 96 and one side frame coupling plate 97, the coupling unit 95 allows selective coupling of the frame hinge part 92 of the associated hinge unit 91 to the top frame coupling plate 96 and the side frame coupling plate 97 in the first operational condition, and to only the side frame coupling plate 97 in the second operational condition.

The side frame coupling plate 97 comprises an opening (not shown in detail) intended to cooperate with a secondary hinge pin 927 to engage and lock the hinge unit 91 to the side frame member 22 in the first operational condition and to allow rotation of the sash 3 about the substantially horizontal second hinge axis β in the second operational condition.

In the following, an exemplary method of installing the roof window 1 in a roof structure (not shown) will be described. It is understood that various steps may be carried out differently, or in a different order.

The roof window 1 with the frame 2, sash 3, and pane 4 are provided in a supply condition. Depending on the conditions on the installation site, the roof window 1 is typically supplied in a packaging which is opened in proximity to the building, in which the roof window 1 is to be installed, possibly inside a room of the building. To ease handling of the sash, a set of suction disc tools may be provided; however, it is also possible to handle the roof window 1 manually without tools, or craning with or without suction disc tools.

It is noted that in the shown embodiment, the insulation frame 7 is connected to the frame 2 in the supply condition. The principles of the present invention are however also applicable to roof windows in which the insulation frame 7 is supplied separately, or without an insulation frame altogether.

Following unpacking, the sash 3 is opened relative to the frame 2. The hinge unit 91 of the hinge assembly 9 is disengaged from the coupling unit 95 until the sash 3 is detached from the frame 2, that is, until a position as shown in FIG. 58 is attained.

The sash 3 with the hinge unit 91 is placed at a suitable location awaiting further handling. This allows easy handling and subsequent installation of the frame 2 in the roof structure. In preparation of the installation, the mounting brackets 6 are fastened to the frame 2.

Installation of the frame 2 takes place substantially as described in the above, by positioning the frame 2 in the opening provided and fastening the mounting brackets 6 to the subjacent roof structure.

In general, components of the roof window are easily disassembled and each component may in principle be reused, be recycled by appropriate environmentally responsible disposal means, or the material be recovered for other uses.

LIST OF REFERENCE NUMERALS

- 1 roof window
- 2 frame
  - 21 top frame member
  - 22 side frame member
  - 22*g* guiding element (frame)
  - 23 side frame member
  - 24 bottom frame member
  - 24*a* outer piece of bottom frame member
  - 24*b* separate inner piece of bottom frame member
  - 24*c* cover
  - 24*d* insulating piece
  - 24*g* guiding hole
  - 27 first outer groove
  - 27*b* second outer groove
  - 29*a* hinge assembly receiving milling (in top frame member)
  - 29*b* hinge assembly receiving milling (in side frame member)
  - 29*c* opening
  - 29*d* opening
  - 29*e* through-going opening
  - 29*f* opening

3 sash
31 top sash member
31*a* profile element of top sash member
31*b* intermediate element
31*c* inner element
32 side sash member
32*a* profile element of side sash member
32*b* intermediate element
32*c* inner element
32*g* guiding element (sash)
32*s* screening mounting bracket
33 side sash member
34 bottom sash member
34*a* profile element of bottom sash member
34*c* inner element
35 sash installation component
351 body portion
352 frame engagement portion
352*a* interior contact section
352*b* first inner contact section
352*c* first exterior contact section
352*d* second inner contact section
352*e* second exterior contact section
352*f* interior end section
352*g* outer end section
353 first support surface (side coupling position)
354 second support surface (top coupling position)
355 dividing rib
356 third support surface (service position)
36 suction disc tool
4 pane
41 exterior sheet
41*a* extended portion
42 interior sheet
43 additional interior sheet
45 glazing bar
46 glazing bar cover element
4*e* exterior surface of pane
4*i* interior surface of pane
5 operating assembly
51 socket fitting
511 base plate of socket fitting
512 flanges of socket fitting
513 holes
514 guide protrusion
52 spindle part
521 spindle
522 handle
53 nut part
531 nut ring
532 bolts
54 end portion
541 opening
55 sash fitting
551 base plate of sash fitting
552 flanges of sash fitting
553 openings
56 split
57 transportation fitting
571 base portion
572 anchor portion
573 aperture
574 inclined portion
575 guide protrusion
576 hole
5' operating assembly, alternative embodiment/handle
6 mounting bracket
61 first bracket leg
612 opening
613 opening
614 bend
62 second bracket leg
620 aperture
621 first section
621*a* offset
622 opening
623 opening
624 engagement means/flange
625 hinge connection
626 second section
626*a* offset
626*b* protrusion
627 opening
628 opening
629 engagement means/flange
7 insulating frame
71 top piece of insulating frame
72 side piece of insulating frame
73 side piece of insulating frame
74 bottom piece of insulating frame
75 indentation
76 recess
77 folding line
78 protrusion
8 interface unit
9 hinge assembly
91 hinge unit
92 frame hinge part
921 frame hinge base plate
922 receiving structure for hinge pin
922*a* barrel part
922*b* barrel part
923 inclined section
924 frame hinge side flange
924*a* transition section
924*b* free end section
925 opening restricting means/first opening restrictor
9251 arm
9252 rotatable joint
9253 track
9254 pin
9255 abutment notch
926 engagement means of frame hinge part
926*a* abutment recess
926*b* abutment recess
926*c* lock recess
926*d* nook section of lock recess
926*e* projection
926' frame hinge part engagement means (alternative)
926*a*' locking tab
926*b*' track
926*c*' fastening section
926*d*' flange
927 secondary hinge pin
93 sash hinge part
931 sash hinge base plate
932 receiving structure for hinge pin/barrel
933 inclined section
934 sash hinge side flange
934*a* transition section
934*b* free end section
935 hole
936 protrusion
937 hole

938 spigot
94 hinge pin
95 coupling unit
96 top frame coupling plate
961 base section
961*a* opening
961*b* spring-receiving opening in base section 961
961*c* spigot
962 first engagement pin
963 second engagement pin
964 coupling plate engagement means/hook element
964*a* arm
964*b* hook
964*c* rotational joint
964*d* spring-receiving opening
964*e* spring
964*f* intermediate engagement portion
964*g* final engagement portion
964*h* first intermediate engagement portion
964*i* second intermediate engagement portion
964*j* final engagement portion
965 coupling plate engagement means (further alternative)
965*a* intermediate engagement pin
965*b* final engagement pin
97 side frame coupling plate
971 base section
971*c* recessed section
971*d* fastening pin (for biased lock element 972)
971*e* spigot
971*f* opening
971*g* stop pin (for abutment notch 9255)
971*r* key-hole shaped recess
971*ra* entry opening
971*rb* narrowed track portion
972 biased lock element
972*a* connection section
972*b* resilient end section
972*c* opening
972*d* release tab
981 screw
982 insert nut
983 insert nut
50 lifting device
α first hinge axis
β second hinge axis

The invention claimed is:

1. A roof window comprising a frame, a sash, and a pane, in which the frame comprises a set of frame members including a top frame member, two side frame members and a bottom frame member and the sash comprises a set of sash members including a top sash member, two side sash members and a bottom sash member, each frame and sash member defining a longitudinal direction, and in which the roof window furthermore comprises a hinge assembly configured to allow the sash to be tophung about a substantially horizontal first hinge axis in a first operational condition in a mounted condition of the roof window and comprising a hinge unit with a frame hinge part connected to or connectable to at least the top frame member and a sash hinge part connected to at least the top sash member, in which the hinge assembly comprises a coupling unit connected to or connectable to the frame and configured to be connected to the hinge unit in the mounted condition of the roof window, and in an installation condition of the roof window, the hinge unit is connected to the sash and the coupling unit is connected to the frame, wherein the coupling unit and the hinge unit are configured to assume the following positions relative to each other:

i) at least one intermediate position; and ii) a final position, corresponding to the mounted condition of the roof window, wherein the coupling unit comprises a top frame coupling plate connected to the top frame member, the top frame coupling plate being provided with coupling plate engagement means configured to cooperate with a counterpart frame hinge part engagement means of the frame hinge part, characterised in that the coupling plate engagement means comprise a hook element comprising an arm with a hook and connected to a base section of the top frame coupling plate in a rotational joint, and wherein a frame hinge base plate comprises a protrusion constituting the frame hinge part engagement means and configured to cooperate successively with at least one intermediate engagement portion and a final engagement portion of said hook element, and in that the hook element is biased towards a locking position in which the protrusion of the frame hinge base plate is in engagement with the final engagement portion, the bias being provided by a spring accommodated with one end in a spring-receiving opening in the arm and with another end in a spring-receiving opening in the base section, the spring passing through an opening allowing movement of the spring during movement of the hook element.

2. The roof window according to claim 1, wherein the coupling plate engagement means include at least two distinct engagement portions configured to cooperate with the counterpart frame hinge part engagement means.

3. The roof window according to claim 2, wherein the coupling plate engagement means are moveable or stationary relative to the coupling plate, and wherein the frame hinge part engagement means are stationary or moveable.

4. The roof window according to claim 3, wherein the coupling plate engagement means are female or male engagement means, and wherein the frame hinge engagement means are male or female engagement means.

5. The roof window according to claim 2, wherein the coupling unit comprises one top frame coupling plate and one side frame coupling plate, and wherein the coupling unit is configured to allow selective coupling of the frame hinge part of the associated hinge unit to the top frame coupling plate and the side frame coupling plate in the first operational condition, and to only the side frame coupling plate in a second operational condition.

6. The roof window according to claim 2, wherein the frame hinge part comprises the frame hinge base plate connectable to an inner side of the top frame member and provided with a receiving structure for the hinge pin defining the first hinge axis, and wherein the sash hinge part comprises a sash hinge base plate connected to an outer side of the top sash member and provided with a receiving structure for the hinge pin, such that the hinge unit forms a pin-and-barrel hinge.

7. The roof window according to claim 2, wherein the hinge assembly comprises a set of coupling units connected to the frame, such that one coupling unit is connected to the frame at or near a top corner of the top frame member and one side frame member, and another, mirror-inverted, coupling unit is connected to the frame at or near a top corner of the top frame member and the other side frame member.

8. The roof window according to claim 2, wherein a first opening restrictor is provided by an arm rotatably connected to a sash or frame member, the arm of the first opening restrictor comprising a track engaging with a pin on a frame or sash member, the arm of the first opening restrictor being rotatably connected to a sash hinge side flange in a rotatable joint and the pin interacting with the track being provided on a frame hinge side flange.

9. The roof window according to claim 1, wherein the coupling plate engagement means are female or male engagement means, and wherein the frame hinge engagement part means are male or female engagement means.

10. A roof window according to claim 1, wherein further engagement means of the top frame coupling plate comprise at least one engagement pin protruding inwards relative to the base section and relative to the inner side of the top frame member, said at least one engagement pin being configured to cooperate with a respective abutment recess formed in the frame hinge base plate and forming part of a set of receiving recesses constituting further engagement means of the frame hinge part to align the hinge unit relative to the coupling unit in the longitudinal direction of the top frame member.

11. The roof window according to claim 10, wherein said at least one engagement pin is further configured to cooperate with the respective abutment recess to act as a stop for the hinge unit in a direction towards the interior and in an inwards direction relative to the inner side of the top frame member.

12. The roof window according to claim 1, wherein the coupling unit comprises one top frame coupling plate and one side frame coupling plate, and wherein the coupling unit is configured to allow selective coupling of the frame hinge part of the associated hinge unit to the top frame coupling plate and the side frame coupling plate in the first operational condition, and to only the side frame coupling plate in a second operational condition.

13. The roof window according to claim 12, wherein the side frame coupling plate comprises an opening configured to cooperate with a secondary hinge pin to engage and lock the hinge unit to the side frame member in the first operational condition and to allow rotation of the sash about a substantially horizontal second hinge axis in the second operational condition, said secondary hinge pin constituting engagement means of the frame hinge part.

14. The roof window according to claim 1, wherein the frame hinge part comprises the frame hinge base plate connectable to an inner side of the top frame member and provided with a receiving structure for a hinge pin defining the first hinge axis, and wherein the sash hinge part comprises a sash hinge base plate connected to an outer side of the top sash member and provided with a receiving structure for the hinge pin, such that the hinge unit forms a pin-and-barrel hinge.

15. The roof window according to claim 1, wherein the hinge assembly comprises a set of coupling units connected to the frame, such that one coupling unit is connected to the frame at or near a top corner of the top frame member and one side frame member, and another, mirror-inverted, coupling unit is connected to the frame at or near a top corner of the top frame member and the other side frame member.

16. The roof window according to claim 1, wherein opening restricting means are provided, a first opening restrictor being provided by an arm rotatably connected to a sash or frame member, the arm of the first opening restrictor comprising a track engaging with a pin on a frame or sash member, the arm of the first opening restrictor being rotatably connected to a sash hinge side flange in a rotatable joint and the pin interacting with the track being provided on a frame hinge side flange.

17. The roof window according to claim 1, wherein the sash is configured to assume a side coupling position, a top coupling position, and a service position in a second operational condition.

18. The roof window according to claim 17, wherein the top frame member comprises a hinge assembly receiving milling and a set of openings, at least some of said openings being through-going openings.

19. The roof window according to claim 1, wherein the top frame coupling plate is connected to the top frame member by means of a plurality of fastening means including at least one spigot on the base section and at least one bolt element, constituted by an engagement pin of the coupling plate engagement means of the top frame coupling plate, and each engagement pin cooperating with an insert nut on the outer side of the top frame member.

20. The roof window according to claim 1, wherein the frame hinge part comprises the frame hinge base plate connectable to an inner side of the top frame member and provided with a receiving structure for a hinge pin defining the first hinge axis, and wherein the sash hinge part comprises a sash hinge base plate connected to an outer side of the top sash member and provided with a receiving structure for the hinge pin, such that the hinge unit forms a pin-and-barrel hinge.

* * * * *